(12) United States Patent
Ishida

(10) Patent No.: US 12,348,171 B2
(45) Date of Patent: Jul. 1, 2025

(54) BRAKE CONTROL DEVICE AND MOTOR DRIVE DEVICE

(71) Applicant: FANUC CORPORATION, Yamanashi (JP)

(72) Inventor: Hitoshi Ishida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 100 days.

(21) Appl. No.: 18/264,758

(22) PCT Filed: Mar. 24, 2022

(86) PCT No.: PCT/JP2022/014103
§ 371 (c)(1),
(2) Date: Aug. 9, 2023

(87) PCT Pub. No.: WO2022/210290
PCT Pub. Date: Oct. 6, 2022

(65) Prior Publication Data
US 2024/0056003 A1  Feb. 15, 2024

(30) Foreign Application Priority Data

Mar. 31, 2021 (JP) ................. 2021-060142

(51) Int. Cl.
*F16D 65/14* (2006.01)
*F16D 65/18* (2006.01)
(Continued)

(52) U.S. Cl.
CPC ............... *H02P 3/04* (2013.01); *F16D 65/18* (2013.01); *B60T 8/885* (2013.01); *F16D 2121/22* (2013.01)

(58) Field of Classification Search
CPC ...... F16D 65/14; F16D 65/18; F16D 2121/26; F16D 2121/22; H02P 3/04; B60T 8/885
(Continued)

(56) References Cited

U.S. PATENT DOCUMENTS

2008/0084109 A1* 4/2008 Griffith ................. B60T 13/746
303/20
2010/0125398 A1* 5/2010 Headlee ................. B60T 13/586
180/65.265
(Continued)

FOREIGN PATENT DOCUMENTS

JP  H08-182365 A   7/1996
JP  2001-346400 A  12/2001
(Continued)

*Primary Examiner* — Gabriel Agared
(74) *Attorney, Agent, or Firm* — HAUPTMAN HAM, LLP

(57) ABSTRACT

A brake control device for controlling a brake device of the non-excitation-actuated type includes: a power supply; a brake control unit outputting a brake control signal; an opening/closing unit opening and closing a circuit between the power supply and brake device according to the brake control signal; a state detection unit outputting a state detection signal indicating an electric potential state of a circuit between the opening/closing unit and the brake device; an abnormality detection unit detecting whether an abnormality is absent or present based on a content of the brake control signal and a content of the state detection signal; a brake lock switch connected between input terminals of the brake device to be connected in parallel with the brake device; and a brake lock switch control unit closing the brake lock switch when the abnormality is detected by the abnormality detection unit.

12 Claims, 39 Drawing Sheets

(51) Int. Cl.
  *H02P 3/04*   (2006.01)
  *B60T 8/88*   (2006.01)
  *F16D 121/22*  (2012.01)

(58) Field of Classification Search
  USPC .......................................................... 318/372
  See application file for complete search history.

(56) References Cited

U.S. PATENT DOCUMENTS

| | | |
|---|---|---|
| 2013/0069567 A1 | 3/2013 | Hild et al. |
| 2013/0082514 A1* | 4/2013 | Murakami ............ B60T 13/686 |
| | | 303/14 |
| 2016/0244042 A1* | 8/2016 | Nishikawa .............. F16D 65/18 |
| 2017/0036659 A1* | 2/2017 | Murakami ............ B60T 13/686 |
| 2018/0244255 A1* | 8/2018 | Kawai ................... B60T 13/746 |
| 2019/0092297 A1* | 3/2019 | Ayichew ............... B60T 13/662 |
| 2019/0382103 A1 | 12/2019 | Frank et al. |
| 2021/0188233 A1* | 6/2021 | Yuyama ................. H02K 11/33 |
| 2021/0323522 A1* | 10/2021 | Adler ........................ B60T 7/02 |
| 2024/0309925 A1* | 9/2024 | Ishida ..................... F16D 66/00 |

FOREIGN PATENT DOCUMENTS

| | | |
|---|---|---|
| JP | 2012-237397 A | 12/2012 |
| JP | 2017-034856 A | 2/2017 |
| JP | 2019-105286 A | 6/2019 |
| JP | 2020-089137 A | 6/2020 |
| WO | 2014045728 A1 | 3/2014 |

\* cited by examiner

FIG. 3

DURING NORMAL STATE

|  | BRAKE ACTUATION | BRAKE RELEASE PREPARATION | BRAKE RELEASE |
|---|---|---|---|
| BRAKE SIGNAL $BS_A$ | LOW | HIGH | HIGH |
| BRAKE SIGNAL $BS_B$ | LOW | LOW | HIGH |
| STATE DETECTION SIGNAL $FB_A$ | HIGH | LOW | LOW |
| STATE DETECTION SIGNAL $FB_B$ | HIGH | LOW | HIGH |
| BRAKE LOCK SWITCH CONTROL SIGNAL LS | OPEN | OPEN | OPEN |
| BRAKE STATE | ACTUATED | ACTUATED | RELEASED |

FIG. 4A

DURING SHORT CIRCUIT FAILURE OF POSITIVE-SIDE OPENING AND CLOSING SWITCH

|  | BRAKE ACTUATION | BRAKE RELEASE PREPARATION | BRAKE RELEASE |
|---|---|---|---|
| BRAKE SIGNAL $BS_A$ | LOW | HIGH | HIGH |
| BRAKE SIGNAL $BS_B$ | LOW | LOW | HIGH |
| STATE DETECTION SIGNAL $FB_A$ | ~~HIGH~~ LOW | LOW | LOW |
| STATE DETECTION SIGNAL $FB_B$ | ~~HIGH~~ LOW | LOW | HIGH |
| BRAKE LOCK SWITCH CONTROL SIGNAL LS | OPEN | OPEN | OPEN |
| BRAKE STATE | ACTUATED | ACTUATED | RELEASED |

FIG. 4B

WITHOUT BRAKE LOCK SWITCH CONTROL: DURING SHORT CIRCUIT FAILURE OF NEGATIVE-SIDE OPENING AND CLOSING SWITCH

|  | BRAKE ACTUATION | BRAKE RELEASE PREPARATION | BRAKE RELEASE |
|---|---|---|---|
| BRAKE SIGNAL $BS_A$ | LOW | HIGH | HIGH |
| BRAKE SIGNAL $BS_B$ | LOW | LOW | HIGH |
| STATE DETECTION SIGNAL $FB_A$ | HIGH | LOW | LOW |
| STATE DETECTION SIGNAL $FB_B$ | HIGH | ~~LOW~~ HIGH | HIGH |
| BRAKE LOCK SWITCH CONTROL SIGNAL LS | OPEN | OPEN | OPEN |
| BRAKE STATE | ACTUATED | AC~~TUAT~~ED RELEASED | RELEASED |

FIG. 4C

WITH BRAKE LOCK SWITCH CONTROL: DURING SHORT CIRCUIT FAILURE OF NEGATIVE-SIDE OPENING AND CLOSING SWITCH

|  | BRAKE ACTUATION | BRAKE RELEASE PREPARATION |
|---|---|---|
| BRAKE SIGNAL $BS_A$ | LOW | HIGH |
| BRAKE SIGNAL $BS_B$ | LOW | LOW |
| STATE DETECTION SIGNAL $FB_A$ | HIGH | LOW |
| STATE DETECTION SIGNAL $FB_B$ | HIGH | ~~LOW~~ HIGH |
| BRAKE LOCK SWITCH CONTROL SIGNAL LS | OPEN | ~~OPEN~~ CLOSE |
| BRAKE STATE | ACTUATED | ~~RELEASED~~ ACTUATED |

FIG. 5A

WITHOUT BRAKE LOCK SWITCH CONTROL: DURING SHORT CIRCUIT FAILURES OF POSITIVE-SIDE OPENING AND CLOSING SWITCH AND NEGATIVE-SIDE OPENING AND CLOSING SWITCH

|  | BRAKE ACTUATION | BRAKE RELEASE PREPARATION | BRAKE RELEASE |
|---|---|---|---|
| BRAKE SIGNAL $BS_A$ | LOW | HIGH | HIGH |
| BRAKE SIGNAL $BS_B$ | LOW | LOW | HIGH |
| STATE DETECTION SIGNAL $FB_A$ | ~~HIGH~~ LOW | LOW | LOW |
| STATE DETECTION SIGNAL $FB_B$ | HIGH | ~~LOW~~ HIGH | HIGH |
| BRAKE LOCK SWITCH CONTROL SIGNAL LS | OPEN | OPEN | OPEN |
| BRAKE STATE | AC~~TUAT~~ED RELEASED | AC~~TUAT~~ED RELEASED | RELEASED |

FIG. 5B

WITH BRAKE LOCK SWITCH CONTROL: DURING SHORT CIRCUIT FAILURES OF POSITIVE-SIDE OPENING AND CLOSING SWITCH AND NEGATIVE-SIDE OPENING AND CLOSING SWITCH

|  | BRAKE ACTUATION | BRAKE RELEASE PREPARATION |
|---|---|---|
| BRAKE SIGNAL $BS_A$ | LOW | HIGH |
| BRAKE SIGNAL $BS_B$ | LOW | LOW |
| STATE DETECTION SIGNAL $FB_A$ | ~~HIGH~~ LOW | LOW |
| STATE DETECTION SIGNAL $FB_B$ | HIGH | ~~LOW~~ HIGH |
| BRAKE LOCK SWITCH CONTROL SIGNAL LS | ~~OPEN~~ CLOSE | ~~OPEN~~ CLOSE |
| BRAKE STATE | ~~RELEASED~~ ACTUATED | ~~RELEASED~~ ACTUATED |

FIG. 9A

WITHOUT BRAKE LOCK SWITCH CONTROL: DURING SHORT CIRCUIT OF EXTERNAL POWER SOURCE AND BRAKE CABLE (PART 1)

|  | BRAKE ACTUATION | BRAKE RELEASE PREPARATION | BRAKE RELEASE |
|---|---|---|---|
| BRAKE SIGNAL $BS_A$ | LOW | HIGH | HIGH |
| BRAKE SIGNAL $BS_B$ | LOW | LOW | HIGH |
| STATE DETECTION SIGNAL $FB_A$ | ~~HIGH~~ LOW | LOW | LOW |
| STATE DETECTION SIGNAL $FB_B$ | HIGH | ~~LOW~~ HIGH | HIGH |
| BRAKE LOCK SWITCH CONTROL SIGNAL LS | OPEN | OPEN | OPEN |
| BRAKE STATE | ~~ACTIVATED~~ RELEASED | ~~ACTIVATED~~ RELEASED | RELEASED |

FIG. 9B

WITH BRAKE LOCK SWITCH CONTROL: DURING SHORT CIRCUIT OF EXTERNAL POWER SOURCE AND BRAKE CABLE (PART 1)

| | BRAKE ACTUATION | BRAKE RELEASE PREPARATION |
|---|---|---|
| BRAKE SIGNAL $BS_A$ | LOW | HIGH |
| BRAKE SIGNAL $BS_B$ | LOW | LOW |
| STATE DETECTION SIGNAL $FB_A$ | ~~HIGH~~ LOW | LOW |
| STATE DETECTION SIGNAL $FB_B$ | HIGH | ~~LOW~~ HIGH |
| BRAKE LOCK SWITCH CONTROL SIGNAL LS | ~~OPEN~~ CLOSE | ~~OPEN~~ CLOSE |
| BRAKE STATE | ~~RELEASED~~ ACTUATED | ~~RELEASED~~ ACTUATED |

FIG. 11A

WITHOUT BRAKE LOCK SWITCH CONTROL; DURING SHORT CIRCUIT OF EXTERNAL POWER SOURCE AND BRAKE CABLE (PART 2)

|  | BRAKE ACTUATION | BRAKE RELEASE PREPARATION | BRAKE RELEASE |
|---|---|---|---|
| BRAKE SIGNAL $BS_A$ | LOW | HIGH | HIGH |
| BRAKE SIGNAL $BS_B$ | LOW | LOW | HIGH |
| STATE DETECTION SIGNAL $FB_A$ | HIGH | ~~LOW~~ HIGH | LOW |
| STATE DETECTION SIGNAL $FB_B$ | ~~HIGH~~ LOW | LOW | HIGH |
| BRAKE LOCK SWITCH CONTROL SIGNAL LS | OPEN | OPEN | OPEN |
| BRAKE STATE | ~~ACTUATED~~ RELEASED | ~~ACTUATED~~ RELEASED | RELEASED |

FIG. 11B

WITH BRAKE LOCK SWITCH CONTROL: DURING SHORT CIRCUIT OF EXTERNAL POWER SOURCE AND BRAKE CABLE (PART 2)

|  | BRAKE ACTUATION | BRAKE RELEASE PREPARATION |
|---|---|---|
| BRAKE SIGNAL $BS_A$ | LOW | HIGH |
| BRAKE SIGNAL $BS_B$ | LOW | LOW |
| STATE DETECTION SIGNAL $FB_A$ | HIGH | ~~LOW~~ HIGH |
| STATE DETECTION SIGNAL $FB_B$ | ~~HIGH~~ LOW | LOW |
| BRAKE LOCK SWITCH CONTROL SIGNAL LS | ~~OPEN~~ CLOSE | ~~OPEN~~ CLOSE |
| BRAKE STATE | ~~RELEASED~~ ACTUATED | ~~RELEASED~~ ACTUATED |

FIG. 14A

DURING NORMAL STATE

|  | BRAKE ACTUATION | BRAKE RELEASE |
|---|---|---|
| BRAKE SIGNAL BS | LOW | HIGH |
| STATE DETECTION SIGNAL FB | LOW | HIGH |
| BRAKE LOCK SWITCH CONTROL SIGNAL LS | OPEN | OPEN |
| BRAKE STATE | ACTUATED | RELEASED |

FIG. 14B

WITHOUT BRAKE LOCK SWITCH CONTROL: DURING SHORT CIRCUIT FAILURE OF OPENING AND CLOSING SWITCH

|  | BRAKE ACTUATION | BRAKE RELEASE |
|---|---|---|
| BRAKE SIGNAL BS | LOW | HIGH |
| STATE DETECTION SIGNAL FB | ~~LOW~~ HIGH | HIGH |
| BRAKE LOCK SWITCH CONTROL SIGNAL LS | OPEN | OPEN |
| BRAKE STATE | ~~ACTUATED~~ RELEASED | RELEASED |

FIG. 14C

WITH BRAKE LOCK SWITCH CONTROL: DURING SHORT CIRCUIT FAILURE OF OPENING AND CLOSING SWITCH

|  | BRAKE ACTUATION | BRAKE RELEASE |
|---|---|---|
| BRAKE SIGNAL BS | LOW | HIGH |
| STATE DETECTION SIGNAL FB | ~~LOW~~ HIGH | HIGH |
| BRAKE LOCK SWITCH CONTROL SIGNAL LS | ~~OPEN~~ CLOSE | OPEN |
| BRAKE STATE | ~~ACTUATED~~ RELEASED | RELEASED |

FIG. 20A

DURING OCCURRENCE OF FAILURE

|  | BRAKE ACTUATION | BRAKE RELEASE PREPARATION | BRAKE RELEASE |
|---|---|---|---|
| BRAKE SIGNAL $BS_A$ | LOW | HIGH | HIGH |
| BRAKE SIGNAL $BS_B$ | LOW | LOW | HIGH |
| STATE DETECTION SIGNAL $FB_A$ | LOW | LOW | LOW |
| STATE DETECTION SIGNAL $FB_B$ | LOW | ~~LOW~~ HIGH | HIGH |
| BRAKE LOCK SWITCH CONTROL SIGNAL LS | OPEN | OPEN | OPEN |
| BRAKE STATE | ACTUATED | ~~ACTUATED~~ RELEASED | RELEASED |

FIG. 20B

DURING OCCURRENCE OF FAILURE IN BRAKE CONTROL DEVICE

|  | BRAKE ACTUATION | BRAKE RELEASE PREPARATION | FAULTY LOCATION DETERMINATION |
|---|---|---|---|
| BRAKE SIGNAL $BS_A$ | LOW | HIGH | HIGH |
| BRAKE SIGNAL $BS_B$ | LOW | LOW | LOW |
| STATE DETECTION SIGNAL $FB_A$ | LOW | LOW | LOW |
| STATE DETECTION SIGNAL $FB_B$ | LOW | ~~LOW~~ HIGH | HIGH |
| BRAKE LOCK SWITCH CONTROL SIGNAL LS | OPEN | OPEN | CLOSE |

FIG. 20C

DURING OCCURRENCE OF FAILURE OUTSIDE BRAKE CONTROL DEVICE

|  | BRAKE ACTUATION | BRAKE RELEASE PREPARATION | FAULTY LOCATION DETERMINATION |
|---|---|---|---|
| BRAKE SIGNAL $BS_A$ | LOW | HIGH | HIGH |
| BRAKE SIGNAL $BS_B$ | LOW | LOW | LOW |
| STATE DETECTION SIGNAL $FB_A$ | LOW | LOW | LOW |
| STATE DETECTION SIGNAL $FB_B$ | LOW | ~~LOW~~ HIGH | LOW |
| BRAKE LOCK SWITCH CONTROL SIGNAL LS | OPEN | OPEN | CLOSE |

FIG. 26A

DURING OCCURRENCE OF FAILURE

|  | BRAKE ACTUATION | BRAKE RELEASE |
|---|---|---|
| BRAKE SIGNAL BS | LOW | HIGH |
| STATE DETECTION SIGNAL FB | ~~LOW~~ HIGH | HIGH |
| BRAKE LOCK SWITCH CONTROL SIGNAL LS | OPEN | OPEN |
| BRAKE STATE | ~~ACTUATED~~ RELEASED | RELEASED |

FIG. 26B

DURING OCCURRENCE OF FAILURE IN BRAKE CONTROL DEVICE

|  | BRAKE ACTUATION | FAULTY LOCATION DETERMINATION |
|---|---|---|
| BRAKE SIGNAL BS | LOW | LOW |
| STATE DETECTION SIGNAL FB | ~~LOW~~ HIGH | HIGH |
| BRAKE LOCK SWITCH CONTROL SIGNAL LS | OPEN | CLOSE |

FIG. 26C

DURING OCCURRENCE OF FAILURE OUTSIDE BRAKE CONTROL DEVICE

|  | BRAKE ACTUATION | FAULTY LOCATION DETERMINATION |
|---|---|---|
| BRAKE SIGNAL BS | LOW | LOW |
| STATE DETECTION SIGNAL FB | ~~LOW~~ HIGH | LOW |
| BRAKE LOCK SWITCH CONTROL SIGNAL LS | OPEN | CLOSE |

BRAKE CONTROL DEVICE AND MOTOR DRIVE DEVICE

RELATED APPLICATIONS

The present application is a National Phase of International Application No. PCT/JP2022/014103 filed Mar. 24, 2022, which claims priority to Japanese Application No. 2021-060142, filed Mar. 31, 2021.

TECHNICAL FIELD

The present invention relates to a brake control device and a motor drive device.

BACKGROUND ART

A non-excitation actuated type brake device actuates a brake in a non-excitation state in which no voltage is applied to a brake coil, and releases the brake in an excitation state in which the voltage is applied to the brake coil.

For example, as an electromagnetic brake control device that controls a non-excitation actuated type electromagnetic brake, an electromagnetic brake control device is known that includes an output terminal for connecting the electromagnetic brake, and a brake control unit that outputs a brake control signal to be supplied to the electromagnetic brake via the output terminal, the brake control unit outputting a brake control signal to release the electromagnetic brake when a normal brake command and a safe brake command are both ON, and outputting a brake control signal to actuate the electromagnetic brake when at least one of the normal brake command and the safe brake command is OFF (see, e.g., PTL 1).

For example, a brake drive control circuit is known that controls an electromagnetic brake that releases the brake through energization, and includes a first rectification element provided between a first power source having a first circuit voltage and one terminal of the electromagnetic brake, a block switch inserted into a line that supplies power to the first power source for operating the first power source, a first switching element provided between the other terminal of the electromagnetic brake and a ground point, and a second switching element and a second rectification element provided in series between a second power source having a second circuit voltage different from the first circuit voltage and the one terminal of the electromagnetic brake (see, e.g., PTL 2).

For example, a non-excitation actuated type electromagnetic brake control device is known that actuates an electromagnetic brake having an excitation coil in a non-excitation state, and includes a first brake control circuit including a first computing unit that performs arithmetic processing in accordance with a brake command and a first switch that is turned through a brake signal generated based on an output signal of the first computing unit, and a second brake control circuit including a second computing unit that performs arithmetic processing in accordance with a brake command and a second switch that is turned on through a brake signal generated based on an output signal of the second computing unit, the first switch and the second switch being connected in series between a brake power source and the electromagnetic brake (see, e.g., PTL 3).

For example, PTL 4 discloses in paragraph 0031 that "The electromagnetic coil 24 is not driven when the brake releasing brake power P2 is not being supplied from the brake control unit 7 (see FIG. 1) to the electromagnetic brake 2. In this case, as illustrated in FIG. 2, the armatures 20a and 20b are pressed against the brake hub 22 (the brake shoe 27) through a biasing force of the torque springs 21a and 21b. As a result, the rotation shaft 14 of the motor 1 remains in a braked state (constrained state) without rotating. At this time, a gap (opening) is formed between the armatures 20a and 20b and the field core 23, and the first detector 28a and the second detector 28b are set to an OFF state (constraint position)", and PTL 4 discloses in paragraph 0032 that "the electromagnetic coil 24 is driven when the brake releasing brake power P2 is being supplied to the electromagnetic brake 2. In this case, as illustrated in FIG. 3, the armature moves toward the electromagnetic coil 24 against an elastic force of the torque spring 21. As a result, the armature 20 and the brake hub 22 (the brake shoe 27) move in a direction as to move away from each other, causing the brake to be in a released state. This makes it possible to rotationally drive the rotation shaft 14 of the motor 1. At this time, no gap (opening) is formed between the armatures 20a and 20b and the field core 23, and the first detector 28a and the second detector 28b are set to be in an ON state (release position)".

CITATION LIST

Patent Literature

[PTL 1] JP 2020-089137 A
[PTL 2] JP 2019-105286 A
[PTL 3] WO 2014/045728
[PTL 4] JP 2012-237397 A

SUMMARY OF INVENTION

Technical Problem

In the non-excitation actuated type brake device, an opening and closing switch is provided in a circuit including the brake coil and the power source, and the presence or absence of the excitation to the brake coil is controlled by opening and closing the opening and closing switch. In the event of an abnormality such as a short circuit failure of the opening and closing switch, a failure of a control unit that controls the opening and closing switch, or a short circuit of the circuit including the brake coil and the power source and a circuit other than the brake device, the brake may possibly be released when the brake is normally actuated. For example, in a brake device provided in a motor that drives an arm of a robot, an extremely dangerous state occurs, such as not being able to maintain an orientation of the robot or the arm falling down, if the brake is released due to some type of abnormality regardless of when the brake is normally actuated. As such, it is desirable to develop a safe non-excitation actuated type brake device and motor drive device that make it possible to avoid a brake thereof from being released when an abnormality occurs.

Solution to Problem

According to an aspect of the present disclosure, a brake control device controls a brake device that is a non-excitation actuated type brake device and configured to actuate a brake in a non-excitation state in which no voltage is applied and release the brake in an excitation state in which the voltage is applied, the brake control device including a power source that outputs a voltage, a brake control unit that outputs a brake control signal, an opening and closing unit connected in series to the brake device that opens and closes an electrical path between the power source and the brake device in response to a received brake control signal, a state detecting unit that outputs a state detection signal indicating a potential state of an electrical path between the opening and closing unit and the brake device, an abnormality detecting unit that detects whether or not an abnormality occurs, based on a combination of contents of the brake control signal and contents of the state detection signal, a brake lock switch connected between input terminals of the brake device so as to be in parallel to the brake device and configured to open and close an electrical path in response to a received brake lock control signal, and a brake lock switch control unit that outputs a close signal for controlling the brake lock switch to close as the brake lock control signal for the brake lock switch when the occurrence of an abnormality is detected by the abnormality detecting unit.

According to an aspect of the present disclosure, a motor drive device includes a non-excitation actuated type brake device that actuates a brake on a motor in a non-excitation state in which no voltage is applied and releases the brake on the motor in an excitation state in which the voltage is applied, and the above-described brake control device that controls the brake device.

Advantageous Effect of Invention

According to the aspects of the present disclosure, it is possible to realize a safe non-excitation actuated type brake device and motor drive device that make it possible to avoid a brake thereof from being released when an abnormality occurs.

BRIEF DESCRIPTION OF DRAWINGS

FIG. 3 is a diagram for describing each signal and brake state in a normal state in the brake control device according to the first embodiment of the present disclosure.

FIG. 4A is a diagram for describing each signal and brake state during a failure in the brake control device according to the first embodiment of the present disclosure, and illustrates each signal and brake state when only a positive-side opening and closing switch experiences a short circuit failure.

FIG. 4B is a diagram for describing each signal and brake state during a failure in the brake control device according to the first embodiment of the present disclosure, and illustrates each signal and brake state when only a negative-side opening and closing switch experiences a short circuit failure in a case where a brake lock switch control is not performed.

FIG. 4C is a diagram for describing each signal and brake state during a failure in the brake control device according to the first embodiment of the present disclosure, and illustrates each signal and brake state when a negative-side opening and closing switch experiences a short circuit failure in a case where the brake lock switch control is performed.

FIG. 5A is a diagram for describing each signal and brake state when both the positive-side opening and closing switch and the negative-side opening and closing switch have a short circuit failure in the brake control device according to the first embodiment of the present disclosure, and illustrates each signal and brake state when both the positive-side opening and closing switch and the negative-side opening and closing switch have a short circuit failure in a case where the brake lock switch control is not performed.

FIG. 5B is a diagram for describing each signal and brake state when both the positive-side opening and closing switch and the negative-side opening and closing switch have a short circuit failure in the brake control device according to the first embodiment of the present disclosure, and illustrates each signal and brake state when both the positive-side opening and closing switch and the negative-side opening and closing switch have a short circuit failure in a case where the brake lock switch control is performed.

FIG. 9A is a diagram illustrating an example of each signal and brake state in the case where the device including the external power source is short-circuited to the brake cable of the brake device as illustrated in FIG. 8 in the brake control device and the motor drive device including the same according to the first embodiment of the present disclosure, and illustrates an example of each signal and brake state in a case where the brake lock switch control process is not performed.

FIG. 9B is a diagram illustrating an example of each signal and brake state in the case where the device including an external power source is short-circuited to the brake cable of the brake device as illustrated in FIG. 8 in the brake control device and the motor drive device including the same according to the first embodiment of the present disclosure, and illustrates an example of each signal and brake state in a case where the brake lock switch control process is performed.

FIG. 11A is a diagram illustrating an example of each signal and brake state in the case where the device including the external power source is short-circuited to the brake cable of the brake device as illustrated in FIG. 10 in the brake control device and the motor drive device including the same according to the first embodiment of the present disclosure, and illustrates an example of each signal and brake state in a case where the brake lock switch control process is not performed.

FIG. 11B is a diagram illustrating an example of each signal and brake state in the case where the device including the external power source is short-circuited to the brake cable of the brake device as illustrated in FIG. 10 in the brake control device and the motor drive device including the same according to the first embodiment of the present disclosure, and illustrates an example of each signal and brake state in a case where the brake lock switch control process is performed.

FIG. 14A is a diagram for describing each signal and brake state in the brake control device according to the second embodiment of the present disclosure, and illustrates each signal and brake state in a normal state.

FIG. 14B is a diagram for describing each signal and brake state in the brake control device according to the second embodiment of the present disclosure, and illustrates each signal and brake state when an opening and closing switch experiences a short circuit failure in a case where the brake lock switch control is not performed.

FIG. 14C is a diagram for describing each signal and brake state in the brake control device according to the second embodiment of the present disclosure, and illustrates each signal and brake state when the opening and closing switch experiences a short circuit failure in a case where the brake lock switch control is performed.

FIG. 20A is a diagram for describing each signal and brake state in the brake control device according to the third embodiment of the present disclosure, and illustrates each signal and brake state when a failure is detected during a brake release preparation process period.

FIG. 20B is a diagram for describing each signal and brake state in the brake control device according to the third embodiment of the present disclosure, and illustrates each signal and brake state when a failure is detected inside the brake control device during the brake release preparation process period.

FIG. 20C is a diagram for describing each signal and brake state in the brake control device according to the third embodiment of the present disclosure, and illustrates each signal and brake state when a failure is detected outside the brake control device outside the brake release preparation process period.

FIG. 26A is a diagram for describing each signal and brake state in the brake control device according to the fourth embodiment of the present disclosure, and illustrates each signal and brake state when a failure is detected during the brake actuation process period.

FIG. 26B is a diagram for describing each signal and brake state in the brake control device according to the fourth embodiment of the present disclosure, and illustrates each signal and brake state when a failure is detected in the brake control device during the brake actuation process period.

FIG. 26C is a diagram for describing each signal and brake state in the brake control device according to the fourth embodiment of the present disclosure, and illustrates each signal and brake state when a failure is detected outside the brake control device outside the brake actuation process period.

DESCRIPTION OF EMBODIMENTS

Figure 1:
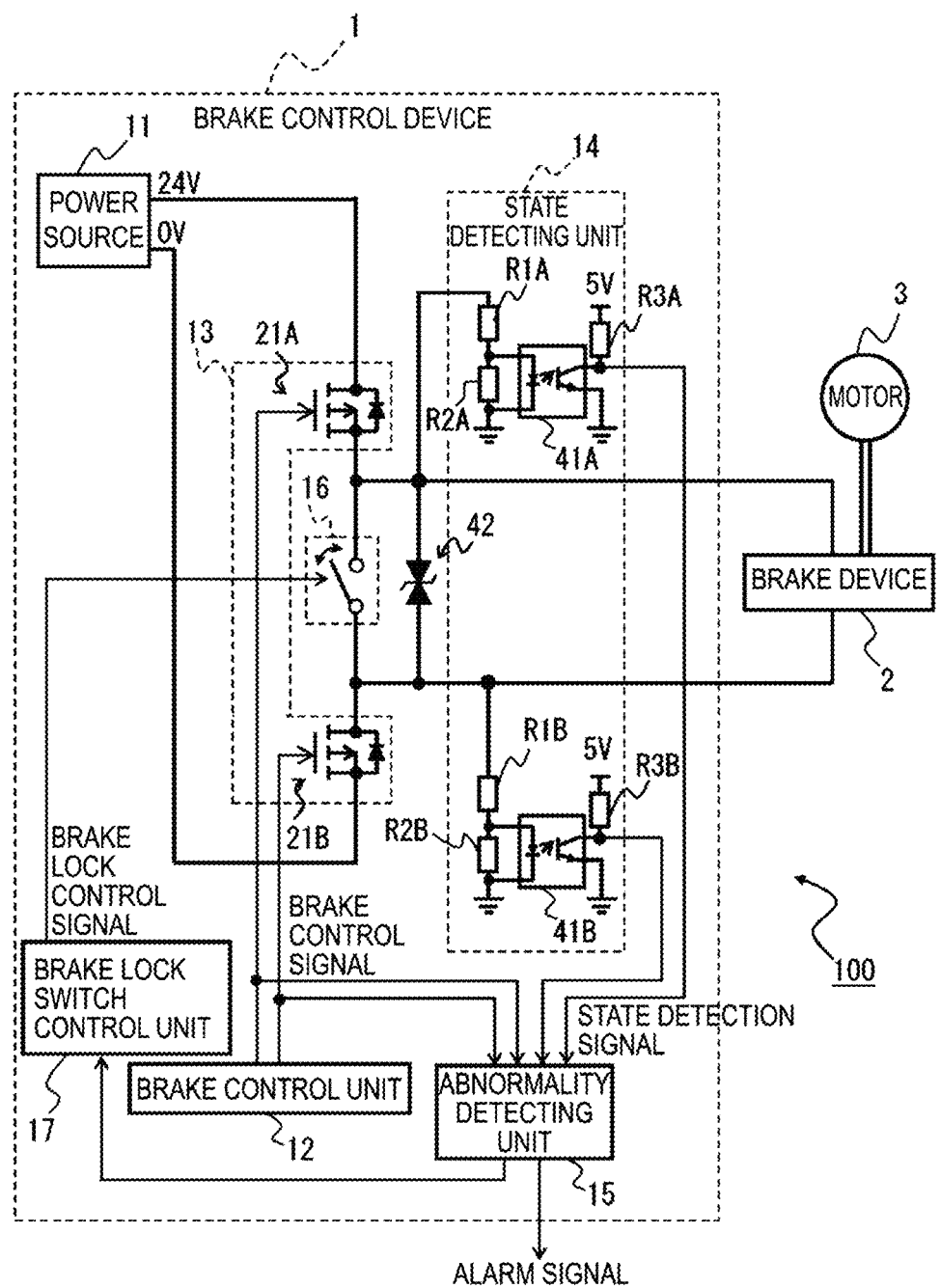
FIG. 1 is a diagram illustrating a brake control device and a motor drive device including the same according to a first embodiment of the present disclosure.

A brake control device and a motor drive device are described below with reference to the accompanying drawings. The same member is denoted with the same reference symbol in each of the drawings. These drawings are scaled as necessary for convenience of description. The embodiments illustrated in the drawings are each an example for implementation and the illustrated embodiments are not limited thereto.

FIG. 1 is a diagram illustrating a brake control device and a motor drive device including the same according to a first embodiment of the present disclosure.

A motor drive device 100 includes a non-excitation actuated type brake device 2 that actuates a brake on a motor 3 in a non-excitation state in which no voltage is applied and releases the brake on the motor 3 in an excitation state in which the voltage is applied, and a brake control device 1 that controls the brake device 2. In FIG. 1, illustration is omitted of a power source part that supplies drive power to the motor 3 and a motor control unit that controls the motor 3. The motor 3 may be an AC motor or a DC motor. Examples of machines in which the motor 3 is provided include machine tools, robots, forging machines, injection molding machines, industrial machines, various electrical appliances, trains, automobiles, and aircraft.

Figure 2A:
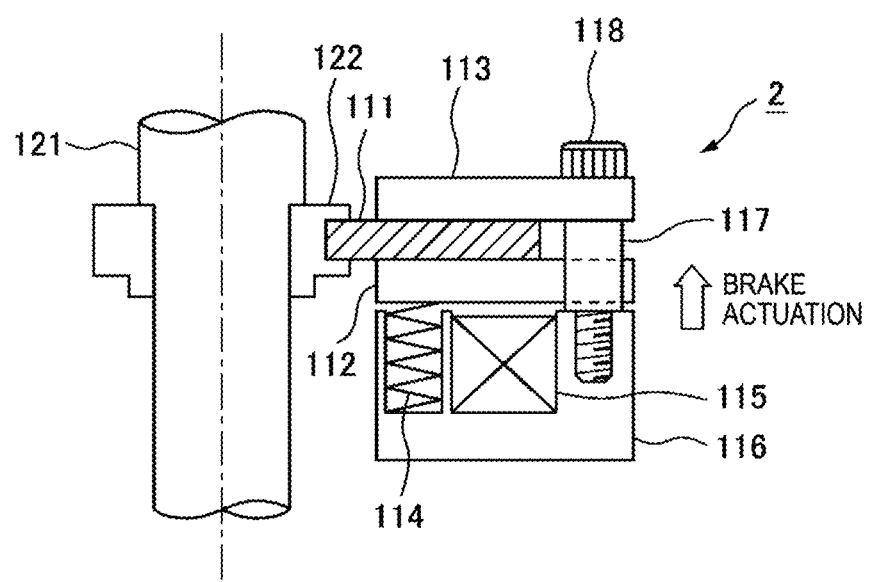
FIG. 2A is a cross-sectional view illustrating a structure of a non-excitation actuated type brake device, and illustrates a state where a brake is actuated on a motor.
Figure 2B:
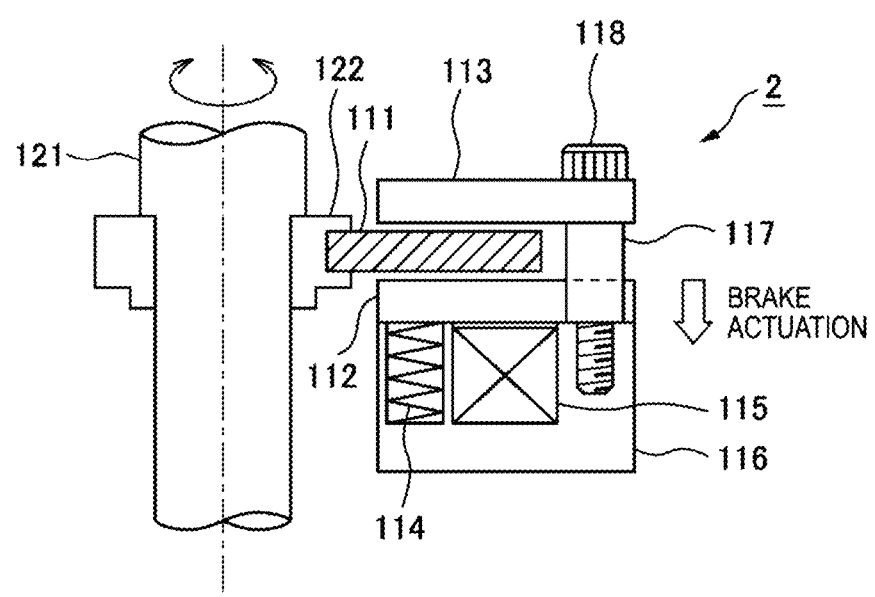
FIG. 2B is a cross-sectional view illustrating the structure of the non-excitation actuated type brake device, and illustrates a state where the brake actuated on the motor is released.

Before describing the brake control device 1 according to the first embodiment of the present disclosure, a structure of the non-excitation actuated type brake device 2 is described with reference to FIGS. 2A and 2B. FIG. 2A is a cross-sectional view illustrating the structure of the non-excitation actuated type brake device, and illustrates a state where the brake is actuated on the motor. FIG. 2B is a cross-sectional view illustrating the structure of the non-excitation actuated type brake device, and illustrates a state where the brake actuated on the motor is released. The brake device illustrated in FIGS. 2A and 2B is also applicable to first to fourth embodiments.

As illustrated in FIGS. 2A and 2B, in the non-excitation actuated type brake device 2, a friction plate 111 is disposed between an armature 112 and an end plate 113. Since a hub 122 is spline-coupled to the friction plate 111, and the hub 122 and a shaft 121 of the motor 3 are integrated with each other through shrink-fitting, the friction plate 111 rotates in conjunction with a rotation of the shaft 121 of the motor 3. The end plate 113 and a spacer 117 are coupled by a bolt 118, and the armature 112 is coupled to the spacer 117 so as to be movable in a direction toward or away from the friction plate 111. A spring 114 and a brake coil 115 are provided in a core 116. As illustrated in FIG. 2A, in a non-excitation state where no voltage is being applied to the brake coil 115, the armature 112 is strongly pressed against the friction plate 111 through an elastic force of the spring 114 and the friction plate 111 cannot rotate due to being sandwiched by the armature 112 and the end plate 113. As a result, the shaft 121 of the motor 3 coupled to the friction plate 111 can also no longer rotate, causing a where the brake is actuated on the motor 3. On the other hand, as illustrated in FIG. 2B, in an excitation state where the voltage is applied to the brake coil 115, an electromagnetic force overcoming the elastic force of the spring 114 that has pressed the armature 112 against the friction plate 111 is generated in the core 116, causing the armature 112 to be is attracted by the core 116, thus releasing the friction plate 111 from contact with the armature 112 and the end plate 113. As a result, the friction plate 111 and in turn the shaft 121 of the motor 3 are allowed to freely rotate, causing a state where the brake on the motor 3 is released.

The brake device 2 is controlled by the brake control device 1. The brake control device 1 according to the first embodiment of the present disclosure includes a power source 11, a brake control unit 12, an opening and closing unit 13, a state detecting unit 14, an abnormality detecting unit 15, a brake lock switch 16, and a brake lock switch control unit 17.

The power source 11 outputs a DC voltage. The power source 11 includes, for example, a rectifier that converts an AC voltage to a DC voltage, a switching regulator, or a battery. As an example, the power source 11 outputs a DC voltage with a voltage value of 24 V, but the power source 11 may also be a power source that outputs a DC voltage having another voltage value (e.g., 15 V, 12 V, or 5 V).

The opening and closing unit 13 is connected in series to the brake coil 115 of the brake device 2, and opens and closes an electrical path between the power source 11 and the brake device 2 in response to a received brake control signal. In the first embodiment, the opening and closing unit 13 includes at least one positive-side opening and closing switch that opens and closes an electrical path between a positive electrode terminal of the power source 11 and a positive electrode terminal of a brake device 2, and at least one negative-side opening and closing switch that opens and closes an electrical path between a negative electrode terminal of the power source 11 and a negative electrode terminal of the brake device 2. In the example illustrated in FIG. 1, the opening and closing unit 13 includes one positive-side opening and closing switch 21A and one negative-side opening and closing switch 21B as an example. While one positive-side opening and closing switch and one negative-side opening and closing switch are provided in the example illustrated in FIG. 1, two or more positive-side opening and closing switches and two or more negative-side opening and closing switches may be provided as a modified example. For example, the positive-side opening and closing switch may include two opening and closing switches connected in series, and in this case, the two opening and closing switches are controlled to open and close through the same brake control signal BSA. For example, the negative-side opening and closing switch may include three opening and closing switches connected in series, and in this case, the three opening and closing switches are controlled to open and close through the same brake control signal BSB.

The positive-side opening and closing switch 21A and the negative-side opening and closing switch 21B are normally open switches as an example. Examples of the semiconductor switching element making up the positive-side opening and closing switch 21A and the negative-side opening and closing switch 21B are FETs, IGBTs, thyristors, GTOs (Gate Turn-OFF thyristor), and transistors, but other semiconductor switching elements may also be used. The FET includes a gate, a drain, and a source as terminals thereof. The thyristor and GTO include a gate, an anode, and a cathode as terminals thereof. The transistor includes a base, an emitter, and a collector as terminals thereof. In the following, a case is described where the positive-side opening and closing switch 21A and the negative-side opening and closing switch 21B include FETs. Note that in a case where the positive-side opening and closing switch 21A and the negative-side opening and closing switch 21B include a thyristor and a GTO, each embodiment of the present disclosure is applied by reading "gate" as "base", "drain" as "anode", and "source" as "cathode". In a case where the positive-side opening and closing switch 21A and the negative-side opening and closing switch 21B include transistors, each embodiment of the present disclosure is applied by reading "gate" as "base", "drain" as "collector", and "source" as "emitter".

To eliminate instantaneous high voltage such as noise and an opening or closing surge of the opening and closing unit 13, a surge absorber 42 is connected in parallel to the brake device 2 between input terminals of the brake device 2 (i.e., between the positive electrode terminal and the negative electrode terminal of the brake device 2).

The brake control unit 12 outputs the brake control signals BSA and BSB for opening and closing the positive-side opening and closing switch 21A and the negative-side opening and closing switch 21B in the opening and closing unit 13. The brake control signals BSA and BSB output from the brake control unit 12 are sent to the positive-side opening and closing switch 21A and the negative-side opening and closing switch 21B in the opening and closing unit 13 and the abnormality detecting unit 15. Contents of a control process executed in the brake control device 1 according to the first embodiment of the present disclosure are divided into three processes, namely, a brake actuation process, a brake release preparation process, and a brake release process, and the brake control signals BSA and BSB corresponding to each process are sent to the positive-side opening and closing switch 21A and the negative-side opening and closing switch 21B. The brake actuation process, the brake release preparation process, and the brake release process in the brake control device 1 will be described in detail below.

During the execution of the brake actuation process, the brake release preparation process, and the brake release process, the state detecting unit 14 detects a potential state of an electrical path between the opening and closing unit 13 and the brake device 2, and outputs a state detection signal indicating this potential state. In the example illustrated in FIG. 1, the state detecting unit 14 outputs a state detection signal $FB_A$ indicating an potential state of an electrical path between a source of the positive-side opening and closing switch 21A in the opening and closing unit 13 and the positive electrode terminal of the brake device 2, and a state detection signal $FB_B$ indicating a potential state of an electrical path between a drain of the negative-side opening and closing switch 21B in the opening and closing unit 13 and the negative electrode terminal of the brake device 2. The state detection signal indicating the potential state of the electrical path between the opening and closing unit 13 and the brake device 2 detected by the state detecting unit 14 is sent to the abnormality detecting unit 15. In order to generate the state detection signal $FB_A$ indicating the potential state of the electrical path between the source of the positive-side opening and closing switch 21A in the opening and closing unit 13 and the positive electrode terminal of the brake device 2, the state detecting unit 14 includes, for example, a photocoupler 41A, voltage divider resistors R1A and R2A, and a pull-up resistor R3A. One end of the voltage divider resistor R1A is connected to the electrical path connecting the source of the positive-side opening and closing switch 21A and the positive electrode terminal of the brake device 2, and the other end of the voltage divider resistor R1A is connected to one end of the voltage divider resistor R2A. The other end of the voltage divider resistor R2A is grounded. A light-emitting element in the photocoupler 41A is connected in parallel to the voltage divider resistor R2A. One end of a light-receiving element in the photocoupler 41A is connected to the pull-up resistor R3A, and the other end of the light-receiving element in the photocoupler 41A is grounded. In order to generate the state detection signal $FB_B$ indicating the potential state of the electrical path between the drain of the negative-side opening and closing switch 21B in the opening and closing unit 13 and the negative electrode terminal of the brake device 2, the state detecting unit 14 includes, for example, a photocoupler 41B, voltage divider resistors R1B and R2B, and a pull-up resistor R3B. One end of the voltage divider resistor R1B is connected to the electrical path connecting the negative electrode terminal of the brake device 2 and the drain of the negative-side opening and closing switch 21B, and the other end of the voltage divider resistor R1B is connected to one end of the voltage divider resistor R2B. The other end of the voltage divider resistor R2B is grounded. A light-emitting element in the photocoupler 41B is connected in parallel to the voltage divider resistor R2B. One end of a light-receiving element in the photocoupler 41B is connected to the pull-up resistor R3B, and the other end of the light-receiving element in the photocoupler 41B is grounded. Note that the state detecting unit 14 includes photocouplers and various resistors in the example illustrated in FIG. 1, but as an alternative example, the state detecting unit 14 may include a power source that outputs a reference voltage for isolating a High state and a Low state (the reference voltage may be generated using a method such as resistor division instead of using the power source), and a comparator that compares the reference voltage and voltage applied to the voltage divider resistor R2A or R2B and outputs a High signal or a Low signal based on a result of the comparison.

The abnormality detecting unit 15 detects whether or not an abnormality occurs, based on a combination of contents of the brake control signal and contents of the state detection signal. During the execution of the brake actuation process and during the execution of the brake release preparation process, the abnormality detecting unit 15 detects whether or not an abnormality occurs, based on the combination of the contents of the brake control signal and the contents of the state detection signal. A detection result of the abnormality detecting unit 15 is sent to the brake lock switch control unit 17. An abnormality detection process by the abnormality detecting unit 15 will be described in detail below.

An abnormality detected by the abnormality detecting unit 15 includes a short circuit failure of the positive-side opening and closing switch 21A, a short circuit failure of the negative-side opening and closing switch 21B, a short circuit of a cable making up the electrical path from the source of the positive-side opening and closing switch 21A to the positive electrode terminal of the brake device 2 and an external circuit, a short circuit of a cable making up the electrical path from the negative electrode terminal of the brake device 2 to the drain of the negative-side opening and closing switch 21B and an external circuit, and a failure of the state detecting unit 14. For example, in a case where the positive-side opening and closing switch 21A does not respond to a received open command due to a failure of a drive circuit of the positive-side opening and closing switch 21A, causing the positive-side opening and closing switch 21A to remain in a closed state, the failure can be regarded as "the short circuit failure of the positive-side opening and closing switch 21A". Likewise, in a case where the negative-side opening and closing switch 21B does not respond to a received open command due to a failure of a drive circuit of the negative-side opening and closing switch 21B, causing the negative-side opening and closing switch 21B to remain in a closed state, the failure can be regarded as "the short circuit failure of the negative-side opening and closing switch 21B".

The abnormality detecting unit 15 has a function of outputting an alarm signal when the occurrence of an abnormality is detected. The alarm signal output from the abnormality detecting unit 15 is sent to, for example, a display part (not illustrated), and the display part, for example, notifies an operator of an "abnormality occurrence". Examples of the display part include a single display device, a display device attached to the motor drive device 100, a display device attached to a host controller (not illustrated), and a display device attached to a personal computer and a mobile terminal. For example, the alarm signal output from the abnormality detecting unit 15 is sent to, for example, a light-emitting device (not illustrated) such as an LED or a lamp, the light-emitting device notifying the operator of an "abnormality occurrence" by emitting light when receiving the alarm signal. For example, the alarm signal output from the abnormality detecting unit 15 is sent to, for example, an acoustic device (not illustrated), the acoustic device notifying the operator of an "abnormality occurrence" by emitting a sound such as speech, a speaker, a buzzer, or a chime when receiving the alarm signal. In this manner, the operator can reliably and easily recognize the occurrence of an abnormality. The operator can also, for example, easily takes measures such as replacing components related to the abnormality or removing the cause of the abnormality. The alarm signal output from the abnormality detecting unit 15 may be used for an emergency stop process of the motor drive device 100.

The brake lock switch 16 is connected in parallel to the brake device 2 between the input terminals of the brake device 2 (i.e., between the positive electrode terminal and the negative electrode terminal of the brake device 2), and opens and closes an electrical path in response to a brake lock control signal received from the brake lock switch control unit 17. The brake lock switch 16 may include a semiconductor switching element, or a mechanical switch such as a relay. Examples of the semiconductor switching element making up the brake lock switch 16 include FETs, IGBTs, thyristors, GTOs, and transistors, but other semiconductor switching elements may also be used. The brake lock switch 16 is a normally off relay as an example.

The brake lock switch control unit 17 outputs, as a brake lock control signal LS for the brake lock switch 16, a close signal for controlling the brake lock switch 16 to close when the occurrence of an abnormality is detected by the abnormality detecting unit 15, and outputs an open signal for controlling the brake lock switch 16 to open when the occurrence of an abnormality is not detected by the abnormality detecting unit 15.

An arithmetic processing device (processor) is provided in the brake control device 1. The arithmetic processing device includes the brake control unit 12, the abnormality detecting unit 15, and the brake lock switch control unit 17. Each unit included in the arithmetic processing device is, for example, a function module achieved through a computer program executed by the processor. For example, in a case where the brake control unit 12, the abnormality detecting unit and the brake lock switch control unit 17 are assembled in the form of a computer program, the function of each unit can be achieved by operating the arithmetic processing device in accordance with the computer program. The computer program for executing each process of the brake control unit 12, the abnormality detecting unit 15 and the brake lock switch control unit 17 may be provided in the form of being recorded on a computer-readable recording medium such as a semiconductor memory, a magnetic recording medium or an optical recording medium. Alternatively, the brake control unit 12, the abnormality detecting unit 15 and/or the brake lock switch control unit 17 may be achieved as a semiconductor integrated circuit in which computer programs for achieving the function of each unit is written.

Subsequently, a brake control process and a state detection process in the brake control device 1 according to the first embodiment of the present disclosure are described.

FIG. 3 is a diagram for describing each signal and brake state in a normal state in the brake control device according to the first embodiment of the present disclosure. Note that the "brake control signal" is denoted as "brake signal" in FIG. 3 for the sake of simplifying the drawing.

The contents of the control process executed in the brake control device 1 in the first embodiment of the present disclosure are divided into three processes, namely, the brake actuation process, the brake release preparation process, and the brake release process. A state where the brake of the brake device 2 on motor 3 is actuated is achieved when the brake control unit 12 executes the brake actuation process. A state where the brake of the brake device 2 on motor 3 is released is achieved when the brake control unit 12 executes the brake release process. When releasing the brake being actuated on the motor 3, the brake actuation process is terminated to execute the brake release preparation process, and subsequently the brake release preparation process is terminated to execute the brake release process. When actuating the brake on the motor 3 from the state where the brake on the motor 3 is released, the brake release process is terminated to execute the brake actuation process.

The brake actuation process, the brake release preparation process, and the brake release process executed in the brake control device 1 in the first embodiment are described in more detail as follows. In the following description, the positive-side opening and closing switch 21A and the negative-side opening and closing switch 21B are normally open switches as an example.

In the brake actuation process, the brake control unit 12 outputs the brake control signals BSA and BSB for controlling the positive-side opening and closing switch 21A and the negative-side opening and closing switch 21B to open. Since the positive-side opening and closing switch 21A and the negative-side opening and closing switch 21B are normally open switches, the brake control unit 12 outputs a Low signal as the brake control signal BSA for the positive-side opening and closing switch 21A and a Low signal as the brake control signal BSB for the negative-side opening and closing switch 21B. When there is no abnormality in the positive-side opening and closing switch 21A and the negative-side opening and closing switch 21B and devices related to these switches, the brake lock switch control unit 17 outputs the open signal as the brake lock switch control signal LS for the brake lock switch 16 since the abnormality detecting unit 15 does not detect the occurrence of an abnormality, and thus, the brake lock switch 16 is opened. Since the positive-side opening and closing switch 21A and the negative-side opening and closing switch 21B are opened through the brake actuation process, an electrical path from the positive electrode terminal of the power source 11 to the negative electrode terminal of the power source 11 via the brake device 2 is blocked. Accordingly, when there is no abnormality in the positive-side opening and closing switch 21A, the negative-side opening and closing switch 21B and the devices related to these switches, the voltage of the power source 11 is not applied to the brake coil 115 of the brake device 2 due to the brake control unit 12 executing the brake actuation process. Thus, as illustrated in FIG. 2A, the armature 112 is strongly pressed against the friction plate 111 through the elastic force of the spring 114, the friction plate 111 is sandwiched by the armature 112 and the end plate 113, and cannot rotate, consequently, the shaft 121 of the motor 3 coupled to the friction plate 111 can also no longer rotate, causing the state where the brake is actuated on the motor 3. Since no current flows through the voltage divider resistors R1A and R2A and the voltage divider resistors R1B and R2B in the state detecting unit 14, the light-emitting elements in the photocouplers 41A and 41B do not emit light, and consequently output sides of the photocouplers 41A and 41B are High. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both High.

The brake release preparation process is executed between the brake actuation process and the brake release process when transitioning from the brake actuation process to the brake release process. In the brake release preparation process, the brake control unit 12 outputs the brake control signals BSA and BSB for controlling the positive-side opening and closing switch 21A to close and the negative-side opening and closing switch 21B to open. Since the positive-side opening and closing switch 21A and the negative-side opening and closing switch 21B are normally open switches, the brake control unit 12 outputs a High signal as the brake control signal BSA for the positive-side opening and closing switch 21A and a Low signal as the brake control signal BSB for the negative-side opening and closing switch 21B. When there is no abnormality in the positive-side opening and closing switch 21A and the negative-side opening and closing switch 21B and devices related to these switches, the brake lock switch control unit 17 outputs the open signal as the brake lock switch control signal LS for the brake lock switch 16 since the abnormality detecting unit 15 does not detect the occurrence of an abnormality, and thus, the brake lock switch 16 is opened. Since the positive-side opening and closing switch 21A is closed, but the negative-side opening and closing switch 21B is opened, the electrical path from the positive electrode terminal of the power source 11 to the negative electrode terminal of the power source 11 via the brake device 2 is blocked. Accordingly, when there is no abnormality in the positive-side opening and closing switch 21A and the negative-side opening and closing switch 21B and the devices related to these switches, the voltage of the power source 11 is not applied to the brake coil 115 of the brake device 2 due to the brake release preparation process being executed. Thus, as illustrated in FIG. 2A, the armature 112 is strongly pressed against the friction plate 111 through the elastic force of the spring 114, the friction plate 111 is sandwiched by the armature 112 and the end plate 113, and cannot rotate, consequently, the shaft 121 of the motor 3 coupled to the friction plate 111 can also no longer rotate, causing the state where the brake is actuated on the motor 3. The electrical path from the positive electrode terminal of the power source 11 to the drain of the negative-side opening and closing switch 21B via the positive-side opening and closing switch 21A and the brake device 2 has the same potential as the voltage output by the positive electrode terminal of the power source 11 (in the example illustrated in FIG. 1, 24 V). Thus, since the current flows through the voltage divider resistors R1A and R2A and the voltage divider resistors R1B and R2B in the state detecting unit 14, the light-emitting elements in the photocouplers 41A and 41B emit light, and consequently the output sides of the photocouplers 41A and 41B are Low. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both Low.

In the brake release process, the brake control unit 12 outputs the brake control signals BSA and BSB for controlling the positive-side opening and closing switch 21A and the negative-side opening and closing switch 21B to close. Since the positive-side opening and closing switch 21A and the negative-side opening and closing switch 21B are normally open switches, the brake control unit 12 outputs a High signal as the brake control signal BSA for the positive-side opening and closing switch 21A and a High signal as the brake control signal BSB for the negative-side opening and closing switch 21B. When there is no abnormality in the positive-side opening and closing switch 21A and the negative-side opening and closing switch 21B and devices related to these switches, the brake lock switch control unit 17 outputs the open signal as the brake lock switch control signal LS for the brake lock switch 16 since the abnormality detecting unit 15 does not detect the occurrence of an abnormality, and thus, the brake lock switch 16 is opened. Since the positive-side opening and closing switch 21A and the negative-side opening and closing switch 21B are closed through the brake release process, the electrical path from the positive electrode terminal of the power source 11 to the negative electrode terminal of the power source 11 via the brake device 2 is formed. Accordingly, when there is no abnormality in the positive-side opening and closing switch 21A and the negative-side opening and closing switch 21B and the devices related to these switches, the voltage of the power source 11 is applied to the brake coil 115 of the brake device 2 due to the brake release process being executed. Thus, as illustrated in FIG. 2B, the electromagnetic force overcoming the elastic force of the spring 114 that has pressed the armature 112 against the friction plate 111 is generated in the core 116, causing the armature 112 to be attracted by the core 116, thus releasing the friction plate 111 from the contact with the armature 112 and the end plate 113. As a result, the friction plate 111 and in turn the shaft 121 of the motor 3 are allowed to freely rotate, causing the state where the brake on the motor 3 is released. The electrical path from the positive electrode terminal of the power source 11 to the positive electrode terminal of the brake device 2 via the positive-side opening and closing switch 21A has the same potential as the voltage output by the positive electrode terminal of the power source 11. Thus, since the current flows through the voltage divider resistors R1A and R2A in the state detecting unit 14, the light-emitting element in the photocoupler 41A emits light, and consequently the output side of the photocoupler 41A is Low. Thus, the state detection signal $FB_A$ indicating the potential state of the electrical path between the source of the positive-side opening and closing switch 21A and the positive electrode terminal of the brake device 2 is Low. The electrical path from the negative electrode terminal of the brake device 2 to the negative electrode terminal of the power source 11 via the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High.

The contents of the state detection signals $FB_A$ and $FB_B$ in the brake actuation process, the brake release preparation process, and the brake release process in the above-described case where there is no abnormality in the positive-side opening and closing switch 21A, the negative-side opening and closing switch 21B and the devices related to these switches, i.e., in the normal state, are stored in advance in the abnormality detecting unit 15 so as to be available for the abnormality detection process described below.

Subsequently, the abnormality detection process in the brake control device 1 according to the first embodiment of the present disclosure is described. In the following description, the positive-side opening and closing switch 21A and the negative-side opening and closing switch 21B are normally open switches as an example.

FIG. 4A is a diagram for describing each signal and brake state during a failure in the brake control device according to the first embodiment of the present disclosure, and illustrates each signal and brake state when only the positive-side opening and closing switch experiences a short circuit failure. FIG. 4B is a diagram for describing each signal and brake state in a case of a failure in the brake control device according to the first embodiment of the present disclosure, and illustrates each signal and brake state when only the negative-side opening and closing switch experiences a short circuit failure in a case where a brake lock switch control is not performed. FIG. 4C is a diagram for describing each signal and brake state during a failure in the brake control device according to the first embodiment of the present disclosure, and illustrates each signal and brake state when only the negative-side opening and closing switch experiences a short circuit failure in a case where the brake lock switch control is performed. Note that the "brake control signal" is denoted as "brake signal" in FIGS. 4A, 4B, and 4C for the sake of simplifying the drawings.

FIG. 4A is a diagram illustrating each signal and brake state when the positive-side opening and closing switch 21A experiences a short circuit failure in the brake control device 1 according to the first embodiment of the present disclosure. As illustrated in FIG. 4A, in the brake actuation process, the brake control unit 12 outputs a Low signal being the open command as the brake control signal BSA for the positive-side opening and closing switch 21A, and a Low signal being the open command as the brake control signal BSB for the negative-side opening and closing switch 21B. At this time, when the positive-side opening and closing switch 21A experiences a short circuit failure, the positive-side opening and closing switch 21A remains in the closed state even when the Low signal being the open command as the brake control signal BSA is output for the positive-side opening and closing switch 21A. On the other hand, in response to outputting the Low signal being the open command as the brake control signal BSB for the negative-side opening and closing switch 21B, the negative-side opening and closing switch 21B is caused to be in the opened state. Accordingly, when the positive-side opening and closing switch 21A experiences a short circuit failure, the electrical path from the positive electrode terminal of the power source 11 to the drain of the negative-side opening and closing switch 21B via the positive-side opening and closing switch 21A and the brake device 2 is formed during the brake actuation process period. However, since the negative-side opening and closing switch 21B is open, the voltage is not applied to the brake device 2. This causes the state where the brake is actuated on the motor 3. The electrical path from the positive electrode terminal of the power source 11 to the drain of the negative-side opening and closing switch 21B via the positive-side opening and closing switch 21A and the brake device 2 has the same potential as the voltage output by the positive electrode terminal of the power source 11. Thus, since the current flows through the voltage divider resistors R1A and R2A and the voltage divider resistors R1B and R2B in the state detecting unit 14, the light-emitting elements in the photocouplers 41A and 41B emit light, and consequently the output sides of the photocouplers 41A and 41B are Low. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both Low. In this manner, during the execution of the brake actuation process, when there is no abnormality in the positive-side opening and closing switch 21A, the negative-side opening and closing switch 21B, and the devices related to these switches, the state detection signal $FB_A$ and the state detection signal $FB_B$ are both High, but when a short circuit failure of the positive-side opening and closing switch 21A has occurred, the state detection signal $FB_A$ and the state detection signal $FB_B$ are both Low. During the execution of the brake actuation process, the abnormality detecting unit 15 detects whether or not an abnormality occurs, based on the combination of the contents of the brake control signals BSA and BSB and the contents of the state detection signals $FB_A$ and $FB_B$. More specifically, during the execution of the brake actuation process, the abnormality detecting unit 15 determines that no abnormality occurs occurrence when the brake control signals BSA and BSB are both Low and the state detection signals $FB_A$ and $FB_B$ are both High, and determines that an abnormality occurs (i.e., a short circuit failure of the positive-side opening and closing switch 21A) when the brake control signals BSA and BSB are both Low and the state detection signals $FB_A$ and $FB_B$ are both Low. When the occurrence of an abnormality is detected during the execution of the brake actuation process, the abnormality detecting unit 15 outputs the alarm signal.

FIG. 4B is a diagram illustrating each signal and brake state when only the negative-side opening and closing switch 21B experiences a short circuit failure in the case where the brake lock switch control is not performed. As illustrated in FIG. 4B, in the case where the positive-side opening and closing switch 21A is in a normal state and only the negative-side opening and closing switch 21B experiences a short circuit failure, the state detection signals $FB_A$ and $FB_B$ are both High during the execution of the brake actuation process, and the state detection signal FB A is Low and the state detection signal $FB_B$ is High during the execution of the brake release preparation process. During the execution of the brake release preparation process, since the negative-side opening and closing switch 21B experiences a short circuit failure regardless of the Low signal being the open command being output as the brake control signal BSB for the negative-side opening and closing switch 21B, the negative-side opening and closing switch 21B is caused to be in the closed state. Accordingly, when the negative-side opening and closing switch 21B experiences a short circuit failure, the electrical path from the positive electrode terminal of the power source 11 to the negative electrode terminal of the power source 11 via the positive-side opening and closing switch 21A, the brake device 2, and the negative-side opening and closing switch 21B is formed during the brake release preparation process period. As a result, the voltage of the power source 11 is applied to the brake coil 115 of the brake device 2, and there is the risk of causing the state where the brake that is normally actuated is released. The electrical path from the negative electrode terminal of the brake device 2 to the drain of the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High. On the other hand, the electrical path from the positive electrode terminal of the power source 11 to the positive electrode terminal of the brake device 2 via the positive-side opening and closing switch 21A has the same potential as the voltage output by the positive electrode terminal of the power source 11. Thus, since the current flows through the voltage divider resistors R1A and R2A in the state detecting unit 14, the light-emitting element of the photocoupler 41A emits light, and consequently the output side of the photocoupler 41A is Low. Thus, the state detection signal $FB_A$ indicating the potential state of the electrical path between the source of the positive-side opening and closing switch 21A and the positive electrode terminal of the brake device 2 is Low. In this manner, during the execution of the brake release preparation process, the state detection signal $FB_A$ and the state detection signal $FB_B$ are both Low when there is no abnormality in the positive-side opening and closing switch 21A, the negative-side opening and closing switch 21B and the devices related to these switches, but when only the negative-side opening and closing switch 21B experiences a short circuit failure, the state detection signal $FB_A$ is Low and the state detection signal $FB_B$ is High. During the execution of the brake release preparation process, the abnormality detecting unit 15 detects whether or not an abnormality occurs, based on the combination of the contents of the brake control signals BSA and BSB and the contents of the state detection signals $FB_A$ and $FB_B$. More specifically, during the execution of the brake release preparation process, the abnormality detecting unit 15 determines that no abnormality occurs when the brake control signal BSA is High, the brake control signal BSB is Low, and the state detection signals $FB_A$ and $FB_B$ are both Low, and the brake control unit 12 terminates the brake release preparation process and executes the brake release process. During the execution of the brake release preparation process, the abnormality detecting unit 15 determines that an abnormality occurs (i.e., the short circuit failure of the negative-side opening and closing switch 21B) when the brake control signal BSA is High, the brake control signal BSB is Low, the state detection signal $FB_A$ is Low, and the state detection signal $FB_B$ is High.

Note that when a short circuit failure of the negative-side opening and closing switch 21B occurs during the brake release preparation process period, a dangerous state where the brake on the motor 3 is released may occur, therefore, a time period during which the brake release preparation process is executed may be set to be shorter than a response time of the brake device 2 to a brake command. By setting the time period during which the brake release preparation process is executed in this manner, even when a short circuit failure of the negative-side opening and closing switch 21B has occurred, the short circuit failure of the negative-side opening and closing switch 21B can be detected while avoiding the release of the brake of the brake device 2 on the motor 3.

FIG. 4C is a diagram illustrating each signal and brake state when only the negative-side opening and closing switch 21B experiences a short circuit failure in the case where the brake lock switch control is performed according to the first embodiment of the present disclosure. As described above with reference to FIG. 4B, when the state detection signals $FB_A$ and $FB_B$ are both High during the execution of the brake actuation process, and the state detection signal $FB_A$ is Low and the state detection signal $FB_B$ is High during the execution of the brake release preparation process, the abnormality detecting unit 15 determines that an abnormality occurs (i.e., the short circuit failure of the negative-side opening and closing switch 21B). In this case, when the short circuit failure of the negative-side opening and closing switch 21B occurs during the execution of the brake release preparation process, the abnormality detecting unit 15 outputs the alarm signal since the state occurs where the brake that is normally actuated is released. As illustrated in FIG. 4C, when the abnormality detecting unit 15 detects the occurrence of an abnormality during the brake release preparation process period, the brake lock switch control unit 17 outputs the close signal for controlling the brake lock switch 16 to close as the brake lock control signal LS for the brake lock switch 16. In this manner, the brake lock switch 16 is closed, and a short circuit is made between the input terminals of the brake device 2 (i.e., between the positive electrode terminal and the negative electrode terminal of the brake device 2), and therefore, the voltage of the power source 11 is not applied to the brake coil 115 of the brake device 2. This causes the state where the brake is actuated on the motor 3. In this manner, it is possible to avoid releasing the brake when an abnormality occurs (when the negative-side opening and closing switch 21B experiences a short circuit failure).

FIG. 5A is a diagram for describing each signal and brake state when both the positive-side opening and closing switch and the negative-side opening and closing switch have a short circuit failure in the brake control device according to the first embodiment of the present disclosure, and illustrates each signal and brake state when both the positive-side opening and closing switch and the negative-side opening and closing switch have a short circuit failure in the case where the brake lock switch control is not performed. FIG. 5B is a diagram for describing each signal and brake state when both the positive-side opening and closing switch and the negative-side opening and closing switch have a short circuit failure in the brake control device according to the first embodiment of the present disclosure, and illustrates each signal and brake state when both the positive-side opening and closing switch and the negative-side opening and closing switch have a short circuit failure in the case where the brake lock switch control is performed. Note that the "brake control signal" is denoted as "brake signal" in FIGS. 5A and 5B for the sake of simplifying the drawings.

FIG. 5A is a diagram illustrating each signal and brake state when both the positive-side opening and closing switch 21A and the negative-side opening and closing switch 21B have a short circuit failure in a case where the brake lock switch control is not performed. As illustrated in FIG. 5A, in a case where both the positive-side opening and closing switch 21A and the negative-side opening and closing switch 21B have a short circuit failure, even when the Low signal being the open command is output as the brake control signal BSA for the positive-side opening and closing switch 21A and the Low signal being the open command is output as the brake control signal BSB for the negative-side opening and closing switch 21B through the brake actuation process, both the positive-side opening and closing switch 21A and the negative-side opening and closing switch 21B are caused to be in the closed state. Accordingly, the electrical path from the positive electrode terminal of the power source 11 to the negative electrode terminal of the power source 11 via the positive-side opening and closing switch 21A, the brake device 2 and the negative-side opening and closing switch 21B is formed. As a result, the voltage of the power source 11 is applied to the brake coil 115 of the brake device 2, and there is the risk of causing the state where the brake on the motor 3 that is normally actuated is released. The electrical path from the positive electrode terminal of the power source 11 to the positive electrode terminal of the brake device 2 via the positive-side opening and closing switch 21A has the same potential as the voltage output by the positive electrode terminal of the power source 11. Thus, since the current flows through the voltage divider resistors R1A and R2A in the state detecting unit 14, the light-emitting element of the photocoupler 41A emits light, and consequently the output side of the photocoupler 41A is Low. Thus, the state detection signal $FB_A$ indicating the potential state of the electrical path between the source of the positive-side opening and closing switch 21A and the positive electrode terminal of the brake device 2 is Low. On the other hand, the electrical path from the negative electrode terminal of the brake device 2 to the drain of the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High. In this manner, during the brake actuation process period, when there is no abnormality in the positive-side opening and closing switch 21A, the negative-side opening and closing switch 21B and the devices related to these switches, the state detection signal $FB_A$ and the state detection signal FB B are both High, but when both the positive-side opening and closing switch 21A and the negative-side opening and closing switch 21B have a short circuit failure, the state detection signal $FB_A$ is Low and the state detection signal FB B is High.

In the case where there is a short circuit failure in both the positive-side opening and closing switch 21A and the negative-side opening and closing switch 21B, even when the High signal being the open command is output as the brake control signal BSA for the positive-side opening and closing switch 21A and the Low signal being the open command is output as the brake control signal BSB for the negative-side opening and closing switch 21B through the brake release preparation process, both the positive-side opening and closing switch 21A and the negative-side opening and closing switch 21B are caused to be in the closed state. Accordingly, the electrical path from the positive electrode terminal of the power source 11 to the negative electrode terminal of the power source 11 via the positive-side opening and closing switch 21A, the brake device 2 and the negative-side opening and closing switch 21B is formed. As a result, the voltage of the power source 11 is applied to the brake coil 115 of the brake device 2, and there is the risk of causing the state where the brake on the motor 3 that is normally actuated is released. The electrical path from the positive electrode terminal of the power source 11 to the positive electrode terminal of the brake device 2 via the positive-side opening and closing switch 21A has the same potential as the voltage output by the positive electrode terminal of the power source 11. Thus, since the current flows through the voltage divider resistors R1A and R2A in the state detecting unit 14, the light-emitting element of the photocoupler 41A emits light, and consequently the output side of the photocoupler 41A is Low. Thus, the state detection signal $FB_A$ indicating the potential state of the electrical path between the source of the positive-side opening and closing switch 21A and the positive electrode terminal of the brake device 2 is Low. On the other hand, the electrical path from the negative electrode terminal of the brake device 2 to the drain of the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High. In this manner, during the execution of the brake release preparation process, when there is no abnormality in the positive-side opening and closing switch 21A, the negative-side opening and closing switch 21B and the devices related to these switches, the state detection signal $FB_A$ and the state detection signal $FB_B$ are both High, but when both the positive-side opening and closing switch 21A and the negative-side opening and closing switch 21B have a short circuit failure, the state detection signal $FB_A$ is Low and the state detection signal $FB_B$ is High.

In this manner, when a short circuit failure of both the positive-side opening and closing switch 21A and the negative-side opening and closing switch 21B has occurred, the state detection signals $FB_A$ and $FB_B$ have a signal state different from the normal state both during the execution of the brake actuation process and during the execution of the brake release preparation process of the brake control unit 12.

FIG. 5B is a diagram illustrating each signal and brake state when both the positive-side opening and closing switch 21A and the negative-side opening and closing switch 21B have a short circuit failure in a case where the brake lock switch control is performed according to the first embodiment of the present disclosure. As described with reference to FIG. 5A, in the case where the abnormality detecting unit 15 detects the occurrence of an abnormality both during the execution of the brake actuation process and during the execution of the brake release preparation process, both the positive-side opening and closing switch 21A and the negative-side opening and closing switch 21B have a short circuit failure, and since the brake that is normally actuated through the brake actuation process and the brake release preparation process is now in a released state, the abnormality detecting unit 15 outputs the alarm signal. As illustrated in FIG. 5B, When the abnormality detecting unit 15 detects the occurrence of an abnormality during the execution of the brake actuation process and during the execution of the brake release preparation process, the brake lock switch control unit 17 outputs the close signal for controlling the brake lock switch 16 to close as the brake lock control signal LS for the brake lock switch 16. In this manner, the brake lock switch 16 is closed, and a short circuit is made between the input terminals of the brake device 2 (i.e., between the positive electrode terminal and the negative electrode terminal of the brake device 2), and therefore, the voltage of the power source 11 is not applied to the brake coil 115 of the brake device 2. This causes the state where the brake is actuated on the motor 3. In this manner, it is possible to avoid a situation where the release of the brake is continued when an abnormality occurs (when the positive-side opening and closing switch 21A and the negative-side opening and closing switch 21B have a short circuit failure).

The abnormality detecting unit 15 can detect short circuit failures other than the above-described short circuit failure of the positive-side opening and closing switch 21A and/or the negative-side opening and closing switch 21B, namely a short circuit of the cable making up the electrical path from the source of the positive-side opening and closing switch 21A to the positive electrode terminal of the brake device 2 and an external circuit, and a short circuit of the cable making up the electrical path from the negative electrode terminal of the brake device 2 to the drain of the negative-side opening and closing switch 21B and an external circuit. Such failures are described below.

Figure 6:
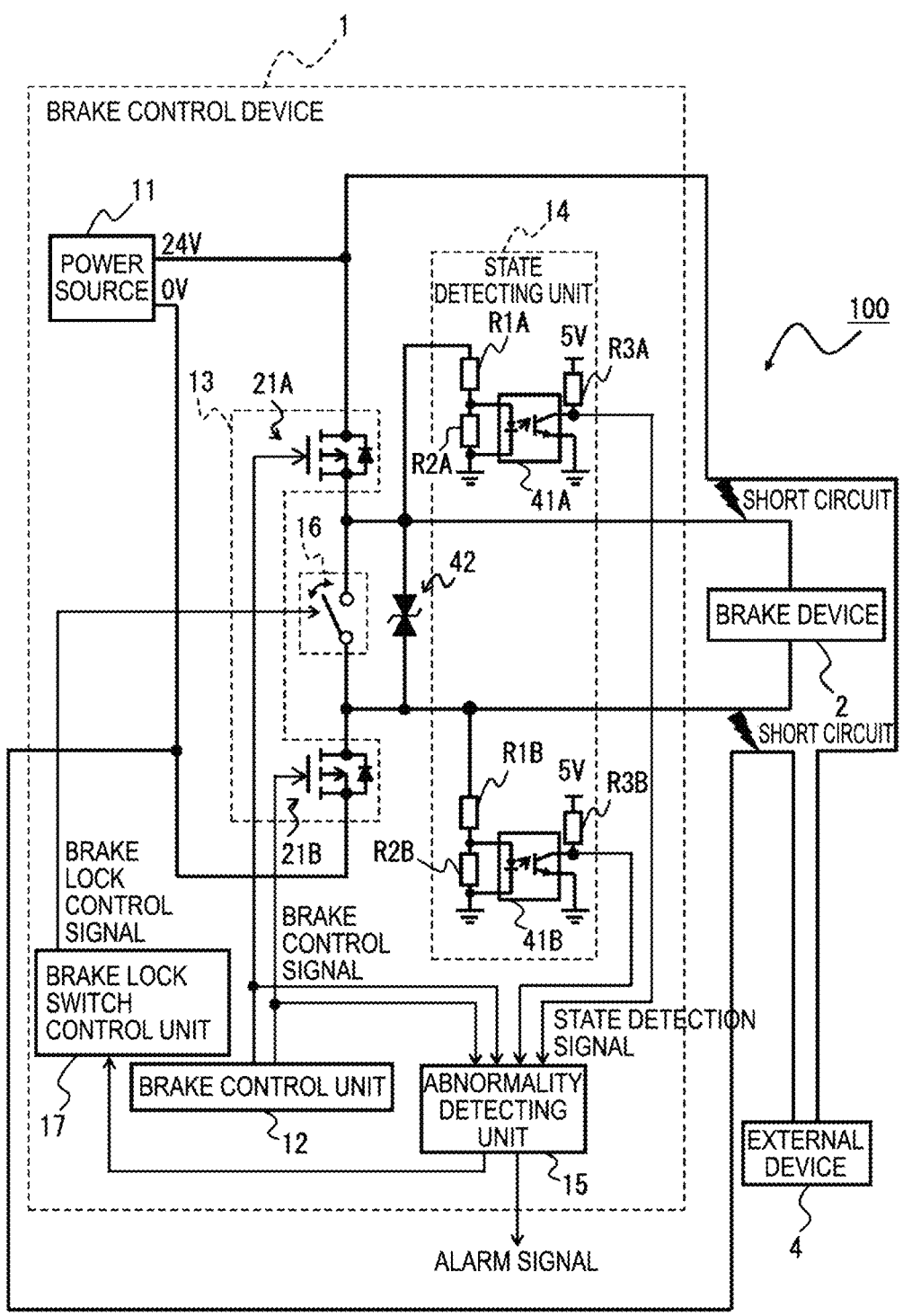
FIG. 6 is a diagram illustrating an example of a short circuit of an external circuit and a cable connecting the brake control device and the brake device according to the first embodiment of the present disclosure (Part 1).

FIG. 6 is a diagram illustrating an example of a short circuit of an external circuit and a cable connecting the brake control device and the brake device according to the first embodiment of the present disclosure (Part 1). As illustrated in FIG. 6, the brake device 2 and an external device 4 may share the power source 11. In this case, the cable connecting the positive electrode terminal of the power source 11 and a positive electrode terminal of the external device 4 may be short-circuited by making contact with the brake cable connecting the positive electrode terminal of the brake device 2 and the source of the positive-side opening and closing switch 21A, and the cable connecting the negative electrode terminal of the power source 11 and the positive electrode terminal of the external device 4 may be short-circuited by making contact with the brake cable connecting the negative electrode terminal of the brake device 2 and the drain of the negative-side opening and closing switch 21B.

Figure 7:
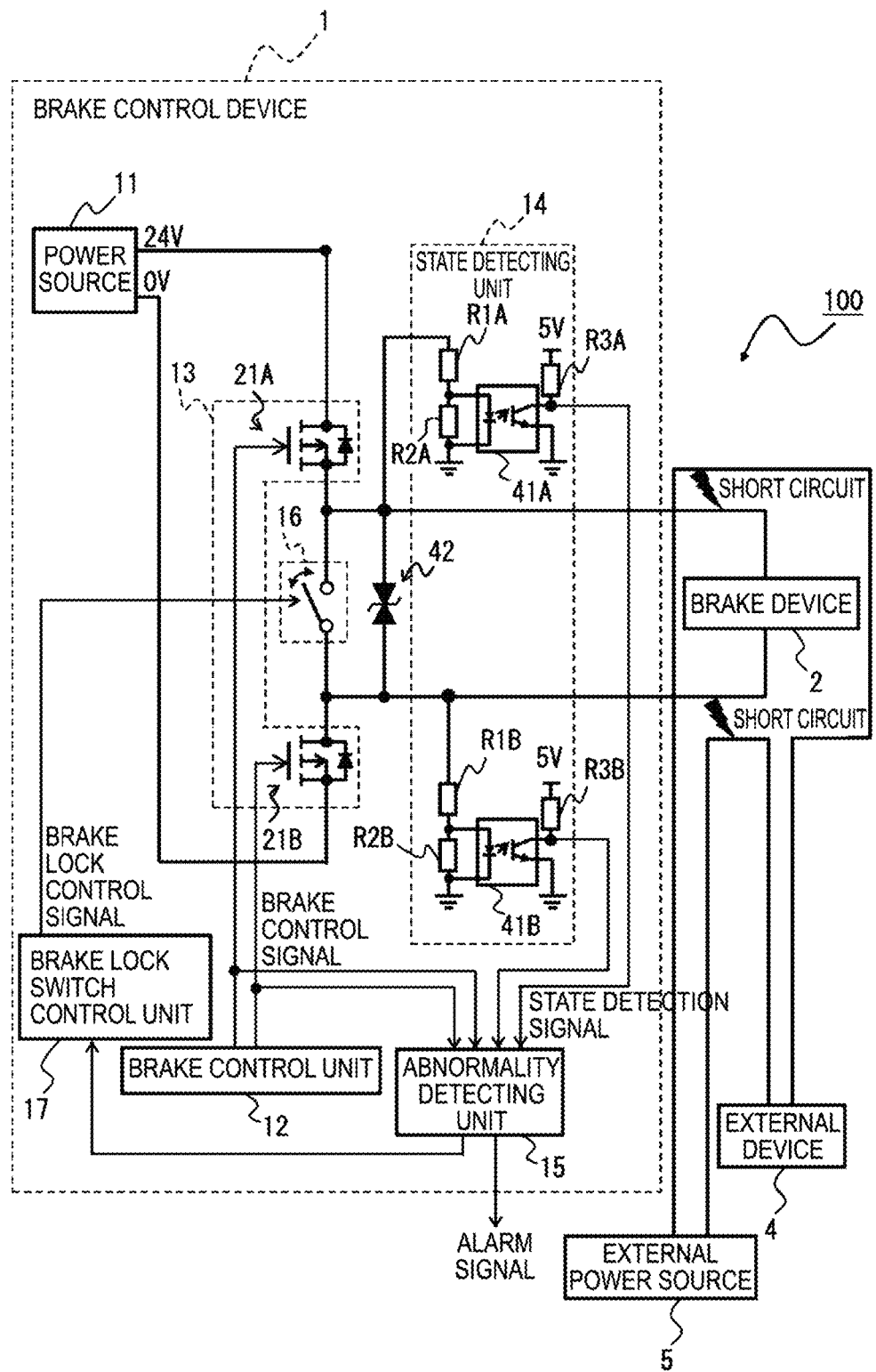
FIG. 7 is a diagram illustrating an example of a short circuit of an external circuit and the cable connecting the brake control device and the brake device according to the first embodiment of the present disclosure (Part 2).

FIG. 7 is a diagram illustrating an example of a short circuit of an external circuit and the cable connecting the brake control device and the brake device according to the first embodiment of the present disclosure (Part 2). As illustrated in FIG. 7, an external circuit including an external power source 5 and the external device 4 is disposed near a brake circuit including the brake control device 1 and the brake device. For example, a case corresponds thereto where the brake circuit including the brake control device 1 and the brake device, and an external circuit related to various I/O devices are disposed in a robot arm. In this case, the cable connecting a positive electrode terminal of the external power source 5 and the positive electrode terminal of the external device 4 may be short-circuited by making contact with the brake cable connecting the positive electrode terminal of the brake device 2 and the source of the positive-side opening and closing switch 21A, and the cable connecting the negative electrode terminal of the external power source 5 and the positive electrode terminal of the external device 4 may be short-circuited by making contact with the brake cable connecting the negative electrode terminal of the brake device 2 and the drain of the negative-side opening and closing switch 21B.

Figure 8:
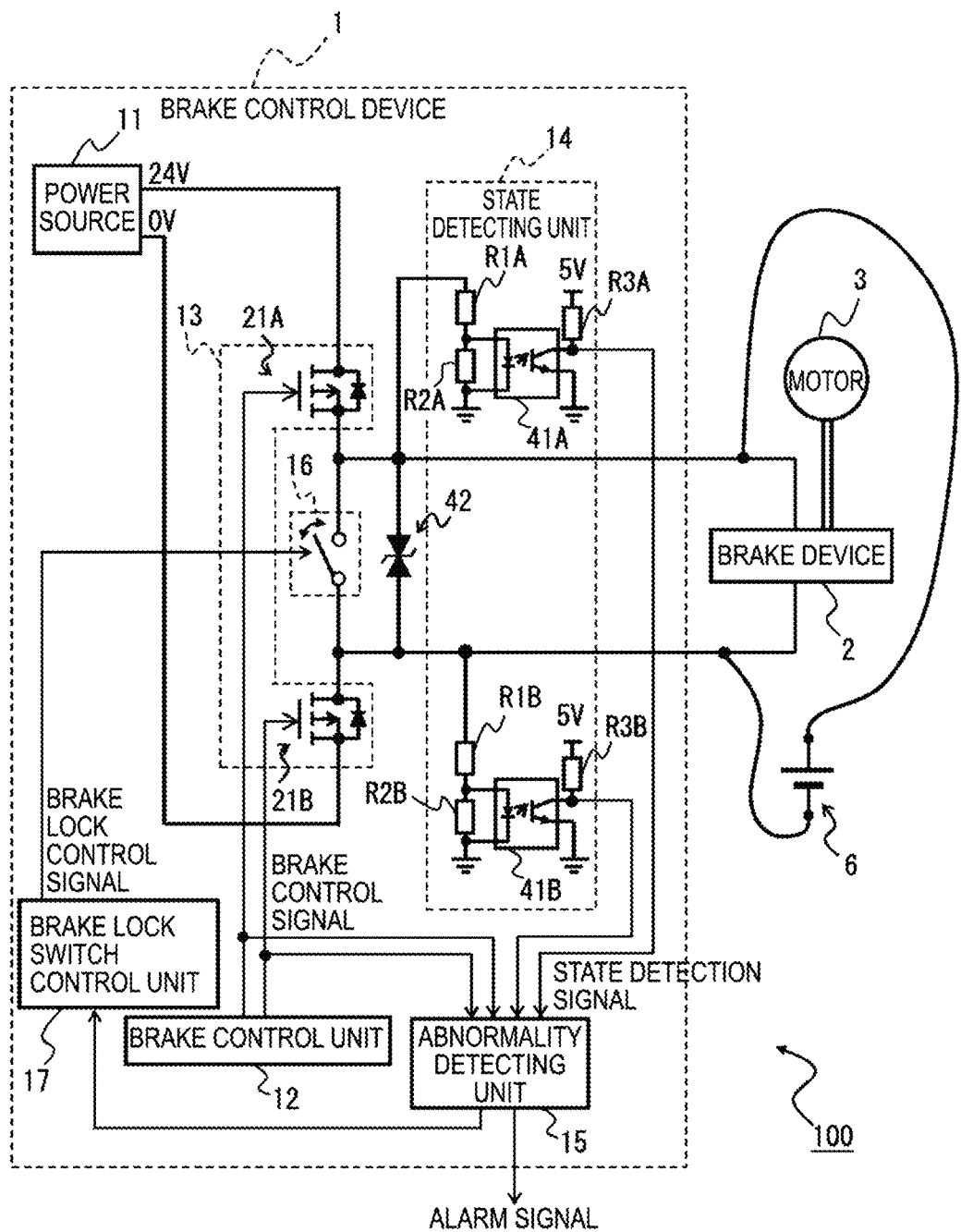
FIG. 8 is a diagram illustrating a case where a device including an external power source is short-circuited to a brake cable of the brake device in the brake control device and the motor drive device including the same according to the first embodiment of the present disclosure (Part 1).
Figure 10:
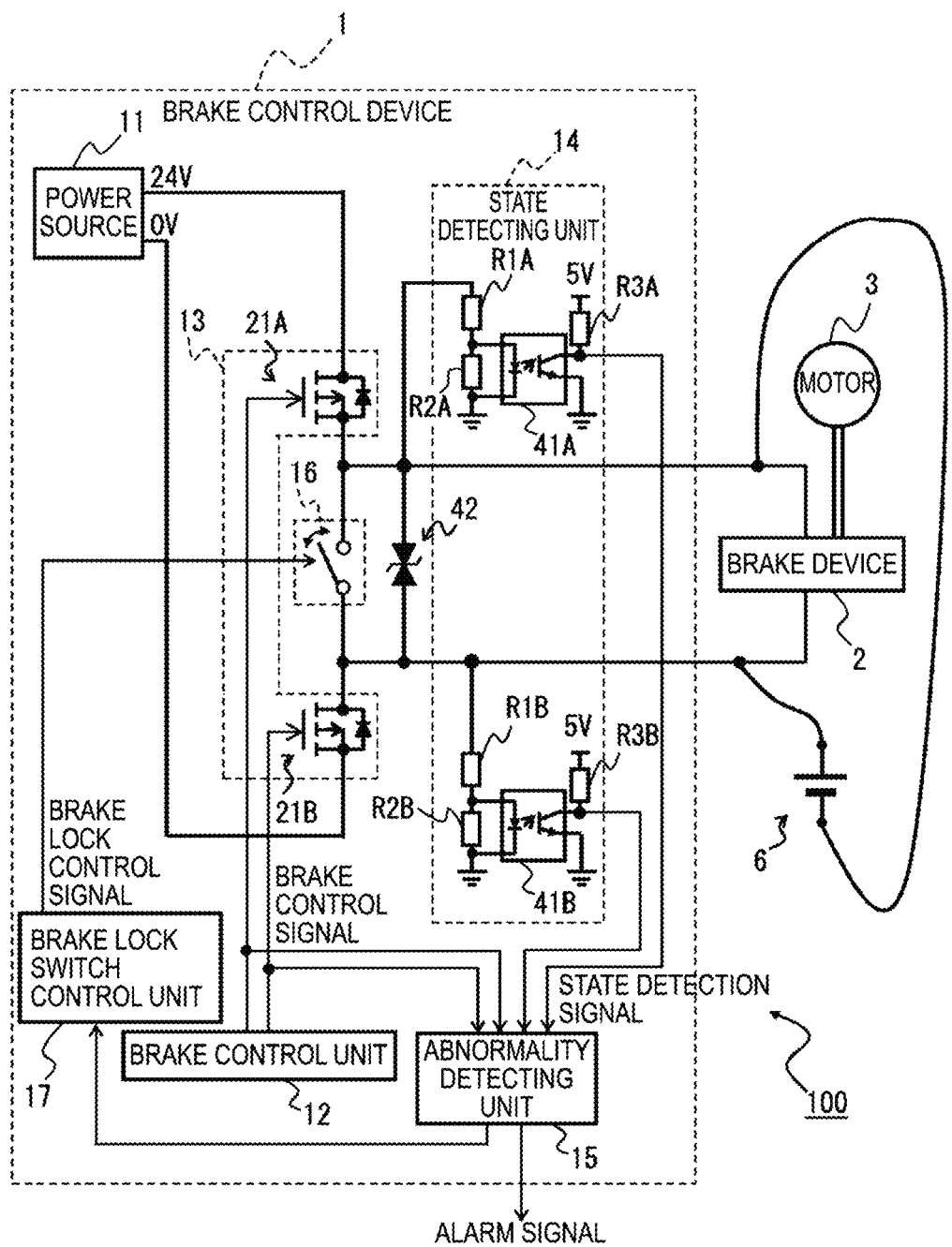
FIG. 10 is a diagram illustrating a case where the device including the external power source is short-circuited to the brake cable of the brake device in the brake control device and the motor drive device including the same according to the first embodiment of the present disclosure (Part 2).

The short circuit of the cable connecting the brake control device and the brake device and the external circuit illustrated in FIGS. 6 and 7 can be represented by an equivalent circuit as illustrated in FIG. 8 or 10. It is distinguished as FIG. 8 or 10 depending on the polarity of the external circuit making contact with the cable connecting the brake control device and the brake device.

FIG. 8 is a diagram illustrating a case where a device including an external power source is short-circuited to a brake cable of the brake device in the brake control device and the motor drive device including the same according to the first embodiment of the present disclosure (Part 1). FIG. 9A is a diagram illustrating an example of each signal and brake state in the case where the device including the external power source is short-circuited to the brake cable of the brake device as illustrated in FIG. 8 in the brake control device and the motor drive device including the same according to the first embodiment of the present disclosure, and illustrates an example of each signal and brake state in a case where the brake lock switch control process is not performed. FIG. 9B is a diagram illustrating an example of each signal and brake state in the case where the device including the external power source is short-circuited to the brake cable of the brake device as illustrated in FIG. 8 in the brake control device and the motor drive device including the same according to the first embodiment of the present disclosure, and illustrates an example of each signal and brake state in a case where the brake lock switch control process is performed. Note that the "brake control signal" is denoted as "brake signal" in FIGS. 9A and 9B for the sake of simplifying the drawings.

In the case where the brake device 2 and the external device 4 share the power source 11 as illustrated in FIG. 6, the power source 11 related to the external device 4 illustrated in FIG. 6 can be regarded as an external power source 6 in FIG. 8. The external power source 5 illustrated in FIG. 7 can be regarded as the external power source 6 in FIG. 8.

As illustrated in FIG. 8, a short circuit may occur of the brake cable connecting the positive electrode terminal of the brake device 2 and the source of the positive-side opening and closing switch 21A making contact with a positive electrode side of the external power source 6, and the brake cable connecting the negative electrode terminal of the brake device 2 and the drain of the negative-side opening and closing switch 21B making contact with a negative electrode side of the external power source 6. In this case, regardless of an operation state of the brake control device 1, the brake cable connecting the positive electrode terminal of the brake device 2 and the source of the positive-side opening and closing switch 21A has a positive potential, and the brake cable connecting the negative electrode terminal of the brake device 2 and the drain of the negative-side opening and closing switch 21B is at 0 V.

In the case where the brake lock switch control process is not performed as illustrated in FIG. 9A, the positive-side opening and closing switch 21A and the negative-side opening and closing switch 21B are both in the open state during the brake actuation process, but since the brake cable connecting the positive electrode terminal of the brake device 2 and the source of the positive-side opening and closing switch 21A has a positive potential, the current flows through the voltage divider resistors R1A and R2A in the state detecting unit 14, the light-emitting element in the photocoupler 41A emits light, and consequently the output side of the photocoupler 41A is Low. Thus, the state detection signal $FB_A$ indicating the potential state of the electrical path from the source of the positive-side opening and closing switch 21A to the positive electrode terminal of the brake device 2 is Low. Since the voltage of the external power source 6 is applied to the brake coil 115 of the brake device 2, there is the risk of causing the state where the brake on the motor 3 is released regardless of doing so during the execution of the brake actuation process. In view of this, during the execution of the brake actuation process, the abnormality detecting unit 15 determines that an abnormality has occurred and outputs the alarm signal, when the state detection signal $FB_A$ during the brake actuation process period differs from the state detection signal $FB_A$ in the normal state (when the state detection signal $FB_A$ is Low). When the abnormality detecting unit 15 determines that an abnormality has occurred during the brake actuation process period, the brake lock switch control unit 17 outputs the close signal for controlling the brake lock switch 16 to close as the brake lock control signal for the brake lock switch 16, as illustrated in FIG. 9B. In this manner, the brake lock switch 16 is closed, and a short circuit is made between the input terminals of the brake device 2 (i.e., between the positive electrode terminal and the negative electrode terminal of the brake device 2), and therefore, the voltage of the power source 11 is not applied to the brake coil 115 of the brake device 2. This causes the state where the brake is actuated on the motor 3, and safety is ensured.

In the case where the brake lock switch control process is not performed as illustrated in FIG. 9A, the positive-side opening and closing switch 21A is in the closed state and the negative-side opening and closing switch 21B is in the open state during the brake release preparation process, but since the brake cable connecting the positive electrode terminal of the brake device 2 and the source of the positive-side opening and closing switch 21A has a positive potential, the current flows through the voltage divider resistors R1A and R2A in the state detecting unit 14, the light-emitting element in the photocoupler 41A emits light, and consequently the output side of the photocoupler 41A is Low. Thus, the state detection signal $FB_A$ indicating the potential state of the electrical path from the source of the positive-side opening and closing switch 21A to the positive electrode terminal of the brake device 2 is Low. Since the brake cable connecting the negative electrode terminal of the brake device 2 and the drain of the negative-side opening and closing switch 21B is at 0 V, the current does not flow through voltage divider resistors R1B and R2B in the state detecting unit 14, the light-emitting element in photocoupler 41B does not emit light, and consequently the output side of the photocoupler 41B is High. Thus, the state detection signal $FB_B$ indicating the potential state of the electrical path from the negative electrode terminal of the brake device 2 to the drain of the negative-side opening and closing switch 21B is High. Since the voltage of the external power source 6 is applied to the brake coil 115 of the brake device 2, there is the risk of causing the state where the brake on motor 3 is released regardless of doing so during the execution of the brake release preparation process. In view of this, when the state detection signal $FB_B$ during the brake release preparation process period differs from the state detection signal $FB_B$ in a normal state (when the state detection signal $FB_B$ is High), the abnormality detecting unit 15 determines that an abnormality has occurred and outputs the alarm signal. When the abnormality detecting unit 15 determines that an abnormality has occurred during the brake release preparation process period, the brake lock switch control unit 17 outputs the close signal for controlling the brake lock switch 16 to close as the brake lock control signal for the brake lock switch 16, as illustrated in FIG. 9B. In this manner, the brake lock switch 16 is closed, and a short circuit is made between the input terminals of the brake device 2 (i.e., between the positive electrode terminal and the negative electrode terminal of the brake device 2), and therefore, the voltage of the power source 11 is not applied to the brake coil 115 of the brake device 2. This causes the state where the brake is actuated on the motor 3, and safety is ensured.

Note that when the above-described cable short circuit with the external power source 6 occurs during the brake release preparation process period, the dangerous state where the brake on motor 3 is released occurs. In view of this, the time period during which the brake release preparation process is executed may be set to be shorter than the response time of the brake device 2 to the brake command. By setting the time period during which the brake release preparation process is executed in this manner, even when a short circuit failure of the negative-side opening and closing switch 21B has occurred, the short circuit failure of the negative-side opening and closing switch 21B can be detected while avoiding the release of the brake of the brake device 2 on the motor 3.

FIG. 10 is a diagram illustrating a case where the device including the external power source is short-circuited to the brake cable of the brake device in the brake control device and the motor drive device including the same according to the first embodiment of the present disclosure (Part 2). FIG. 11A is a diagram illustrating an example of each signal and brake state in the case where the device including the external power source is short-circuited to the brake cable of the brake device as illustrated in FIG. 10 in the brake control device and the motor drive device including the same according to the first embodiment of the present disclosure, and illustrates an example of each signal and brake state in a case where the brake lock switch control process is not performed. FIG. 11B is a diagram illustrating an example of each signal and brake state in the case where the device including the external power source is short-circuited to the brake cable of the brake device as illustrated in FIG. 10 in the brake control device and the motor drive device including the same according to the first embodiment of the present disclosure, and illustrates an example of each signal and brake state in a case where the brake lock switch control process is performed. Note that the "brake control signal" is denoted as "brake signal" in FIGS. 11A and 11B for the sake of simplifying the drawings.

In the case where the brake device 2 and the external device 4 share the power source 11 as illustrated in FIG. 6, a part of the power source 11 connected to the external device 4 illustrated in FIG. 6 can be regarded as the external power source 6 in FIG. 8. The external power source 5 illustrated in FIG. 7 can be regarded as the external power source 6 in FIG. 8.

As illustrated in FIG. 10, a short circuit may occur of the brake cable connecting the positive electrode terminal of the brake device 2 and the source of the positive-side opening and closing switch 21A making contact with the negative electrode side of the external power source 6, and the brake cable connecting the negative electrode terminal of the brake device 2 and the drain of the negative-side opening and closing switch 21B making contact with the positive electrode side of the external power source 6. The external power source 6 is different from the power source 11. In this case, regardless of the operation state of the brake control device 1, the brake cable connecting the positive electrode terminal of the brake device 2 and the source of the positive-side opening and closing switch 21A is at 0 V, and the brake cable connecting the negative electrode terminal of the brake device 2 and the drain of the negative-side opening and closing switch 21B has a positive potential. In the case where the external power source 6 can be regarded as being the same as the power source 11, it suffices to execute the above-described brake lock switch control for the case where both the positive-side opening and closing switch 21A and the negative-side opening and closing switch 21B have a short circuit failure.

In the case where the brake lock switch control process is not performed as illustrated in FIG. 11A, the positive-side opening and closing switch 21A and the negative-side opening and closing switch 21B are both in the open state during the brake actuation process, but since the brake cable connecting the negative electrode terminal of the brake device 2 and the drain of the negative-side opening and closing switch 21B has a positive potential, the current flows through voltage divider resistors R1B and R2B in the state detecting unit 14, the light-emitting element in photocoupler 41B emits light, and consequently the output side of the photocoupler 41B is Low. Thus, the state detection signal $FB_B$ indicating the potential state of the electrical path from the negative electrode terminal of the brake device 2 to the drain of the negative-side opening and closing switch 21B is Low. Since the voltage of the external power source 6 is applied to the brake coil 115 of the brake device 2, there is the risk of causing the state where the brake on the motor 3 is released regardless of doing so during the execution of the brake actuation process. In view of this, during the execution of the brake actuation process, when the state detection signal $FB_B$ during the brake actuation process period differs from the state detection signal $FB_B$ in the normal state (when the state detection signal $FB_B$ is Low), the abnormality detecting unit 15 determines that an abnormality has occurred and outputs the alarm signal. In the case where the abnormality detecting unit 15 determines that an abnormality has occurred during the brake actuation process period, the brake lock switch control unit 17 outputs the close signal for controlling the brake lock switch 16 to close as the brake lock control signal for the brake lock switch 16, as illustrated in FIG. 11B. In this manner, the brake lock switch 16 is closed, and a short circuit is made between the input terminals of the brake device 2 (i.e., between the positive electrode terminal and the negative electrode terminal of the brake device 2), and therefore, the voltage of the power source 11 is not applied to the brake coil 115 of the brake device 2. This causes the state where the brake is actuated on the motor 3, and safety is ensured.

In the case where the brake lock switch control is not performed as illustrated in FIG. 11A, the positive-side opening and closing switch 21A is in the closed state and the negative-side opening and closing switch 21B is in the open state during the brake release preparation process, but since the brake cable connecting the source of the positive-side opening and closing switch 21A and the positive electrode terminal of the brake device 2 is at 0 V, the current does not flow through the voltage divider resistors R1A and R2A in the state detecting unit 14, the light-emitting element in the photocoupler 41A does not emit light, and consequently the output side of the photocoupler 41A is High. Thus, the state detection signal $FB_A$ indicating the potential state of the electrical path from the source of the positive-side opening and closing switch 21A to the positive electrode terminal of the brake device 2 is High. Since the brake cable connecting the negative electrode terminal of the brake device 2 and the drain of the negative-side opening and closing switch 21B has a positive potential, the current flows through voltage divider resistors R1B and R2B in the state detecting unit 14, the light-emitting element in photocoupler 41B emits light, and consequently the output side of the photocoupler 41A is Low. Thus, the state detection signal $FB_B$ indicating the potential state of the electrical path from the negative electrode terminal of the brake device 2 to the drain of the negative-side opening and closing switch 21B is Low. Since the voltage of the external power source 6 is applied to the brake coil 115 of the brake device 2, there is the risk of causing the state where the brake on motor 3 is released regardless of doing so during the execution of the brake release preparation process. In view of this, when the state detection signal $FB_A$ during the brake release preparation process period differs from the state detection signal $FB_A$ in a normal state (the state detection signal $FB_A$ is High), the abnormality detecting unit 15 determines that an abnormality has occurred and outputs the alarm signal. When the abnormality detecting unit 15 determines that an abnormality has occurred during the brake release preparation process period, the brake lock switch control unit 17 outputs the close signal for controlling the brake lock switch 16 to close as the brake lock control signal for the brake lock switch 16, as illustrated in FIG. 11B. In this manner, the brake lock switch 16 is closed, and a short circuit is made between the input terminals of the brake device 2 (i.e., between the positive electrode terminal and the negative electrode terminal of the brake device 2), and therefore, the voltage of the power source 11 is not applied to the brake coil 115 of the brake device 2. This causes the state where the brake is actuated on the motor 3, and safety is ensured.

Figure 12:
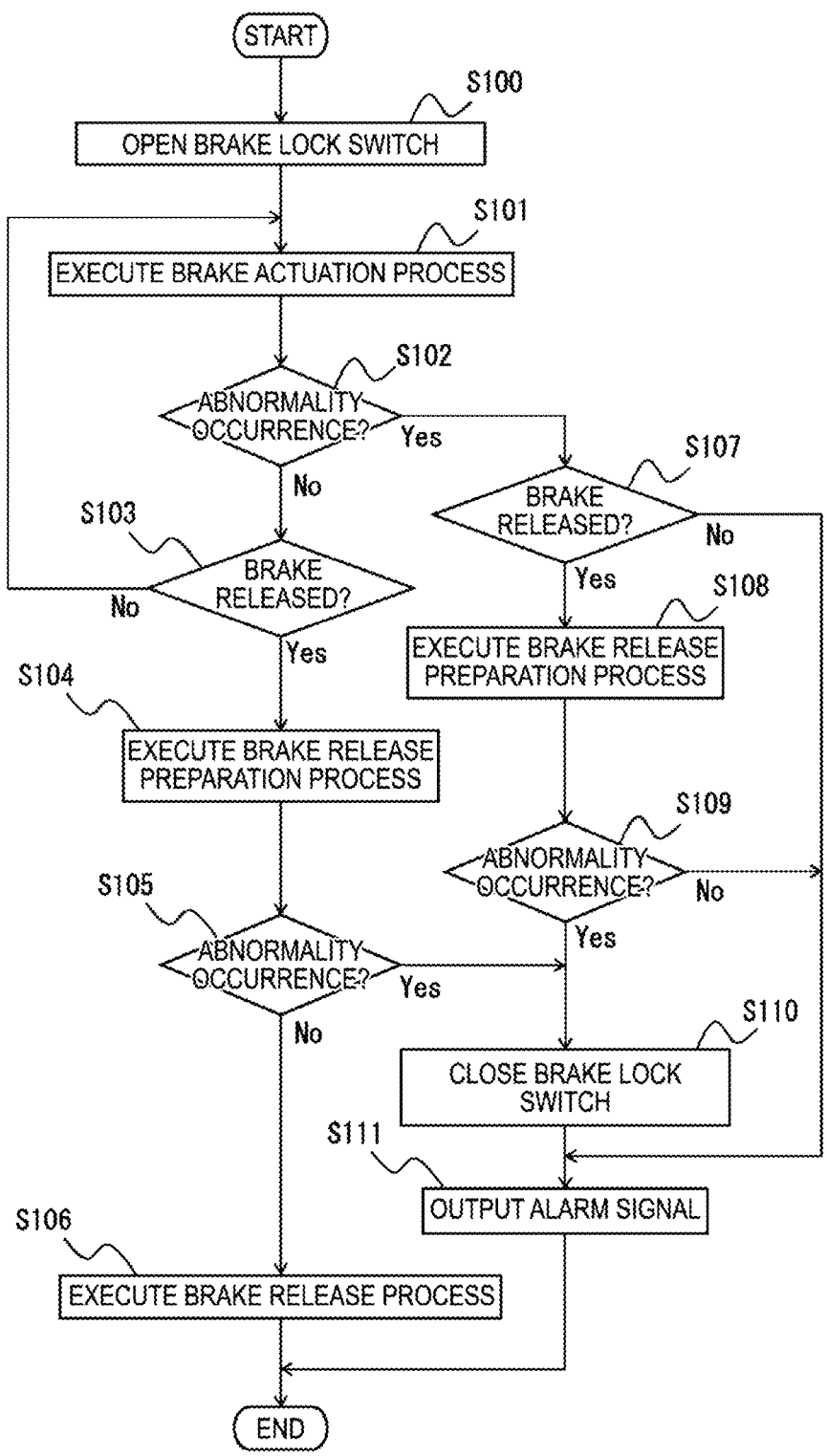
FIG. 12 is a flowchart illustrating an operation flow until the release of the brake of the brake device actuated on the motor in the brake control device according to the first embodiment of the present disclosure.

FIG. 12 is a flowchart illustrating an operation flow until the release of the brake of the brake device actuated on the motor in the brake control device according to the first embodiment of the present disclosure.

During the execution period of the brake actuation process, the brake release preparation process and the brake release process, the state detecting unit 14 outputs the state detection signal $FB_A$ indicating the potential state of the electrical path between the source of the positive-side opening and closing switch 21A in the opening and closing unit 13 and the positive electrode terminal of the brake device 2, and the state detection signal $FB_B$ indicating the potential state of the electrical path between the drain of the negative-side opening and closing switch 21B in the opening and closing unit 13 and the negative electrode terminal of the brake device 2.

In step S100, the brake lock switch control unit 17 outputs the open signal for controlling the brake lock switch 16 to open as the brake lock control signal LS for the brake lock switch 16. The brake lock switch 16 opens in response to receiving the open signal.

In step S101, the brake actuation process is executed. In the brake actuation process, the brake control unit 12 outputs the brake control signals BSA and BSB for controlling the positive-side opening and closing switch 21A and the negative-side opening and closing switch 21B to open.

In step S102, during the execution of the brake actuation process, the abnormality detecting unit 15 detects whether or not an abnormality occurs (i.e., the short circuit failure of the positive-side opening and closing switch 21A), based on the combination of the contents of the brake control signals BSA and BSB, and the contents of the state detection signals $FB_A$ and $FB_B$. When the occurrence of an abnormality is detected in step S102, the process proceeds to step S107. On the other hand, when the occurrence of an abnormality is not detected in step S102, the process proceeds to step S103.

In step S103, the brake control unit 12 determines whether or not a brake release command has been received from the host controller (not illustrated). Examples of the host controller include a motor controller to control the motor 3 being a braking target of the brake device 2, or a host controller at a higher level than the motor controller (e.g., a numerical value controller or a robot controller). When it is determined in step S103 that the brake release command has not been received, the process is returned to step S101, and the execution of the brake actuation process is continued. When it is determined in step S103 that the brake release command has been received, the process proceeds to step S104.

In step S104, the brake control unit 12 executes the brake release preparation process. In the brake release preparation process, the brake control unit 12 outputs the brake control signals BSA and BSB for controlling the positive-side opening and closing switch 21A to close and the negative-side opening and closing switch 21B to open.

In step S105, during the execution of the brake release preparation process, the abnormality detecting unit 15 detects whether or not an abnormality occurs (i.e., the short circuit failure of the negative-side opening and closing switch 21B), based on the combination of the contents of the brake control signals BSA and BSB and the contents of the state detection signals $FB_A$ and $FB_B$. When the occurrence of an abnormality is detected in step S105, the process proceeds to step S110. On the other hand, when the occurrence of an abnormality is not detected in step S105, the process proceeds to step S106.

In step S106, the brake release process is executed. In the brake release process, the brake control unit 12 outputs the brake control signals BSA and BSB for controlling the positive-side opening and closing switch 21A and the negative-side opening and closing switch 21B to close. The brake release process is executed in this manner in step S106 when the occurrence of an abnormality is not detected in step S102 during the execution of the brake actuation process and the occurrence of an abnormality is not detected in step S105 during the execution of the brake release preparation process, and thus the brake can be safely released.

When the occurrence of an abnormality is detected in step S105, the brake lock switch control unit 17 outputs the close signal for controlling the brake lock switch 16 to close as the brake lock control signal LS for the brake lock switch 16 in step S110. In this manner, the brake lock switch 16 is closed, and a short circuit is made between the input terminals of the brake device 2 (i.e., between the positive electrode terminal and the negative electrode terminal of the brake device 2), and therefore, the voltage of the power source 11 is not applied to the brake coil 115 of the brake device 2. This causes the state where the brake is actuated on the motor 3. In this manner, it is possible to avoid releasing the brake when an abnormality occurs.

In step S111, the abnormality detecting unit 15 outputs the alarm signal to notify the operator of the occurrence of an abnormality.

In step S102, when the abnormality detecting unit 15 detects the occurrence of an abnormality during the execution of the brake actuation process, the brake control unit 12 determines in step S107 whether or not the brake release command has been received from the host controller (not illustrated).

When it is determined in step S107 that the brake release command has not been received, the process proceeds to step S111. The abnormality detected in step S102 executed before step S107 is the short circuit failure of the positive-side opening and closing switch 21A. As described with reference to FIG. 4A, safety is ensured because the brake of the brake device 2 is actuated even during the short circuit failure of the positive-side opening and closing switch 21A, but the abnormality detecting unit 15 outputs the alarm signal in step S111 to notify the operator of the occurrence of an abnormality.

When it is determined in step S107 that the brake release command has been received, the process proceeds to step S108. In step S108, the brake control unit 12 executes the brake release preparation process. In the brake release preparation process, the brake control unit 12 outputs the brake control signals BSA and BSB for controlling the positive-side opening and closing switch 21A to close and the negative-side opening and closing switch 21B to open.

In step S109, during the execution of the brake release preparation process, the abnormality detecting unit 15 detects whether or not an abnormality occurs (i.e., the short circuit failure of the negative-side opening and closing switch 21B), based on the combination of the contents of the brake control signals BSA and BSB and the contents of the state detection signals $FB_A$ and $FB_B$.

When the occurrence of an abnormality is detected in step S109, the process proceeds to step S110 and the brake lock switch control unit 17 outputs the close signal for controlling the brake lock switch 16 to close as the brake lock control signal LS for the brake lock switch 16, since the short circuit failures of both the positive-side opening and closing switch 21A and the negative-side opening and closing switch 21B described with reference to FIGS. 5A and 5B are occurring. In this manner, the brake lock switch 16 is closed, and a short circuit is made between the input terminals of the brake device 2 (i.e., between the positive electrode terminal and the negative electrode terminal of the brake device 2), and therefore, the voltage of the power source 11 is not applied to the brake coil 115 of the brake device 2. This causes the state where the brake is actuated on the motor 3. In this manner, it is possible to avoid releasing the brake when an abnormality occurs. In step S111 following step S110, the abnormality detecting unit 15 outputs the alarm signal to notify the operator of the occurrence of an abnormality.

When the occurrence of an abnormality is not detected in step S109, only the short circuit failure of the positive-side opening and closing switch 21A described with reference to FIG. 4A occurs, and in this case, safety is ensured because the brake of the brake device 2 is actuated, but the abnormality detecting unit 15 outputs the alarm signal in step S111 to notify the operator of the occurrence of an abnormality.

Note that in the brake control device 1 according to the first embodiment of the present disclosure, an operation flow other than described with reference to FIG. 12 may also be employed as the operation flow to transition from the brake actuation process to the brake release process via the brake release preparation process. For example, when at least one of the occurrence of an abnormality to be detected during the execution of the brake actuation process by the abnormality detecting unit 15 or the occurrence of an abnormality to be detected during the execution of the brake release preparation process by the abnormality detecting unit 15 is not detected, safety can be ensured because the brake of the brake device 2 can be actuated dye to the abnormality not being detected (i.e., any of the positive-side opening and closing switch 21A, the negative-side opening and closing switch 21B, or the brake lock switch 16). Accordingly, when at least one of the occurrence of an abnormality to be detected during the execution of the brake actuation process by the abnormality detecting unit 15 or the occurrence of an abnormality to be detected during the execution of the brake release preparation process by the abnormality detecting unit 15 is not detected, the brake control unit 12 may operate the brake control device 1 through an operation flow to terminate the brake release preparation process and execute the brake release process.

As described above, the brake control device 1 according to the first embodiment of the present disclosure allows the brake of the brake device 2 actuated on the motor 3 to be released only when no abnormality occurs. Even when an abnormality occurs at the time of releasing the brake of the brake device 2 actuated on the motor 3, the release of the brake can be avoided.

Subsequently, the second embodiment of the present disclosure is described. In the second embodiment, an opening and closing switch making up the opening and closing unit is provided in one of the electrical path between the positive electrode terminal of the power source and the positive electrode terminal of the brake device, or the electrical path between the negative electrode terminal of the power source and the negative electrode terminal of the brake device.

Figure 13:
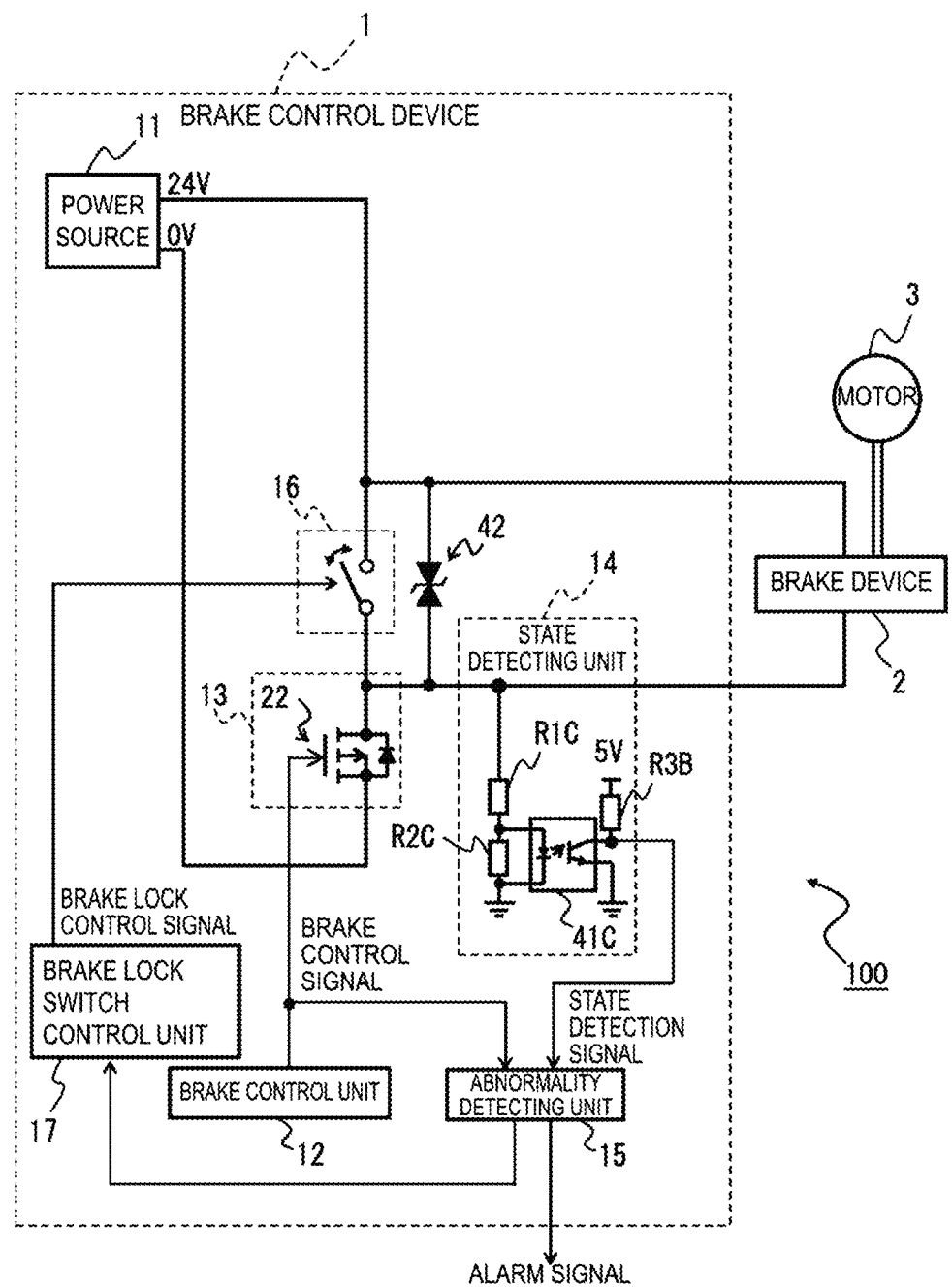
FIG. 13 is a diagram illustrating a brake control device and a motor drive device including the same according to a second embodiment of the present disclosure.

FIG. 13 is a diagram illustrating the brake control device and the motor drive device including the same according to the second embodiment of the present disclosure.

In the second embodiment, the opening and closing unit 13 includes at least one opening and closing switch for opening and closing one of the electrical path between the positive electrode terminal of the power source 11 and the positive electrode terminal of the brake device 2, or the electrical path between the negative electrode terminal of the power source 11 and the negative electrode terminal of the brake device 2. In the example illustrated in FIG. 13, as an example, the opening and closing unit 13 includes one opening and closing switch 22 for opening and closing the electrical path between the negative electrode terminal of the power source 11 and the negative electrode terminal of the brake device 2. In the example illustrated in FIG. 13, one opening and closing switch is provided in one of the electrical paths, but two or more opening and closing switches may be provided in one of the electrical paths. For example, two opening and closing switches connected in series may be provided in the electrical path between the negative electrode terminal of the power source 11 and the negative electrode terminal of the brake device 2, and in this case, the two opening and closing switches are controlled to open and close through the same brake control signal BS.

The opening and closing switch 22 is a normally open switch as an example. Examples of the semiconductor switching element making up the opening and closing switch 22 include FETs, IGBTs, thyristors, GTOs, and transistors, but other semiconductor switching elements may also be used. In the following, a case where the opening and closing switch 22 includes a FET is described.

The brake control unit 12 outputs a brake control signal BS to open and close the opening and closing switch 22 in the opening and closing unit 13. The brake control signal BS output from the brake control unit 12 is sent to the opening and closing switch 22 and the abnormality detecting unit 15. Contents of a control process executed by the brake control device 1 in the second embodiment of the present disclosure are divided into two processes, namely, the brake actuation process and the brake release process, and the brake control signal BS corresponding to each process is sent to the opening and closing switch 22. The brake actuation process and the brake release process in the brake control device 1 according to the second embodiment of the present disclosure are described in detail below.

The state detecting unit 14 includes, for example, a photocoupler 41C, a voltage divider resistors R1C and R2C, and a pull-up resistor R3C for generating a state detection signal FB indicating a potential state of an electrical path between a drain of the opening and closing switch 22 in the opening and closing unit 13 and the negative electrode terminal of the brake device 2. One end of the voltage divider resistor R1C is connected to the electrical path connecting the negative electrode terminal of the brake device 2 and the drain of the opening and closing switch 22, and the other end of the voltage divider resistor R1C is connected to one end of the voltage divider resistor R2C. The other end of the voltage divider resistor R2C is grounded. A light-emitting element in the photocoupler 41C is connected in parallel to the voltage divider resistor R2C. One end of a light-receiving element in the photocoupler 41C is connected to the pull-up resistor R3C, and the other end of the light-receiving element in the photocoupler 41C is grounded. Note that while the state detecting unit 14 includes a photocoupler and various resistors in the example illustrated in FIG. 13, the detecting unit 14 may include, as an alternative example, a power source that outputs a reference voltage for isolating the High state and the Low state (the reference voltage may be generated using a method such as resistor division instead of using the power source), and a comparator that compares the reference voltage and the voltage applied to the voltage divider resistor R2C and outputs a High signal or a Low signal based on a result of the comparison.

The abnormality detecting unit 15 detects whether or not an abnormality occurs, based on the combination of the contents of the brake control signal BS and the contents of the state detection signal FB. The abnormality detection process of the abnormality detecting unit 15 is described in detail below. The abnormality detecting unit 15 has a function of outputting an alarm signal when the occurrence of an abnormality is detected.

An abnormality detected by the abnormality detecting unit 15 includes a short circuit failure of the opening and closing switch 22, a short circuit of a cable between the opening and closing switch 22 and the brake device 2 and an external circuit, and a failure of the state detecting unit 14. For example, in a case where the opening and closing switch 22 does not respond to a received open command due to a failure of a drive circuit of the opening and closing switch 22, causing the opening and closing switch 22 to remain in the closed state, the failure can be regarded as "a short circuit failure of the opening and closing switch 22".

The power source 11, the brake lock switch 16, the brake lock switch control unit 17, the brake device 2, and the motor 3 are as described in detail in the first embodiment.

Subsequently, a brake control process and a state detection process in the brake control device 1 according to the second embodiment of the present disclosure are described.

FIG. 14A is a diagram for describing each signal and brake state in the brake control device according to the second embodiment of the present disclosure, and illustrates each signal and brake state in a normal state. FIG. 14B is a diagram for describing each signal and brake state in the brake control device according to the second embodiment of the present disclosure, and illustrates each signal and brake state when an opening and closing switch experiences a short circuit failure in a case where the brake lock switch control is not performed. FIG. 14C is a diagram for describing each signal and brake state in the brake control device according to the second embodiment of the present disclosure, and illustrates each signal and brake state when the opening and closing switch experiences a short circuit failure in a case where the brake lock switch control is performed. Note that the "brake control signal" is denoted as "brake signal" in FIGS. 14A, 14B, and 14C for the sake of simplifying the drawings.

The contents of the control process executed in the brake control device 1 in the second embodiment of the present disclosure are divided into two processes, namely, the brake actuation process and the brake release process. The state where the brake of the brake device 2 on the motor 3 is actuated is achieved by executing the brake actuation process. The state where the brake of the brake device 2 on the motor 3 is released is achieved by executing the brake release process. When releasing the brake actuated on the motor 3, the brake actuation process is terminated the brake release process is executed. When actuating the brake on the motor 3 from the state where the brake on the motor 3 is released, the brake release process is terminated to execute the brake actuation process. In the following description, the opening and closing switch 22 is a normally open switch as an example.

As illustrated in FIG. 14A, in the brake actuation process, the brake control unit 12 outputs the brake control signal BS for controlling the opening and closing switch 22 to open. Since the opening and closing switch 22 is a normally open switch, the brake control unit 12 outputs a Low signal as the brake control signal BS for the opening and closing switch 22. When there is no abnormality in the opening and closing switch 22 and the devices related to this switch, the brake lock switch control unit 17 outputs the open signal as the brake lock switch control signal LS for the brake lock switch 16 since the abnormality detecting unit 15 does not detect the occurrence of an abnormality, and consequently the brake lock switch 16 is opened. Since the opening and closing switch 22 is opened through the brake actuation process, the electrical path from the positive electrode terminal of the power source 11 to the negative electrode terminal of the power source 11 via the brake device 2 is blocked. Accordingly, when there is no abnormality in the opening and closing switch 22 and the devices related to this switch, the voltage of the power source 11 is not applied to the brake coil 115 of the brake device 2 due to the brake control unit 12 executing the brake actuation process. This causes the state where the brake is actuated on the motor 3. Since the opening and closing switch 22 is opened, the current that flows out from the positive electrode terminal of the power source 11 flows through the brake device 2 and the voltage divider resistors R1C and R2C. Thus, the light-emitting element in the photocoupler 41C emits light, and consequently an output side of the photocoupler 41C is Low. Thus, the state detection signal FB indicating the potential state of the electrical path between the drain of the opening and closing switch 22 in the opening and closing unit 13 and the negative electrode terminal of the brake device 2 is Low.

As illustrated in FIG. 14A, in the brake release process, the brake control unit 12 outputs the brake control signal BS for controlling the opening and closing switch 22 to close. Since the opening and closing switch 22 is a normally open switch, the brake control unit 12 outputs a High signal as the brake control signal BS for the opening and closing switch 22. When there is no abnormality in the opening and closing switch 22 and the devices related to this switch, the brake lock switch control unit 17 outputs the open signal as the brake lock switch control signal LS for the brake lock switch 16 since the abnormality detecting unit 15 does not detect the occurrence of an abnormality, and consequently the brake lock switch 16 is opened. Since the opening and closing switch 22 is closed through the brake release process, the electrical path from the positive electrode terminal of the power source 11 to the negative electrode terminal of the power source 11 via the brake device 2 is formed. Accordingly, when there is no abnormality in the opening and closing switch 22 and the devices related to this switch, the voltage of the power source 11 is applied to the brake coil 115 of the brake device 2 due to the brake release process being executed. This causes the state where the brake on the motor 3 is released. The electrical path from the negative electrode terminal of the brake device 2 to the negative electrode terminal of the power source 11 via the opening and closing switch 22 has the same potential as 0 V, which is the potential of the negative electrode terminal of the power source 11. Thus, the light-emitting element in the photocoupler 41C does not emit light because the current does not flow through the voltage divider resistors R1C and R2C in the state detecting unit 14, and consequently the output side of the photocoupler 41C is High. Thus, the state detection signal FB indicating the potential state of the electrical path between the drain of the opening and closing switch 22 in the opening and closing unit 13 and the negative electrode terminal of the brake device 2 is High.

The contents of the state detection signal FB in the brake actuation process and the brake release process in the above-described case where there is no abnormality in the opening and closing switch 22 and the devices related to this switch, i.e., in the normal state, are stored in advance in the abnormality detecting unit 15 so as to be available for the abnormality detection process.

FIG. 14B is a diagram illustrating each signal and brake state when the opening and closing switch 22 experiences a short circuit failure in a case where the brake lock switch control is not performed. As illustrated in FIG. 14B, when the opening and closing switch 22 experiences a short circuit failure, since the opening and closing switch 22 experiences a short circuit failure regardless of the Low signal being the open command being output as the brake control signal BS for the opening and closing switch 22, the opening and closing switch 22 is caused to be in the closed state, during the brake actuation process period. Accordingly, the electrical path from the positive electrode terminal of the power source 11 to the negative electrode terminal of the power source 11 via the brake device 2 and the opening and closing switch 22 is formed. As a result, the voltage of the power source 11 is applied to the brake device 2, and there is the risk of causing the state where the brake on motor 3 that is normally actuated is released. The electrical path from the negative electrode terminal of the brake device 2 to the drain of the opening and closing switch 22 has the same potential as 0 V, which is the potential of the negative electrode terminal of the power source 11. Thus, the light-emitting element in the photocoupler 41C does not emit light because the current does not flow through the voltage divider resistors R1C and R2C in the state detecting unit 14, and consequently the output side of the photocoupler 41C is High. Thus, the state detection signal FB indicating the potential state of the electrical path between the drain of the opening and closing switch 22 in the opening and closing unit 13 and the negative electrode terminal of the brake device 2 is High. In this manner, during the brake actuation process period, the state detection signal FB is Low when there is no abnormality in the opening and closing switch 22 and the devices related to this switch, but the state detection signal FB is High when the short circuit failure of the opening and closing switch 22 occurs. During the execution of the brake actuation process, the abnormality detecting unit 15 detects whether or not an abnormality occurs, based on the combination of the contents of the brake control signal BS and the contents of the state detection signal FB. More specifically, when transitioning from the brake actuation process to the brake release process, the abnormality detecting unit 15 determines that no abnormality occurs when the brake control signal BS is Low and the state detection signal FB is Low during the execution of the brake actuation process immediately before the brake release process, and the brake control unit 12 terminates the brake actuation process and executes the brake release process. When transitioning from the brake actuation process to the brake release process, the abnormality detecting unit 15 determines that an abnormality occurs (i.e., the short circuit failure of the opening and closing switch 22) when the brake control signal BS is Low and the state detection signal FB is High during the execution of the brake actuation process immediately before the brake release process.

FIG. 14C is a diagram illustrating each signal and brake state when the opening and closing switch 22 experiences a short circuit failure in a case where the brake lock switch control according to the second embodiment of the present disclosure is performed. As described above with reference to FIG. 14B, during the execution of the brake actuation process, the abnormality detecting unit 15 determines that an abnormality is occurring (i.e., the short circuit failure of the opening and closing switch 22) when the brake control signal BS is Low and the state detection signal FB is High. When the short circuit failure of the opening and closing switch 22 occurs during the brake actuation process period, the abnormality detecting unit 15 outputs the alarm signal since the state occurs where the brake that is normally actuated is released. As illustrated in FIG. 14C, when the abnormality detecting unit 15 detects the occurrence of an abnormality during the execution of the brake actuation process immediately before the brake release process when transitioning from the brake actuation process to the brake release process, the brake lock switch control unit 17 outputs the close signal for controlling the brake lock switch 16 to close as the brake lock control signal LS for the brake lock switch 16. In this manner, the brake lock switch 16 is closed, and a short circuit is made between the input terminals of the brake device 2 (i.e., between the positive electrode terminal and the negative electrode terminal of the brake device 2), and therefore, the voltage of the power source 11 is not applied to the brake coil 115 of the brake device 2. This causes the state where the brake is actuated on the motor 3. In this manner, it is possible to avoid releasing the brake when an abnormality occurs (when the opening and closing switch 22 experiences a short circuit failure) can be avoided.

Figure 15:
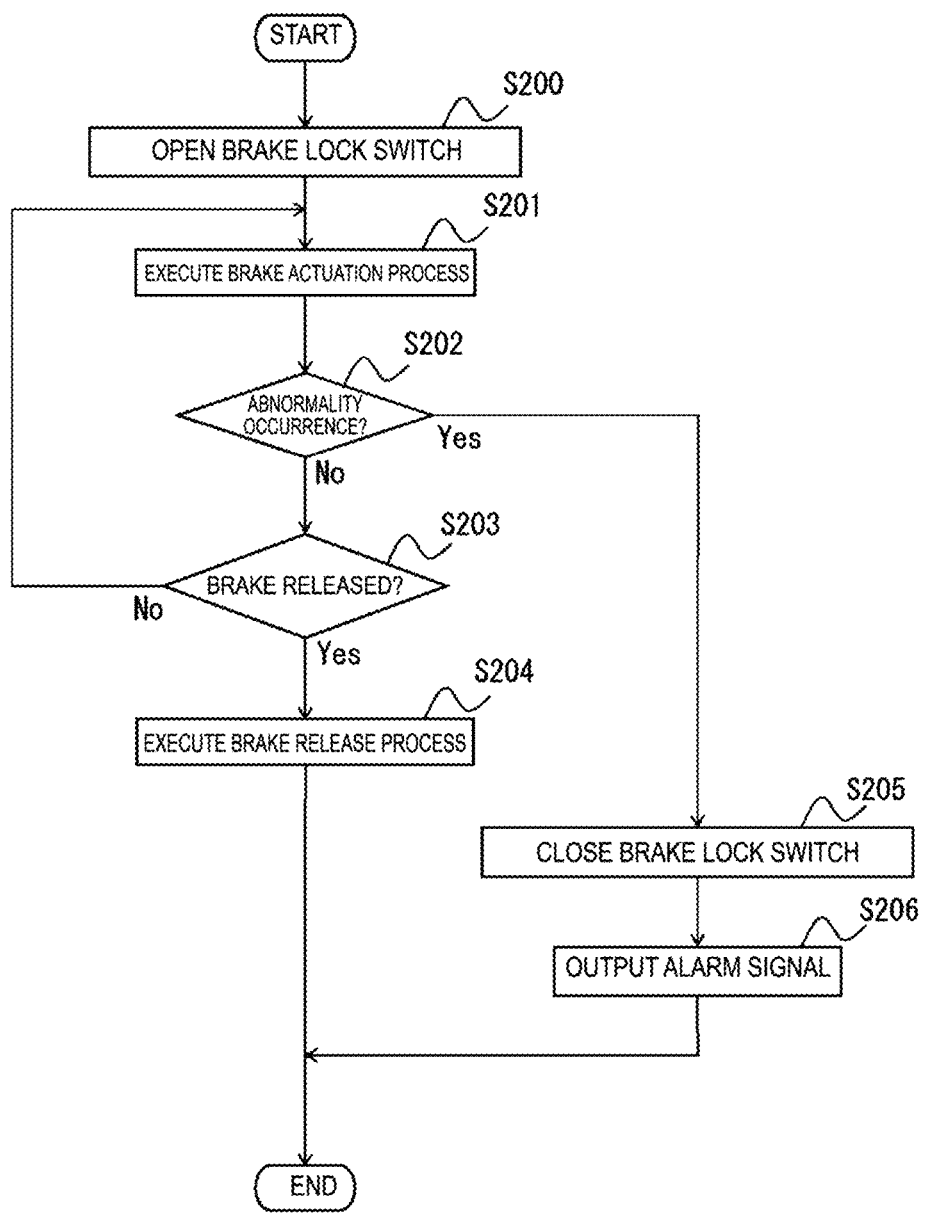
FIG. 15 is a flowchart illustrating an operation flow until the release of the brake of the brake device actuated on the motor in the brake control device according to the second embodiment of the present disclosure.

FIG. 15 is a flowchart illustrating an operation flow until the release of the brake of the brake device actuated on the motor in the brake control device according to the second embodiment of the present disclosure.

During the execution period of the brake actuation process and the brake release process, the state detecting unit 14 outputs the state detection signal FB indicating the potential state of the electrical path between the drain of the opening and closing switch 22 in the opening and closing unit 13 and the negative electrode terminal of the brake device 2.

In step S200, the brake lock switch control unit 17 outputs the open signal for controlling the brake lock switch 16 to open as the brake lock control signal LS for the brake lock switch 16. The brake lock switch 16 opens in response to receiving the open signal.

In step S201, the brake actuation process is executed. In the brake actuation process, the brake control unit 12 outputs the brake control signal BS for controlling the opening and closing switch 22 to open.

In step S202, during the execution of the brake actuation process, the abnormality detecting unit 15 detects whether or not an abnormality occurs (i.e., the short circuit failure of the opening and closing switch 22), based on the combination of the contents of the brake control signal BS and the contents of the state detection signal FB. When the occurrence of an abnormality is detected in step S202, the process proceeds to step S205. On the other hand, when the occurrence of an abnormality is not detected in step S202, the process proceeds to step S203.

In step S203, the brake control unit 12 determines whether or not the brake release command has been received from the host controller (not illustrated). When it is determined in step S203 that the brake release command has not been received, the process is returned to step S201, and the execution of the brake actuation process is continued. When it is determined in step S203 that the brake release command has been received, the process proceeds to step S204.

In step S204, the brake release process is executed. In the brake release process, the brake control unit 12 outputs the brake control signal BS for controlling the opening and closing switch 22 to close. The brake release process is executed in this manner in step S204 when the occurrence of an abnormality is not detected in step S203 during the execution of the brake actuation process immediately before the brake release process, and thus the brake can be safely released.

When the occurrence of an abnormality is detected in step S202, the brake lock switch control unit 17 outputs the close signal for controlling the brake lock switch 16 to close as the brake lock control signal LS for the brake lock switch 16 in step S205. In this manner, the brake lock switch 16 is closed, and a short circuit is made between the input terminals of the brake device 2 (i.e., between the positive electrode terminal and the negative electrode terminal of the brake device 2), and therefore, the voltage of the power source 11 is not applied to the brake coil 115 of the brake device 2. This causes the state where the brake is actuated on the motor 3. In this manner, it is possible to avoid releasing the brake when an abnormality occurs.

In step S206 following step S205, the abnormality detecting unit 15 outputs the alarm signal to notify the operator of the occurrence of an abnormality.

As described above, the brake control device 1 according to the second embodiment of the present disclosure allows the brake of the brake device 2 actuated on motor 3 to be released only when no abnormality occurs. Even when an abnormality occurs at the time of releasing the brake of the brake device 2 actuated on the motor 3, the release of the brake can be avoided.

Subsequently, the third embodiment of the present disclosure is described. The third embodiment of the present disclosure adds a function of detecting a faulty location to the first embodiment. A brake control device 1 according to the third embodiment of the present disclosure further includes a separating unit that electrically separates the brake device 2 from the power source 11 and the opening and closing unit 13 in the brake control device 1 according to the first embodiment. Forms of the separating unit are listed below.

Figure 16:
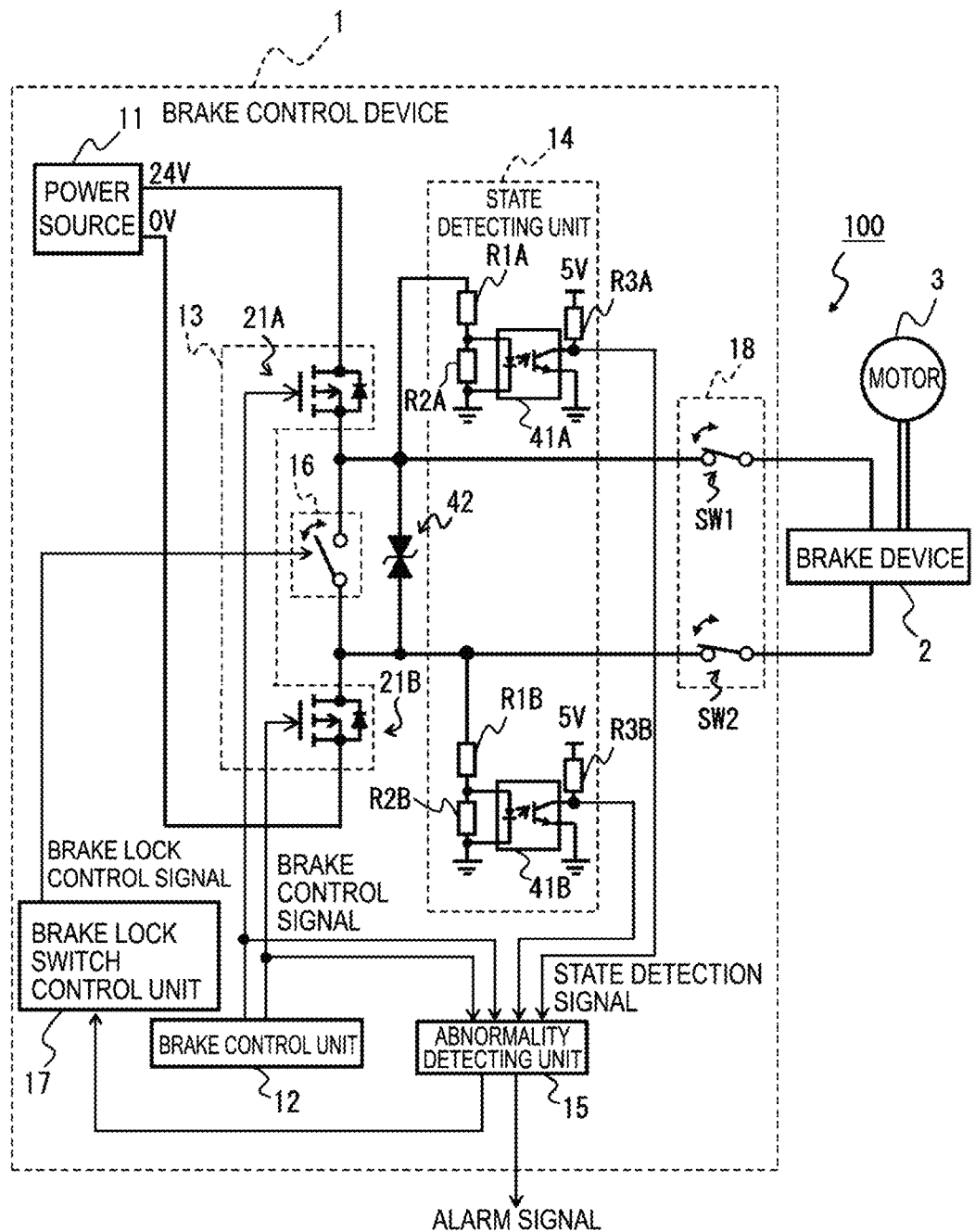
FIG. 16 is a diagram illustrating a brake control device including a separating unit in a first form, and a motor drive device including the same according to a third embodiment of the present disclosure.

FIG. 16 is a diagram illustrating a brake control device including the separating unit in a first form, and a motor drive device including the same according to the third embodiment of the present disclosure.

The brake control device 1 according to the third embodiment of the present disclosure further includes a separating unit 18 that electrically separates the brake device 2 from the power source 11 and the opening and closing unit 13 in the brake control device 1 according to the first embodiment. As illustrated in FIG. 16, the separating unit 18 in the first form includes a positive-side separating switch SW1 that opens and closes the electrical path between the source of the positive-side opening and closing switch 21A and the positive electrode terminal of the brake device 2, and a negative-side separating switch SW2 that opens and closes the electrical path between the negative electrode terminal of the brake device 2 and the drain of the negative-side opening and closing switch 21B. The opening and closing of the positive-side separating switch SW1 and the negative-side separating switch SW2 in the separating unit 18 are controlled by the abnormality detecting unit 15. The brake device 2 is electrically separated from the power source 11 and the opening and closing unit 13 in the brake control device 1 by opening both the positive-side separating switch SW1 and the negative-side separating switch SW2 during a faulty location determination process period described below. The positive-side separating switch SW1 and the negative-side separating switch SW2 may include a semiconductor switching element, or a mechanical switch such as a relay. Examples of the semiconductor switching element making up the positive-side separating switch SW1 and the negative-side separating switch SW2 include FETs, IGBTs, thyristors, GTOs, and transistors, but other semiconductor switching elements may also be used.

Figure 17:
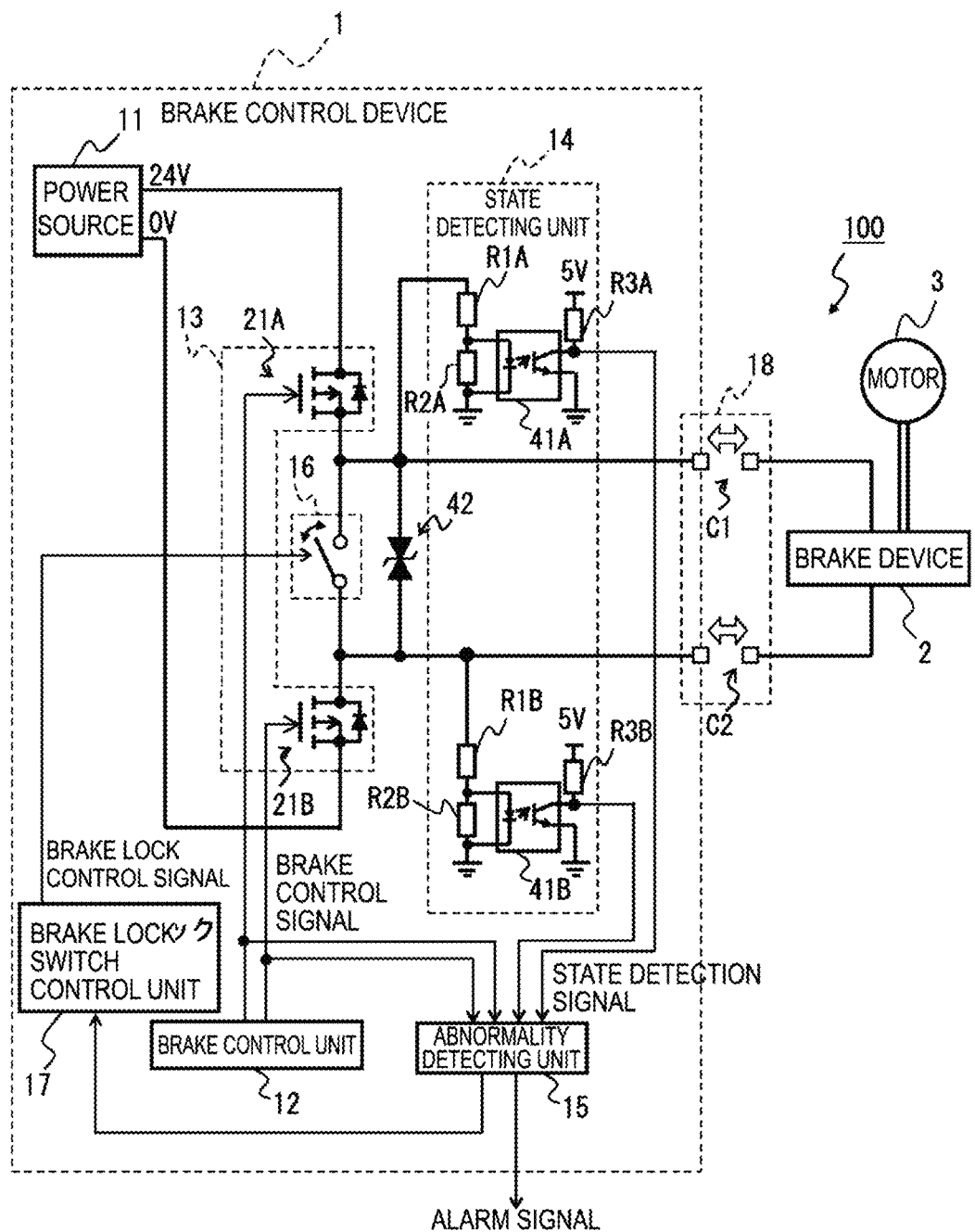
FIG. 17 is a diagram illustrating the brake control device including a separating unit in a second form, and the motor drive device including the same according to the third embodiment of the present disclosure.

FIG. 17 is a diagram illustrating the brake control device including a separating unit in a second form, and the motor drive device including the same according to the third embodiment of the present disclosure.

The brake control device 1 according to the third embodiment of the present disclosure further includes a separating unit 18 that electrically separates the brake device 2 from the power source 11 and the opening and closing unit 13 in the brake control device 1 according to the first embodiment. As illustrated in FIG. 17, the separating unit 18 in the second form includes a positive-side connector C1 and a negative-side connector C2 that are detachable from the brake control device 1 and the brake device 2. The positive-side connector C1 is provided on the electrical path between the source of the positive-side opening and closing switch 21A and the positive electrode terminal of the brake device 2, and the negative-side connector C2 is provided on the electrical path between the negative electrode terminal of the brake device 2 and the drain of the negative-side opening and closing switch 21B. The brake device 2 is electrically separated from the power source 11 and the opening and closing unit 13 in the brake control device 1 by physically separating the positive-side connector C1 and the negative-side connector C2 between the brake control device 1 and the brake device 2 during the faulty location determination process period described later.

In this manner, the separating unit 18 is in the first form illustrated in FIG. 16 or the second form illustrated in FIG. 17. When the occurrence of an abnormality is detected during the execution of the brake release preparation process, the abnormality detecting unit 15 detects whether the location where an abnormality occurs is located on a circuit side including the power source 11 and the opening and closing unit 13 (i.e., in the brake control device 1) or on a circuit side including the brake device 2 (i.e., outside the brake control device 1), based on the contents of the state detection signal in a state where the brake device 2 is electrically separated from the power source 11 and the opening and closing unit 13 by the separating unit 18 and the close signal is output by the brake lock switch control unit 17. An abnormality determination location detection process by the abnormality detecting unit 15 is described in detail below.

The detection result of the abnormality detecting unit 15 is sent to, for example, the display part (not illustrated), and the display part makes notifies the operator "whether the location where the abnormality occurs is inside the brake control device 1 or outside the brake control device 1". The examples of the display part and the acoustic device are as described above. In this manner, the operator can reliably and easily recognize the location where an abnormality occurs. The operator can, for example, more quickly take measures such as replacing components related to the abnormality or removing the cause of the abnormality.

The power source 11, the brake control unit 12, the opening and closing unit 13, the state detecting unit 14, the brake lock switch 16, the brake lock switch control unit 17, the brake device 2, and the motor 3 are as described in detail in the first embodiment.

Subsequently, an abnormality occurrence location detection process in the brake control device 1 according to the third embodiment of the present disclosure is described. A case where the separating unit 18 in the first form illustrated in FIG. 16 is described here, but the following description is also applicable to a case where the separating unit 18 is in the second form illustrated in FIG. 17.

Figure 18:
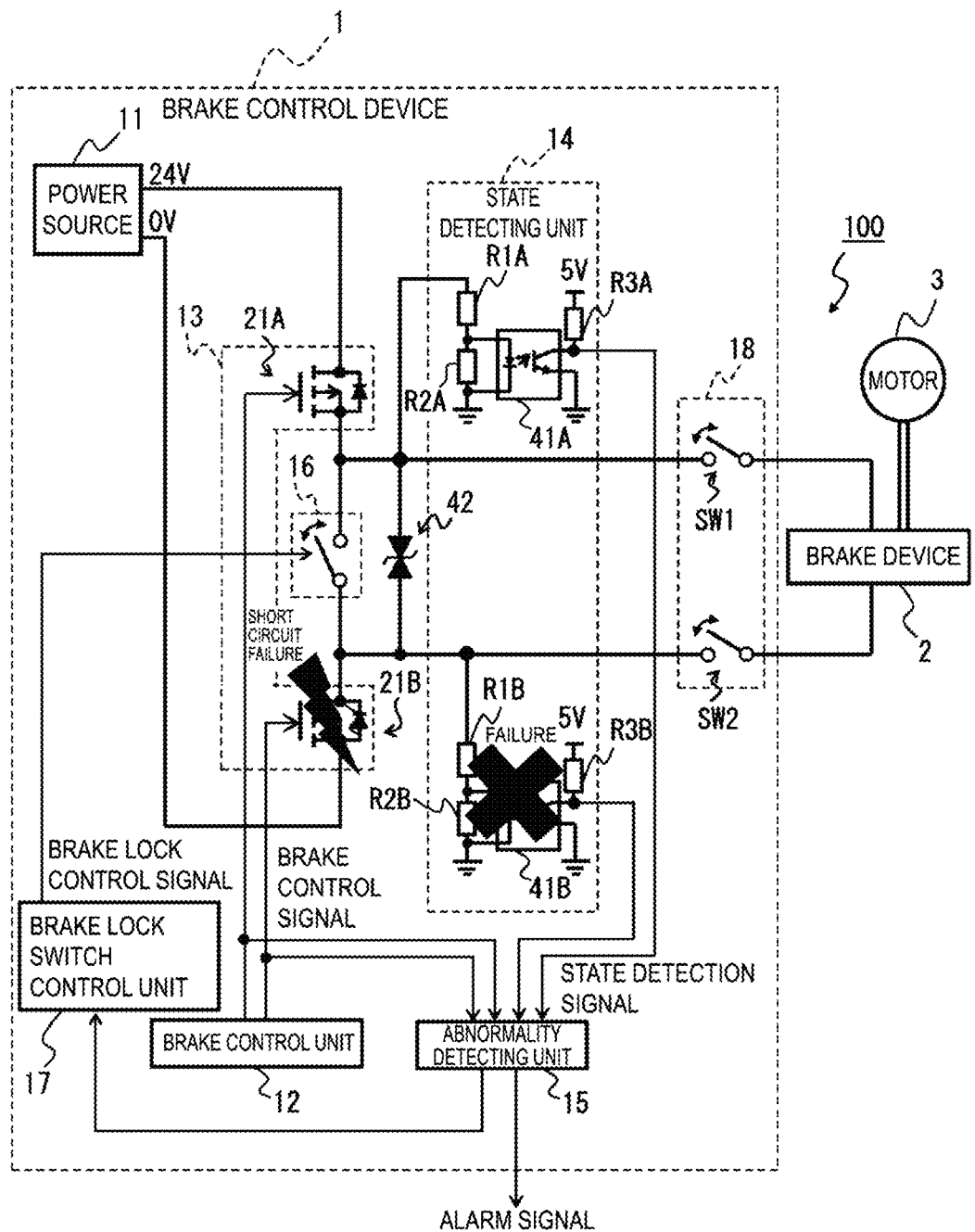
FIG. 18 is a diagram illustrating an example of an abnormality that may occur inside the brake control device in the brake control device and the motor drive device including the same according to the third embodiment of the present disclosure.
Figure 19:
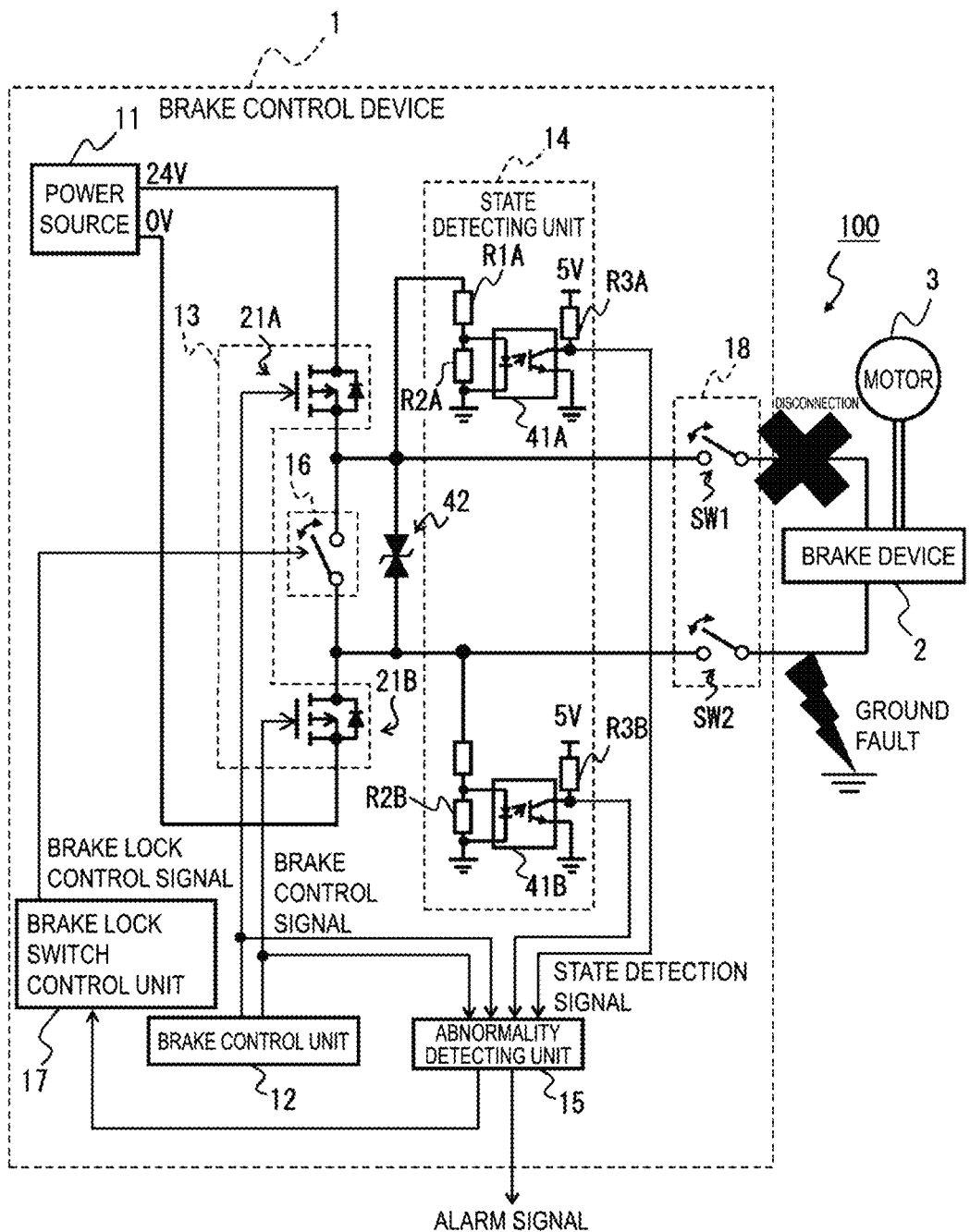
FIG. 19 is a diagram illustrating an example of an abnormality that may occur outside the brake control device in the brake control device and the motor drive device including the same according to the third embodiment of the present disclosure.

FIG. 18 is a diagram illustrating an example of an abnormality that may occur inside the brake control device in the brake control device and the motor drive device including the same according to the third embodiment of the present disclosure. FIG. 19 is a diagram illustrating an example of an abnormality that may occur outside the brake control device in the brake control device and the motor drive device including the same according to the third embodiment of the present disclosure.

As illustrated in FIG. 18, the abnormality that may occur inside the brake control device 1 includes the short circuit failure of the negative-side opening and closing switch 21B and the failure of the state detecting unit 14. As illustrated in FIG. 19, the abnormality that may occur outside the brake control device 1 includes disconnection and a ground fault of the brake cable connecting the opening and closing unit 13 and the brake device 2.

FIG. 20A is a diagram for describing each signal and brake state in the brake control device according to the third embodiment of the present disclosure, and illustrates each signal and brake state when a failure is detected during the brake release preparation process period. FIG. 20B is a diagram for describing each signal and brake state in the brake control device according to the third embodiment of the present disclosure, and illustrates each signal and brake state when a failure is detected in the brake control device during the brake release preparation process period. FIG. 20C is a diagram for describing each signal and brake state in the brake control device according to the third embodiment of the present disclosure, and illustrates each signal and brake state when a failure is detected outside the brake control device outside the brake release preparation process period.

A failure inside the brake control device 1 as illustrated in FIG. 18 and a failure outside the brake control device 1 as illustrated in FIG. 19 are both detected during the brake release preparation process period as illustrated in FIG. 20A. The detection of the short circuit failure of the negative-side opening and closing switch 21B as illustrated in FIG. 18 is as described above with reference to FIGS. 4B and 4C.

In the third embodiment of the present disclosure, when the occurrence of an abnormality is detected during the brake release preparation process period, the brake release preparation process is terminated and the faulty location determination process is executed. In the faulty location determination process, the brake control unit 12 outputs the brake control signals BSA and BSB for controlling the positive-side opening and closing switch 21A to close and the negative-side opening and closing switch 21B to open, the abnormality detecting unit 15 controls both the positive-side separating switch SW1 and the negative-side separating switch SW2 in the separating unit 18 to open, and the brake lock switch control unit 17 outputs the close signal for controlling the brake lock switch 16 to close as the brake lock control signal LS for the brake lock switch 16. In this manner, during the faulty location determination process period, the positive-side opening and closing switch 21A is closed, the negative-side opening and closing switch 21B is opened, the brake device 2 is electrically separated from the power source 11 and the opening and closing unit 13 in the brake control device 1, and the brake lock switch 16 is closed. Note that in the case where the separating unit 18 includes the positive-side connector C1 and the negative-side connector C2, and not the positive-side separating switch SW1 and SW2, the brake device 2 is electrically separated from the power source 11 and the opening and closing unit 13 in the brake control device 1 by physically separating the positive-side connector C1 and the negative-side connector C2 between the brake control device 1 and the brake device 2.

When there is a failure in the brake control device 1 as illustrated in FIG. 18, the electrical path from the positive electrode terminal of the power source 11 to the positive-side separating switch SW1 via the positive-side opening and closing switch 21A has the same potential as the voltage output by the positive electrode terminal of the power source 11, during the faulty location determination process period as illustrated in FIG. 20B. Thus, since the current flows through the voltage divider resistors R1A and R2A in the state detecting unit 14, the light-emitting element of the photocoupler 41A emits light, and consequently the output side of the photocoupler 41A is Low. Thus, the state detection signal $FB_A$ indicating the potential state of the electrical path between the source of the positive-side opening and closing switch 21A and the positive electrode terminal of the brake device 2 is Low. The electrical path from the negative-side separating switch SW2 to the negative electrode terminal of the power source 11 via the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High.

In the case where there is a failure outside the brake control device 1 as illustrated in FIG. 19, the electrical path from the positive electrode terminal of the power source 11 to the positive-side separating switch SW1 via the positive-side opening and closing switch 21A and the electrical path from the positive electrode terminal of the power source 11 to the negative-side separating switch SW2 via the positive-side opening and closing switch 21A both have the same potential as the voltage output by the positive electrode terminal of the power source 11, during the faulty location determination process period as illustrated in FIG. 20C. Thus, since the current flows through the voltage divider resistors R1A and R2A and voltage divider resistors R1B and R2B in the state detecting unit 14, the light-emitting elements in the photocoupler 41A and 41B emit light, and consequently the output sides of the photocoupler 41A and 41B are both Low. Thus, the state detection signals $FB_A$ and $FB_B$ are both Low.

In this manner, the state detection signal $FB_B$ during the faulty location determination process period is High as illustrated in FIG. 20B when there is a failure in the brake control device 1 as illustrated in FIG. 18, and the state detection signal $FB_B$ during the faulty location determination process period is Low as illustrated in FIG. 20C when there is a failure outside the brake control device 1 as illustrated in FIG. 19. During the execution of the faulty location determination process period, the abnormality detecting unit 15 detects whether the location where an abnormality occurs is located on the circuit side including the power source 11 and the opening and closing unit 13 (i.e., inside the brake control device) or on the circuit side including the brake device 2 (i.e., outside the brake control device) based on the contents of the state detection signals $FB_A$ and $FB_B$. During the execution of the faulty location determination process period, the abnormality detecting unit 15 determines that the location where an abnormality occurs is located on the circuit side including the power source 11 and the opening and closing unit 13 (i.e., inside the brake control device) when the state detection signal $FB_A$ is Low and the state detection signal $FB_B$ is High, and determines that the location where an abnormality occurs is located on the circuit side including the brake device 2 (i.e., outside the brake control device) when the state detection signals $FB_A$ and $FB_B$ are both Low. The detection result of the abnormality detecting unit 15 is sent to, for example, the display part (not illustrated) and/or the acoustic device (not illustrated), and the display part and/or the acoustic device notifies the operator "whether the location where an abnormality occurs is inside the brake control device 1 or outside the brake control device 1".

Figure 21:
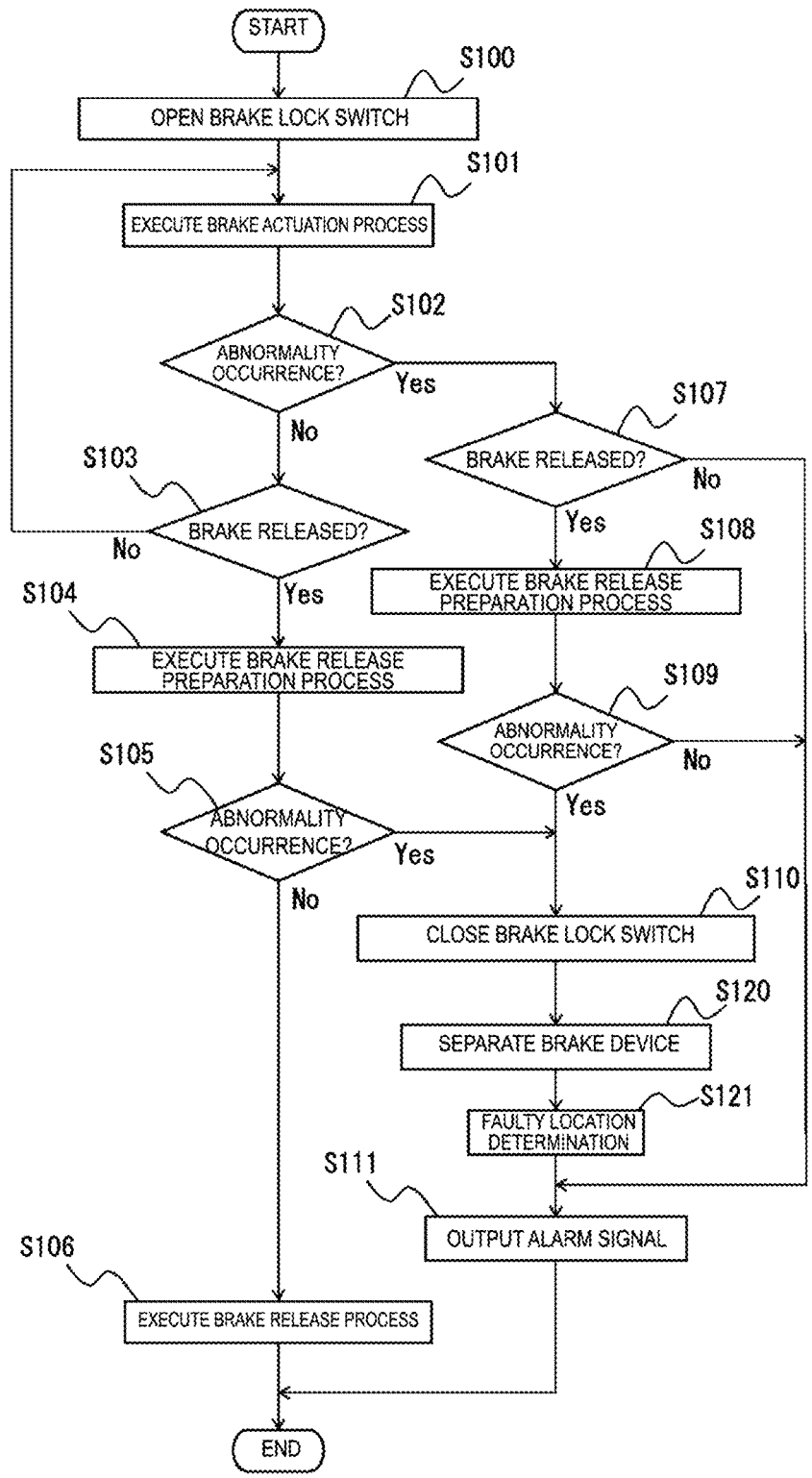
FIG. 21 is a flowchart illustrating an operation flow until the release of the brake of the brake device actuated on the motor in the brake control device according to the third embodiment of the present disclosure.

FIG. 21 is a flowchart illustrating an operation flow until the release of the brake of the brake device actuated on the motor in the brake control device according to the third embodiment of the present disclosure.

During the execution period of the brake actuation process, the brake release preparation process and the brake release process, the state detecting unit 14 outputs the state detection signal $FB_A$ indicating the potential state of the electrical path between the source of the positive-side opening and closing switch 21A in the opening and closing unit 13 and the positive electrode terminal of the brake device 2, and the state detection signal $FB_B$ indicating the potential state of the electrical path between the drain of the negative-side opening and closing switch 21B in the opening and closing unit 13 and the negative electrode terminal of the brake device 2.

In step S100, the brake lock switch control unit 17 outputs the open signal for controlling the brake lock switch 16 to open as the brake lock control signal LS for the brake lock switch 16. The brake lock switch 16 opens in response to receiving the open signal.

In step S101, the brake actuation process is executed. In the brake actuation process, the brake control unit 12 outputs the brake control signals BSA and BSB for controlling the positive-side opening and closing switch 21A and the negative-side opening and closing switch 21B to open.

In step S102, during the execution of the brake actuation process, the abnormality detecting unit 15 detects whether or not an abnormality occurs (i.e., the short circuit failure of the positive-side opening and closing switch 21A), based on the combination of the contents of the brake control signals BSA and BSB, and the contents of the state detection signals $FB_A$ and $FB_B$. When the occurrence of an abnormality is detected in step S102, the process proceeds to step S107. On the other hand, when the occurrence of an abnormality is not detected in step S102, the process proceeds to step S103.

In step S103, the brake control unit 12 determines whether or not a brake release command has been received from the host controller (not illustrated). When it is determined in step S103 that the brake release command has not been received, the process is returned to step S101, and the execution of the brake actuation process is continued. When it is determined in step S103 that the brake release command has been received, the process proceeds to step S104.

In step S104, the brake control unit 12 executes the brake release preparation process. In the brake release preparation process, the brake control unit 12 outputs the brake control signals BSA and BSB for controlling the positive-side opening and closing switch 21A to close and the negative-side opening and closing switch 21B to open.

In step S105, during the execution of the brake release preparation process, the abnormality detecting unit 15 detects whether or not an abnormality occurs, based on the combination of the contents of the brake control signals BSA and BSB, and the contents of the state detection signals $FB_A$ and $FB_B$. When the occurrence of an abnormality is detected in step S105, the process proceeds to step S110. On the other hand, when the occurrence of an abnormality is not detected in step S105, the process proceeds to step S106.

In step S106, the brake release process is executed. In the brake release process, the brake control unit 12 outputs the brake control signals BSA and BSB for controlling the positive-side opening and closing switch 21A and the negative-side opening and closing switch 21B to close. The brake release process is executed in this manner in step S106 when the occurrence of an abnormality is not detected in step S102 during the execution of the brake actuation process and the occurrence of an abnormality is not detected in step S105 during the execution of the brake release preparation process, and thus the brake can be safely released.

In step S102, when the abnormality detecting unit 15 detects the occurrence of an abnormality during the execution of the brake actuation process, the brake control unit 12 determines in step S107 whether or not the brake release command has been received from the host controller (not illustrated).

When it is determined in step S107 that the brake release command has not been received, the process proceeds to step S111. The abnormality detecting unit 15 outputs the alarm signal in step S111.

When it is determined in step S107 that the brake release command has been received, the process proceeds to step S108. In step S108, the brake control unit 12 executes the brake release preparation process. In the brake release preparation process, the brake control unit 12 outputs the brake control signals BSA and BSB for controlling the positive-side opening and closing switch 21A to close and the negative-side opening and closing switch 21B to open.

In step S109, during the execution of the brake release preparation process, the abnormality detecting unit 15 detects whether or not an abnormality occurs, based on the combination of the contents of the brake control signals BSA and BSB, and the contents of the state detection signals $FB_A$ and $FB_B$.

When the occurrence of an abnormality is not detected in step S109, only the short circuit failure of the positive-side opening and closing switch 21A described with reference to FIG. 4A occurs, and in this case, safety is ensured because the brake of the brake device 2 is actuated, but the abnormality detecting unit 15 outputs the alarm signal in step S111 to notify the operator of the occurrence of an abnormality.

When the occurrence of an abnormality is detected in step S105 or step S109, the faulty location determination process is executed. In the faulty location determination process, the brake lock switch control unit 17 first outputs the close signal for controlling the brake lock switch 16 to close as the brake lock control signal LS for the brake lock switch 16 in step S110. In this manner, the brake lock switch 16 is closed, and a short circuit is made between the input terminals of the brake device 2 (i.e., between the positive electrode terminal and the negative electrode terminal of the brake device 2), and therefore, the voltage of the power source 11 is not applied to the brake coil 115 of the brake device 2. This causes the state where the brake is actuated on the motor 3. In this manner, it is possible to avoid releasing the brake when an abnormality occurs. Subsequently, in step S120, the brake device 2 is electrically separated from the power source 11 and the opening and closing unit 13 in the brake control device 1 using the separating unit 18. In the case where the separating unit is in the first form illustrated in FIG. 16, the abnormality detecting unit 15 controls both the positive-side separating switch SW1 and the negative-side separating switch SW2 in the separating unit 18 to open. In the case where the separating unit is in the second form illustrated in FIG. 17, the positive-side connector C1 and the negative-side connector C2 between the brake control device 1 and the brake device 2 are physically separated. Subsequently, in step S121, during the execution of the faulty location determination process period, the abnormality detecting unit 15 detects whether the location where an abnormality occurs is located on the circuit side including the power source 11 and the opening and closing unit 13 (i.e., inside the brake control device) or the circuit side including the brake device 2 (i.e., outside the brake control device) based on the contents of the state detection signals $FB_A$ and $FB_B$. In step S111 following step S121, the abnormality detecting unit 15 outputs an alarm, outputs the detection result of "whether the location where an abnormality occurs is inside the brake control device 1 or outside the brake control device 1" to the display part or the acoustic device, and notifies the detection result to the operator. Thereafter, the processing is terminated.

As described above, the brake control device 1 according to the third embodiment of the present disclosure makes it possible to recognize whether the location where an abnormality occurs is inside the brake control device 1 or outside the brake control device 1. The brake of the brake device 2 actuated on the motor 3 can be released only when no abnormality occurs. Even when an abnormality occurs at the time of releasing the brake of the brake device 2 actuated on the motor 3, the release of the brake can be avoided.

Subsequently, the fourth embodiment of the present disclosure is described. The fourth embodiment of the present disclosure adds the function of detecting a faulty location to the second embodiment. A brake control device 1 according to the fourth embodiment of the present disclosure further includes the separating unit that electrically separates the brake device 2 from the power source 11 and the opening and closing unit 13 in the brake control device 1 according to the second embodiment. Forms of the separating unit are listed below.

Figure 22:
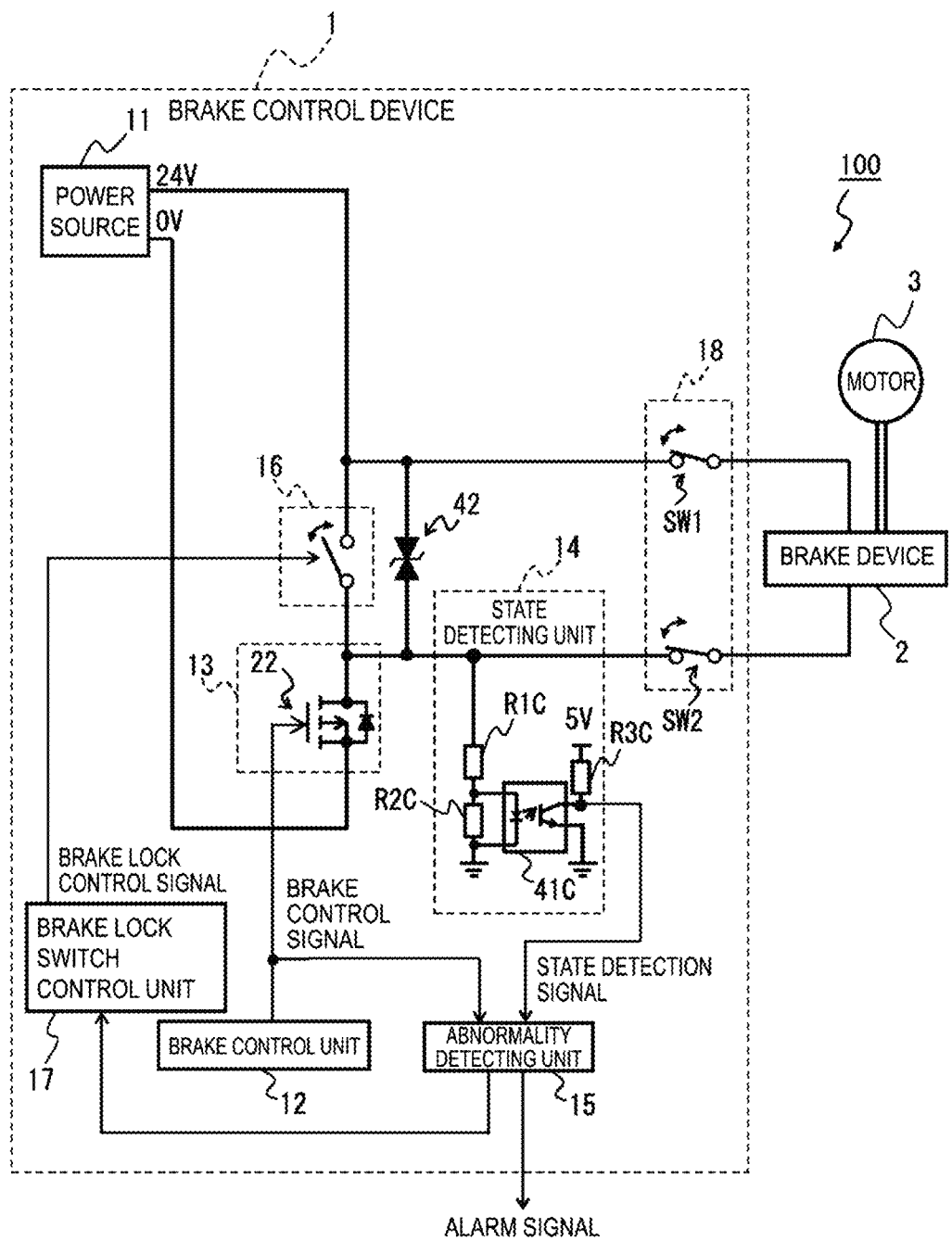
FIG. 22 is a diagram illustrating a brake control device including the separating unit in a first form and a motor drive device including the same according to a fourth embodiment of the present disclosure.

FIG. 22 is a diagram illustrating a brake control device including the separating unit in a first form, and the motor drive device including the same according to the fourth embodiment of the present disclosure.

The brake control device 1 according to the fourth embodiment of the present disclosure further includes the separating unit 18 that electrically separates the brake device 2 from the power source 11 and the opening and closing unit 13 in the brake control device 1 according to the second embodiment. As illustrated in FIG. 22, the separating unit 18 in the first form includes the positive-side separating switch SW1 that opens and closes the electrical path between the positive electrode terminal of the power source 11 and the positive electrode terminal of the brake device 2, and the negative-side separating switch SW2 that opens and closes the electrical path between the negative electrode terminal of the brake device 2 and the drain of the negative-side opening and closing switch 21B. The opening and closing of the positive-side separating switch SW1 and the negative-side separating switch SW2 in the separating unit 18 are controlled by the abnormality detecting unit 15. The brake device 2 is electrically separated from the power source 11 and the opening and closing unit 13 in the brake control device 1 by opening both the positive-side separating switch SW1 and the negative-side separating switch SW2 during the faulty location determination process period described below. The positive-side separating switch SW1 and the negative-side separating switch SW2 may include a semiconductor switching element, or a mechanical switch such as a relay. Examples of the semiconductor switching element making up the positive-side separating switch SW1 and the negative-side separating switch SW2 are as described in the third embodiment.

Figure 23:
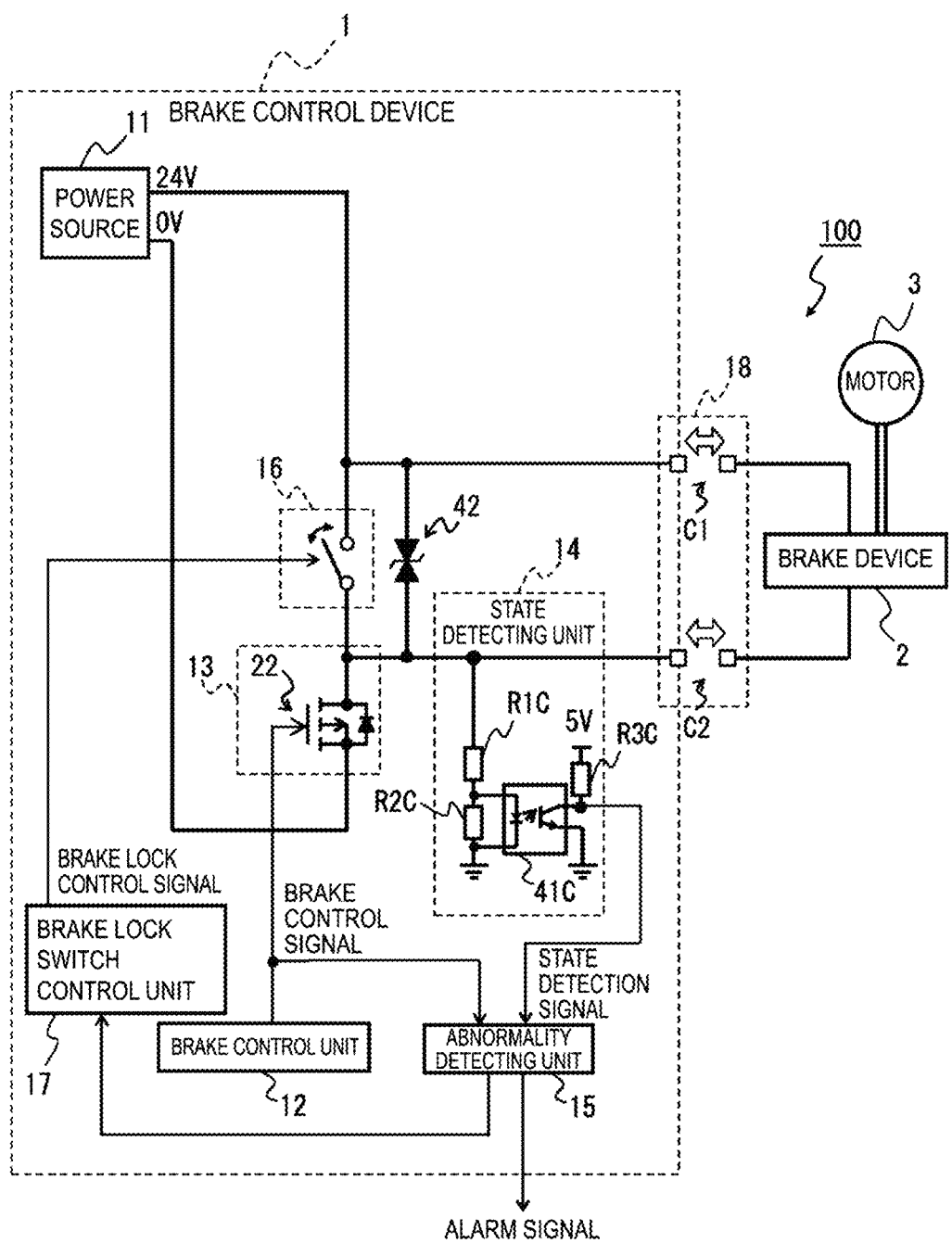
FIG. 23 is a diagram illustrating the brake control device including the separating unit in a second form, and the motor drive device including the same according to the fourth embodiment of the present disclosure.

FIG. 23 is a diagram illustrating the brake control device including the separating unit in a second form, and the motor drive device including the same according to the fourth embodiment of the present disclosure.

The brake control device 1 according to the fourth embodiment of the present disclosure further includes the separating unit 18 that electrically separates the brake device 2 from the power source 11 and the opening and closing unit 13 in the brake control device 1 according to the second embodiment. As illustrated in FIG. 23, the separating unit 18 in the second form includes the positive-side connector C1 and the negative-side connector C2 that are detachable from the brake control device 1 and the brake device 2. The positive-side connector C1 is provided on the electrical path between the positive electrode terminal of the power source 11 and the positive electrode terminal of the brake device 2, and the negative-side connector C2 is provided on the electrical path between the negative electrode terminal of the brake device 2 and the drain of the negative-side opening and closing switch 21B. The brake device 2 is electrically separated from the power source 11 and the opening and closing unit 13 in the brake control device 1 by physically separating the positive-side connector C1 and the negative-side connector C2 between the brake control device 1 and the brake device 2 during the faulty location determination process period described below.

In this manner, the separating unit 18 is in the first form illustrated in FIG. 22 or the second form illustrated in FIG. 23. When the occurrence of an abnormality is detected during the execution of the brake release preparation process, the abnormality detecting unit 15 detects whether the location where an abnormality occurs is at the circuit side including the power source 11 and the opening and closing unit 13 (i.e., in the brake control device 1) or at the circuit side including the brake device 2 (i.e., outside the brake control device 1), based on the contents of the state detection signal in the state where the brake device 2 is electrically separated from the power source 11 and the opening and closing unit 13 by the separating unit 18 and the close signal is output by the brake lock switch control unit 17. The abnormality determination location detection process by the abnormality detecting unit 15 is described in detail below.

The detection result of the abnormality detecting unit 15 is sent to, for example, the display part (not illustrated), and the display part makes notifies the operator "whether the location where an abnormality occurs is inside the brake control device 1 or outside the brake control device 1". The examples of the display part and the acoustic device are as described above. In this manner, the operator can reliably and easily recognize the location where an abnormality occurs. The operator can, for example, more quickly take measures such as replacing components related to the abnormality or removing the cause of the abnormality.

The power source 11, the brake control unit 12, the opening and closing unit 13, the state detecting unit 14, the brake lock switch 16, the brake lock switch control unit 17, the brake device 2, and the motor 3 are as described in detail in the second embodiment.

Subsequently, an abnormality occurrence location detection process in the brake control device 1 according to the fourth embodiment of the present disclosure is described. A case where the separating unit 18 in the first form illustrated in FIG. 22 is described here, the following description is also applicable to a case where the separating unit 18 is in the second form illustrated in FIG. 23.

Figure 24:
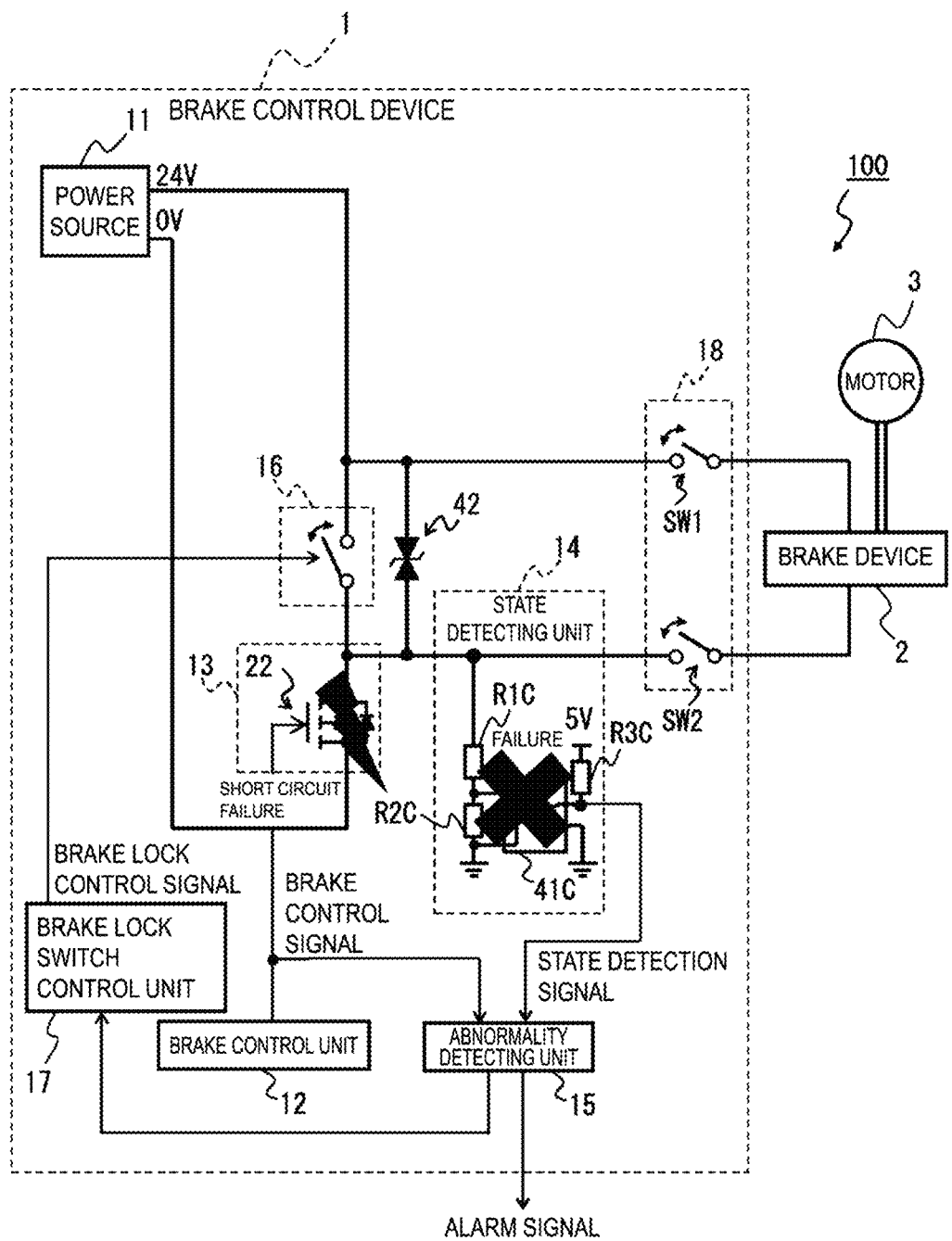
FIG. 24 is a diagram illustrating an example of an abnormality that may occur inside the brake control device in the brake control device and the motor drive device including the same according to the fourth embodiment of the present disclosure.
Figure 25:
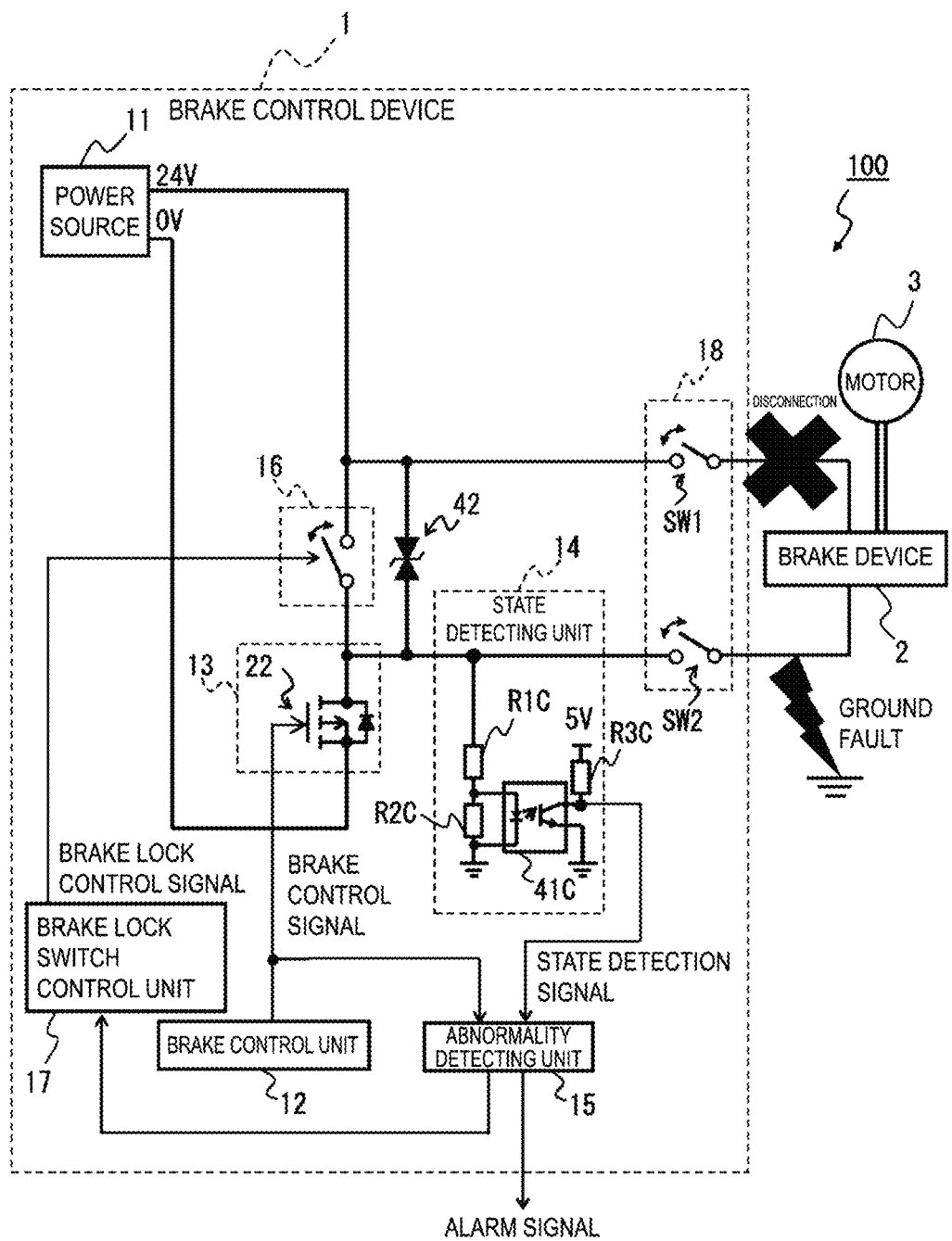
FIG. 25 is a diagram illustrating an example of an abnormality that may occur outside the brake control device in the brake control device and the motor drive device including the same according to the fourth embodiment of the present disclosure.

FIG. 24 is a diagram illustrating an example of an abnormality that may occur inside the brake control device in the brake control device and the motor drive device including the same according to the fourth embodiment of the present disclosure. FIG. 25 is a diagram illustrating an example of an abnormality that may occur outside the brake control device in the brake control device and the motor drive device including the same according to the fourth embodiment of the present disclosure.

As illustrated in FIG. 24, the abnormality that may occur inside the brake control device 1 includes the short circuit failure of the opening and closing switch 22 and the failure of the state detecting unit 14. As illustrated in FIG. 19, the abnormality that may occur outside the brake control device 1 includes the disconnection and a ground fault of the brake cable connecting the opening and closing unit 13 and the brake device 2.

FIG. 26A is a diagram for describing each signal and brake state in the brake control device according to the fourth embodiment of the present disclosure, and illustrates each signal and brake state when a failure is detected during the brake actuation process period. FIG. 26B is a diagram for describing each signal and brake state in the brake control device according to the fourth embodiment of the present disclosure, and illustrates each signal and brake state when a failure is detected in the brake control device during the brake actuation process period. FIG. 26C is a diagram for describing each signal and brake state in the brake control device according to the fourth embodiment of the present disclosure, and illustrates each signal and brake state when a failure is detected outside the brake control device outside the brake actuation process period.

The failure in the brake control device 1 illustrated in FIG. 24 and the failure outside the brake control device 1 illustrated in FIG. 25 are both detected during the brake actuation process period as illustrated in FIG. 26A, but this is as described above with reference to FIGS. 14A, 14B, and 14C.

In the fourth embodiment of the present disclosure, when the occurrence of an abnormality is detected during the brake actuation process period, the brake actuation process is terminated and the faulty location determination process is executed. In the faulty location determination process, the abnormality detecting unit 15 controls both the positive-side separating switch SW1 and the negative-side separating switch SW2 in the separating unit 18 to open, and the brake lock switch control unit 17 outputs the close signal for controlling the brake lock switch 16 to close as the brake lock control signal LS for the brake lock switch 16. In this manner, during the faulty location determination process period, the brake device 2 is electrically separated from the power source 11 and the opening and closing unit 13 in the brake control device 1, and the brake lock switch 16 is closed. Note that in the case where the separating unit 18 includes the positive-side connector C1 and the negative-side connector C2, and not the positive-side separating switch SW1 and SW2, the brake device 2 is electrically separated from the power source 11 and the opening and closing unit 13 in the brake control device 1 by physically separating the positive-side connector C1 and the negative-side connector C2 between the brake control device 1 and the brake device 2.

When there is a failure inside the brake control device 1 as illustrated in FIG. 24, the electrical path from the negative-side separating switch SW2 to the negative electrode terminal of the power source 11 via the opening and closing switch 22 has the same potential as 0 V, which is the potential of the negative electrode terminal of the power source 11, during the faulty location determination process period as illustrated in FIG. 26B. Thus, the light-emitting element in the photocoupler 41C does not emit light because the current does not flow through the voltage divider resistors R1C and R2C in the state detecting unit 14, and consequently the output side of the photocoupler 41B is High. Thus, the state detection signal FB indicating the potential state of the electrical path between the drain of the opening and closing switch 22 and the negative electrode terminal of the brake device 2 is High.

When there is a failure outside the brake control device 1 as illustrated in FIG. 25, the electrical path from the positive electrode terminal of the power source 11 to the negative-side separating switch SW2 via the positive-side opening and closing switch 21A has the same potential as the voltage output by the positive electrode terminal of the power source 11 during the faulty location determination process period as illustrated in FIG. 26C. Thus, since the current flows through the voltage divider resistors R1CA and R2C in the state detecting unit 14, the light-emitting element in photocoupler 41C emits light, and consequently the output side of the photocoupler 41C is Low. Thus, the state detection signal FB is Low.

In this manner, when there is a failure in the brake control device 1 as illustrated in FIG. 24, the state detection signal FB during the faulty location determination process period is High as illustrated in FIG. 26B, and when there is a failure outside the brake control device 1 as illustrated in FIG. 25, the state detection signal FB during the faulty location determination process period is Low as illustrated in FIG. 26C. During the execution of the faulty location determination process period, the abnormality detecting unit 15 detects whether the location where the abnormality occurs is located on the circuit side including the power source 11 and the opening and closing unit 13 (i.e., inside the brake control device) or on the circuit side including the brake device 2 (i.e., outside the brake control device) based on the contents of the state detection signal FB. During the execution of the faulty location determination process period, the abnormality detecting unit 15 determines that the location where the abnormality occurs is located on the circuit side including the power source 11 and the opening and closing unit 13 (i.e., inside the brake control device) when the state detection signal FB is High, and determines that the location where the abnormality occurs is located on the circuit side including the brake device 2 (i.e., outside the brake control device) when the state detection signal FB is Low. The detection result of the abnormality detecting unit 15 is sent to, for example, the display part (not illustrated) and/or the acoustic device (not illustrated), and the display part and/or the acoustic device notifies the operator "whether the location where an abnormality occurs is inside the brake control device 1 or outside the brake control device 1".

Figure 27:
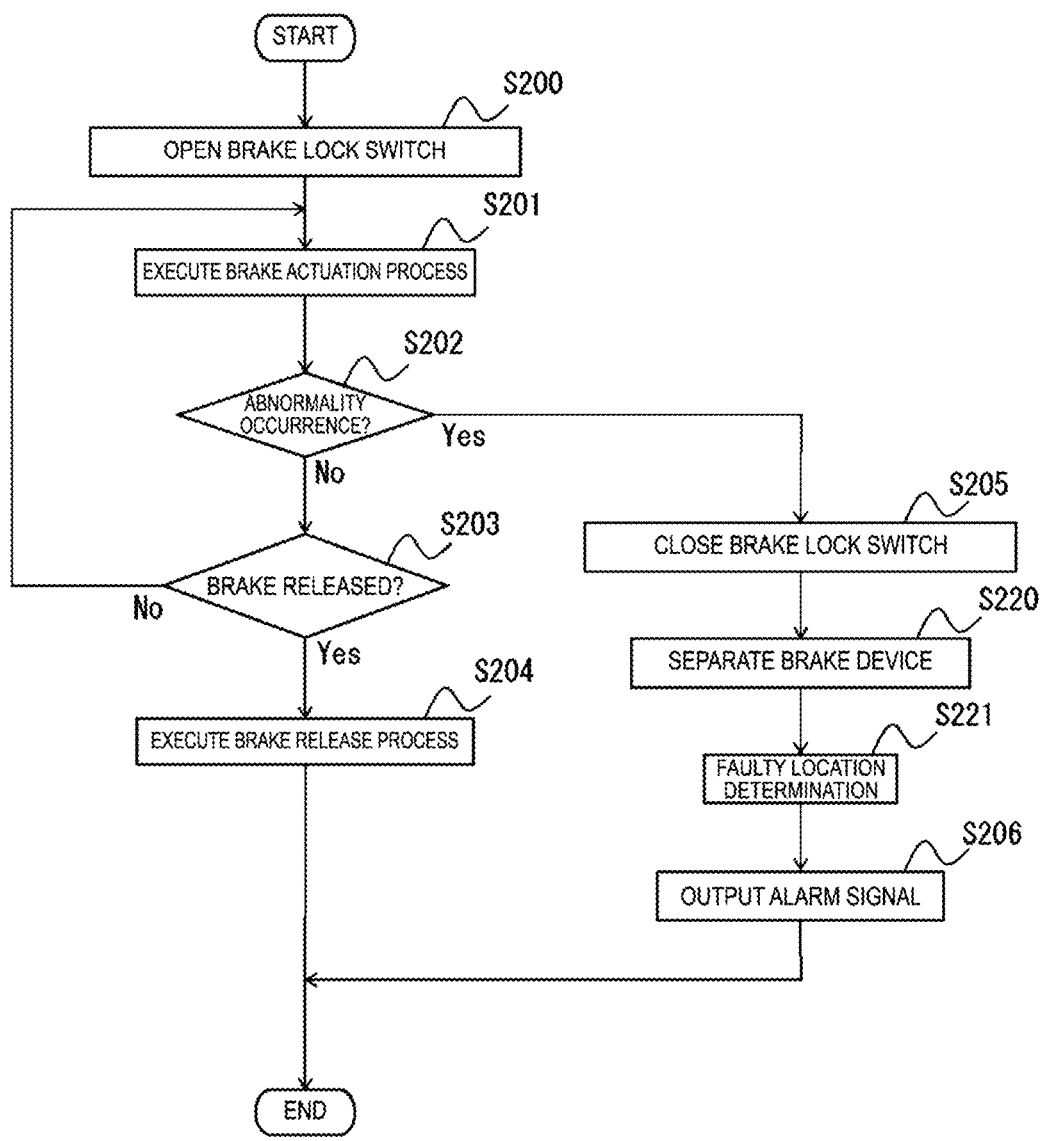
FIG. 27 is a flowchart illustrating an operation flow until the release of the brake of the brake device actuated on the motor in the brake control device according to the fourth embodiment of the present disclosure.

FIG. 27 is a flowchart illustrating an operation flow until the release of the brake of the brake device actuated on the motor in the brake control device according to the fourth embodiment of the present disclosure.

During the execution period of the brake actuation process and the brake release process, the state detecting unit 14 outputs the state detection signal FB indicating the potential state of the electrical path between the drain of the opening and closing switch 22 in the opening and closing unit 13 and the negative electrode terminal of the brake device 2.

In step S200, the brake lock switch control unit 17 outputs the open signal for controlling the brake lock switch 16 to open as the brake lock control signal LS for the brake lock switch 16. The brake lock switch 16 opens in response to receiving the open signal.

In step S201, the brake actuation process is executed. In the brake actuation process, the brake control unit 12 outputs the brake control signal BS for controlling the opening and closing switch 22 to open.

In step S202, during the execution of the brake actuation process, the abnormality detecting unit 15 detects whether or not an abnormality occurs, based on the combination of the contents of the brake control signal BS and the contents of the state detection signal FB. When the occurrence of an abnormality is detected in step S202, the process proceeds to step S205. On the other hand, when the occurrence of an abnormality is not detected in step S202, the process proceeds to step S203.

In step S203, the brake control unit 12 determines whether or not the brake release command has been received from the host controller (not illustrated). When it is determined in step S203 that the brake release command has not been received, the process is returned to step S201, and the execution of the brake actuation process is continued. When it is determined in step S203 that the brake release command has been received, the process proceeds to step S204.

In step S204, the brake release process is executed. In the brake release process, the brake control unit 12 outputs the brake control signal BS for controlling the opening and closing switch 22 to close. The brake release process is executed in this manner in step S204 when the occurrence of an abnormality is not detected in step S203 during the execution of the brake actuation process immediately before the brake release process, and thus the brake can be safely released.

When the occurrence of an abnormality is detected in step S202, the faulty location determination process is executed. In the faulty location determination process, the brake lock switch control unit 17 first outputs the close signal for controlling the brake lock switch 16 to close as the brake lock control signal LS for the brake lock switch 16 in step S205. In this manner, the brake lock switch 16 is closed, and a short circuit is made between the input terminals of the brake device 2 (i.e., between the positive electrode terminal and the negative electrode terminal of the brake device 2), and therefore, the voltage of the power source 11 is not applied to the brake coil 115 of the brake device 2. This causes the state where the brake is actuated on the motor 3. In this manner, it is possible to avoid releasing the brake when an abnormality occurs. Subsequently, in step S220, the brake device 2 is electrically separated from the power source 11 and the opening and closing unit 13 in the brake control device 1 using the separating unit 18. In the case where the separating unit is in the first form illustrated in FIG. 22, the abnormality detecting unit 15 controls both the positive-side separating switch SW1 and the negative-side separating switch SW2 in the separating unit 18 to open. In the case where the separating unit is in the second form illustrated in FIG. 23, the positive-side connector C1 and the negative-side connector C2 between the brake control device 1 and the brake device 2 are physically separated. Subsequently, in step S221, during the execution of the faulty location determination process period, the abnormality detecting unit 15 detects whether the location where the abnormality occurs is located on the circuit side including the power source 11 and the opening and closing unit 13 (i.e., inside the brake control device) or on the circuit side including the brake device 2 (i.e., outside the brake control device) based on the contents of the state detection signal FB. In step S206 following step S221, the abnormality detecting unit 15 outputs the alarm, outputs the detection result of "whether the location where the abnormality occurs is inside the brake control device 1 or outside the brake control device 1" to the display part or the acoustic device, and notifies the detection result to the operator.

As described above, the brake control device 1 according to the fourth embodiment of the present disclosure makes it possible to determine whether the location where the abnormality occurs is inside the brake control device 1 or outside the brake control device 1. The brake of the brake device 2 actuated on the motor 3 can be released only when no abnormality occurs. Even when an abnormality occurs at the time of releasing the brake of the brake device 2 actuated on the motor 3, release of the brake can be avoided.

Note that the brake lock switch 16 includes a normally open switch in the above-described embodiments, but the brake lock switch 16 may also include a normally closed switch as an alternative example. With the brake lock switch 16 including a normally closed switch, even when a power source of a driving circuit of the normally closed brake lock switch 16 is lost for some reason, a short circuit is made between the input terminals of the brake device 2 (i.e., between the positive electrode terminal and the negative electrode terminal of the brake device 2), and thus the voltage of the power source 11 is not applied to the brake coil 115 of the brake device 2. This causes the state where the brake is actuated on the motor 3, and safety is ensured.

REFERENCE SIGNS LIST

1 Brake control device
2 Brake device
3 Motor
11 Power source
12 Brake control unit
13 Opening and closing unit
14 State detecting unit
15 Abnormality detecting unit
16 Brake lock switch
17 Brake lock switch control unit
18 Separating unit
21A Positive-side opening and closing switch
21B Negative-side opening and closing switch
22 Opening and closing switch
41A, 41B, 41C Photocoupler
42 Surge absorber
100 Motor drive device
111 Friction plate
112 Armature
113 End plate
114 Spring
115 Brake coil
116 Core
117 Spacer
118 Bolt
121 Shaft
122 Hub
C1 Positive-side connector
C2 Negative-side connector
R1A, R2A, R1B, R2B, R1C, R2C Voltage divider resistor
R3A, R3B, R3C Pull-up resistor
SW1 Positive-side separating switch
SW2 Negative-side separating switch

The invention claimed is:

1. A brake control device configured to control a brake device that is non-excitation actuated type and configured to actuate a brake in a non-excitation state in which no voltage is applied and to release the brake in an excitation state in which the voltage is applied, the brake control device comprising:
   a power source configured to output a voltage;
   a brake control unit configured to output a brake control signal;
   an opening and closing unit connected in series to the brake device and configured to open and close an electrical path between the power source and the brake device in response to a received brake control signal;
   a state detecting unit configured to output a state detection signal indicating a potential state of an electrical path between the opening and closing unit and the brake device;
   an abnormality detecting unit configured to detect whether or not an abnormality occurs, based on a combination of a content of the brake control signal and a content of the state detection signal;
   a brake lock switch connected in parallel to the brake device between input terminals of the brake device, and configured to open and close an electrical path in response to a received brake lock control signal; and
   a brake lock switch control unit configured to output, as the brake lock control signal for the brake lock switch, a close signal for controlling the brake lock switch to close when the occurrence of an abnormality is detected by the abnormality detecting unit.

2. The brake control device according to claim 1, wherein the brake lock switch control unit outputs, as the brake lock control signal for the brake lock switch, an open signal for controlling the brake lock switch to open when the occurrence of an abnormality is not detected by the abnormality detecting unit.

3. The brake control device according to claim 1, wherein the opening and closing unit includes:
   at least one positive-side opening and closing switch configured to open and close an electrical path between a positive electrode terminal of the power source and a positive electrode terminal of the brake device; and
   at least one negative-side opening and closing switch configured to open and close an electrical path between a negative electrode terminal of the power source and a negative electrode terminal of the brake device,
   wherein the brake control unit executes:
   a brake actuation process to output the brake control signal for controlling the positive-side opening and closing switch and the negative-side opening and closing switch to open;

a brake release process to output the brake control signal for controlling the positive-side opening and closing switch and the negative-side opening and closing switch to close; and a brake release preparation process to output the brake control signal for controlling the positive-side opening and closing switch to close and controlling the negative-side opening and closing switch to open, between the brake actuation process and the brake release process during a transition from the brake actuation process to the brake release process, wherein the abnormality detecting unit detects, during execution of the brake actuation process and during execution of the brake release preparation process, whether or not an abnormality occurs, based on the combination of the contents of the brake control signal and the contents of the state detection signal, and wherein the brake lock switch control unit outputs the close signal when the abnormality detecting unit detects the occurrence of an abnormality both during the execution of the brake actuation process and during the execution of the brake release preparation process.

4. The brake control device according to claim 3, wherein the brake control unit terminates the brake release preparation process and executes the brake release process when the abnormality detecting unit does not detect the occurrence of an abnormality during the execution of the brake release preparation process.

5. The brake control device according to claim 3, wherein the abnormality detecting unit detects, during the execution of the brake actuation process, whether or not an abnormality occurs, based on the combination of the contents of the brake control signal and the contents of the state detection signal, and wherein the abnormality detecting unit outputs an alarm signal when the abnormality detecting unit detects the occurrence of an abnormality during the execution of the brake actuation process.

6. The brake control device according to claim 3, wherein the brake control unit terminates the brake release preparation process and executes and the brake release process when at least one of the occurrence of an abnormality to be detected during the execution of the brake actuation process by the abnormality detecting unit or the occurrence of an abnormality to be detected during the execution of the brake release preparation process by the abnormality detecting unit is not detected during a transition from the brake actuation process to the brake release process via the brake release preparation process.

7. The brake control device according to claim 3, further comprising:

a separating unit configured to electrically separate the brake device from the power source and the opening and closing unit, wherein when the occurrence of an abnormality is detected during the execution of the brake release preparation process, in a state where the brake device is electrically separated from the power source and the opening and closing unit by the separating unit, and the brake lock switch control unit outputs the close signal, the abnormality detecting unit detects whether a location where the abnormality occurs is located on a circuit side including the power source and the opening and closing unit or on a circuit side including the brake device, based on the content of the state detection signal.

8. The brake control device according to claim 1, wherein the opening and closing unit includes at least one opening and closing switch configured to open and close any of an electrical path between a positive electrode terminal of the power source and a positive electrode terminal of the brake device or an electrical path between a negative electrode terminal of the power source and a negative electrode terminal of the brake device, wherein the brake control unit executes:

a brake actuation process to output the brake control signal for controlling the opening and closing switch to open; and a brake release process to output the brake control signal for controlling the opening and closing switch to close, wherein the abnormality detecting unit detects, during the execution of the brake actuation process, whether or not an abnormality occurs, based on the combination of the contents of the brake control signal and the contents of the state detection signal, and wherein the brake lock switch control unit outputs the close signal when the abnormality detecting unit detects the occurrence of an abnormality during the execution of the brake actuation process.

9. The brake control device according to claim 8, wherein the brake control unit terminates the brake actuation process and executes the brake release process when the abnormality detecting unit does not detect the occurrence of an abnormality while the brake actuation process is executed during a transition from the brake actuation process to the brake release process.

10. The brake control device according to claim 8, wherein the abnormality detecting unit outputs an alarm signal when the occurrence of an abnormality is detected during the execution of the brake actuation process.

11. The brake control device according to claim 8, further comprising:

a separating unit configured to electrically separate the brake device from the power source and the opening and closing unit, wherein when the occurrence of an abnormality is detected during the execution of the brake actuation process, in a state where the brake device is electrically separated from the power source and the opening and closing unit by the separating unit, and the brake lock switch control unit outputs the close signal, the abnormality detecting unit detects whether a location where an abnormality occurs is located on a circuit side including the power source and the opening and closing unit or on a circuit side including the brake device, based on the content of the state detection signal.

12. A motor drive device comprising:

a brake device that is a non-excitation actuated type and configured to actuate a brake on a motor in a non-excitation state in which no voltage is applied, and to release the brake on the motor in an excitation state in which the voltage is applied; and the brake control device according to claim 1 that controls the brake device.

* * * * *